US012624720B2

(12) United States Patent
       Disantis

(10) Patent No.:    US 12,624,720 B2
(45) Date of Patent:        May 12, 2026

(54) ENHANCED FLANGE NUT

(71) Applicant: SKY CLIMBER FASTENERS LLC, Delaware, OH (US)

(72) Inventor: Raymond Disantis, Willoughby Hills, OH (US)

(73) Assignee: BPC LG 2, LLC, Charlotte, NC (US)

( * ) Notice: Subject to any disclaimer, the term of this patent is extended or adjusted under 35 U.S.C. 154(b) by 470 days.

(21) Appl. No.: 18/138,320

(22) Filed: Apr. 24, 2023

(65) Prior Publication Data

US 2023/0340983 A1     Oct. 26, 2023

Related U.S. Application Data

(60) Provisional application No. 63/363,508, filed on Apr. 25, 2022.

(51) Int. Cl.
     F16B 23/00          (2006.01)

(52) U.S. Cl.
     CPC ................................. F16B 23/0038 (2013.01)

(58) Field of Classification Search
     CPC .... F16B 37/00; F16B 23/0038; F16B 39/282;
                         F16B 23/0061; F16B 33/06
     USPC ................. 411/436, 427, 186, 402; 81/121.1
     See application file for complete search history.

(56) References Cited

U.S. PATENT DOCUMENTS

| | | | |
|---|---|---|---|
| 111,996 A | 2/1871 | Washbourne | |
| D28,212 S | 1/1898 | Von Biedenfeld | |
| 2,382,748 A | 8/1945 | Schuttler | |
| 2,464,808 A | 3/1949 | Mark | |
| 3,216,302 A | 11/1965 | Kluth | |
| 3,789,726 A | 2/1974 | Gill | |
| 3,933,074 A | 1/1976 | Witte et al. | |
| 3,989,082 A | 11/1976 | Pinchback | |
| 4,195,678 A | 4/1980 | Pinchback | |
| 4,269,248 A * | 5/1981 | MacLean .............. F16B 39/282 |
| | | | 411/402 |
| 4,281,699 A * | 8/1981 | Grube ................... F16B 39/282 |
| | | | 411/176 |
| 4,479,747 A | 10/1984 | Pagel | |

(Continued)

FOREIGN PATENT DOCUMENTS

| | | |
|---|---|---|
| CN | 207161492 U | 3/2018 |
| EP | 2851570 A1 | 2/1976 |

OTHER PUBLICATIONS

International Search Report and Written Opinion of the International Searching Authority for International Application No. PCT/US2023/19607, Mailed Jul. 27, 2023, eight pages.

*Primary Examiner* — Christine M Mills
*Assistant Examiner* — Dil K. Magar
(74) *Attorney, Agent, or Firm* — David J. Dawsey; Dawsey Co., LPA

(57)                    ABSTRACT

A nut allowing selective removal of nut material in very specific areas through the use of unusual curvatures and relationships, thereby providing enhanced durability, toughness, resilience to shock, and ability to accept elastic strain, while providing improved stress distribution, increased strength, and resistance to nut dilation. Features of the nut flange and nut transition area, specifically unique combination of radii of curvature, and the placement the curved surfaces, between the planar surfaces of tool engagement surfaces and the flange seat provide enhanced performance.

20 Claims, 24 Drawing Sheets

(56) References Cited

U.S. PATENT DOCUMENTS

| | | | | |
|---|---|---|---|---|
| 4,856,954 A * | 8/1989 | Peterson | ................ | B05D 1/322 |
| | | | | 427/388.5 |
| 5,393,182 A | 2/1995 | Berecz | | |
| 5,927,921 A | 7/1999 | Hukari | | |
| 6,015,251 A * | 1/2000 | Chung | ................... | F16B 39/32 |
| | | | | 411/262 |
| 6,244,807 B1 | 6/2001 | Garcia | | |
| 6,435,791 B1 * | 8/2002 | Bydalek | ................... | B60B 3/16 |
| | | | | 411/533 |
| 6,726,422 B2 * | 4/2004 | Giannakakos | ......... | F16B 37/12 |
| | | | | 411/178 |
| 8,011,866 B2 | 9/2011 | Harris | | |
| 9,212,682 B2 | 12/2015 | Yamazaki | | |
| 9,624,962 B2 | 4/2017 | Unseld | | |
| 9,689,420 B2 | 6/2017 | Ortega Dona | | |
| 9,845,820 B2 | 12/2017 | Dent | | |
| 10,030,685 B2 * | 7/2018 | Berton | ................ | F16B 23/0061 |
| 10,189,518 B2 | 1/2019 | Dumitru | | |
| 10,190,619 B2 | 1/2019 | Goyer | | |
| 2002/0012578 A1 | 1/2002 | Duran | | |
| 2010/0047037 A1 * | 2/2010 | Ishida | ..................... | F16B 37/00 |
| | | | | 411/427 |
| 2010/0172717 A1 | 7/2010 | Corbett | | |
| 2010/0296891 A1 | 11/2010 | Tsukamoto | | |
| 2011/0226096 A1 * | 9/2011 | Berton | ................... | F16B 37/00 |
| | | | | 81/121.1 |
| 2014/0147230 A1 * | 5/2014 | Konagaya | ............... | F16B 33/02 |
| | | | | 411/436 |
| 2015/0147134 A1 | 5/2015 | Busby | | |
| 2015/0184687 A1 * | 7/2015 | Weis | ......................... | B60B 3/16 |
| | | | | 411/373 |
| 2016/0053800 A1 * | 2/2016 | Dent | ...................... | F16B 37/00 |
| | | | | 411/427 |
| 2016/0312816 A1 * | 10/2016 | Bjelobradic | ........ | F16B 23/0038 |
| 2017/0114823 A1 | 4/2017 | Goyer | | |
| 2019/0277329 A1 | 9/2019 | Boyer | | |
| 2019/0301517 A1 * | 10/2019 | Kumpf | ................. | F16B 39/284 |

* cited by examiner 1100    1200    1300

100    200    300

100    200    300

ENHANCED FLANGE NUT

CROSS-REFERENCE TO RELATED APPLICATIONS

This application claims the benefit of U.S. provisional patent application Ser. No. 63/363,508, filed on Apr. 25, 2022, all of which is incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to the field of fasteners. More particularly, the present invention relates to threaded nuts. Specifically, the present invention relates to thin-walled fastener nuts used in the aerospace and other related industries.

BACKGROUND OF THE INVENTION

Conventional nut design has generally resulted in the addition of material to strengthen nuts and has failed to recognize that sometimes "less is more" when it comes to improving stress distribution. Further, conventional nut design often leads to specialized heat treatment that results in undesirable attributes such as high hardness values that require precise processing methods to eliminate hydrogen embrittlement and reduce the fracture toughness. As will be disclosed, selectively reducing material from a nut transition area, along with key relationships regarding the removal of this material, can actually improve the performance of a nut.

SUMMARY OF THE INVENTION

A nut allowing selective removal nut material in very specific areas through the use of unusual curvatures and relationships, thereby providing enhanced durability, toughness, resilience to shock, and ability to accept elastic strain, while providing improved stress distribution, increased strength, and resistance to nut dilation. Features of the nut flange and nut transition area, specifically unique combination of radii of curvature, and the placement the curved surfaces, between the planar surfaces of tool engagement surfaces and the flange seat provide enhanced performance.

BRIEF DESCRIPTION OF THE DRAWINGS

Without limiting the scope of the present invention as claimed below and referring now to the drawings and figures:

Figure 1:
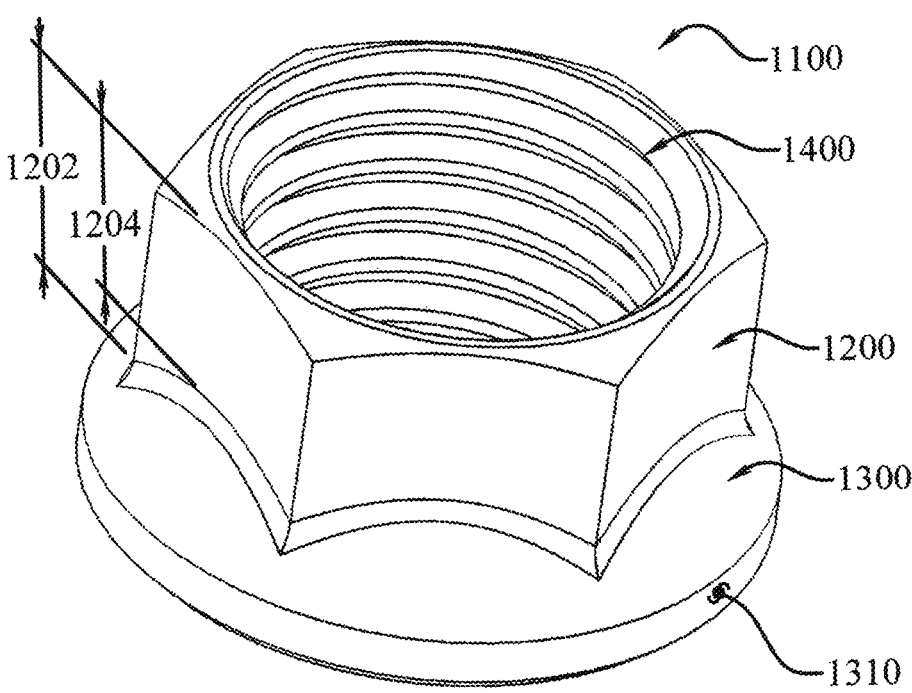
FIG. 1 is an isometric view of a prior art nut embodiment.

These illustrations are provided to assist in the understanding of the exemplary embodiments of enhanced flange nuts as described in more detail below and should not be construed as unduly limiting the specification. In particular, the relative spacing, positioning, sizing, and dimensions of the various elements illustrated in the drawings may not be drawn to scale and may have been exaggerated, reduced, or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Figures 3, 4:
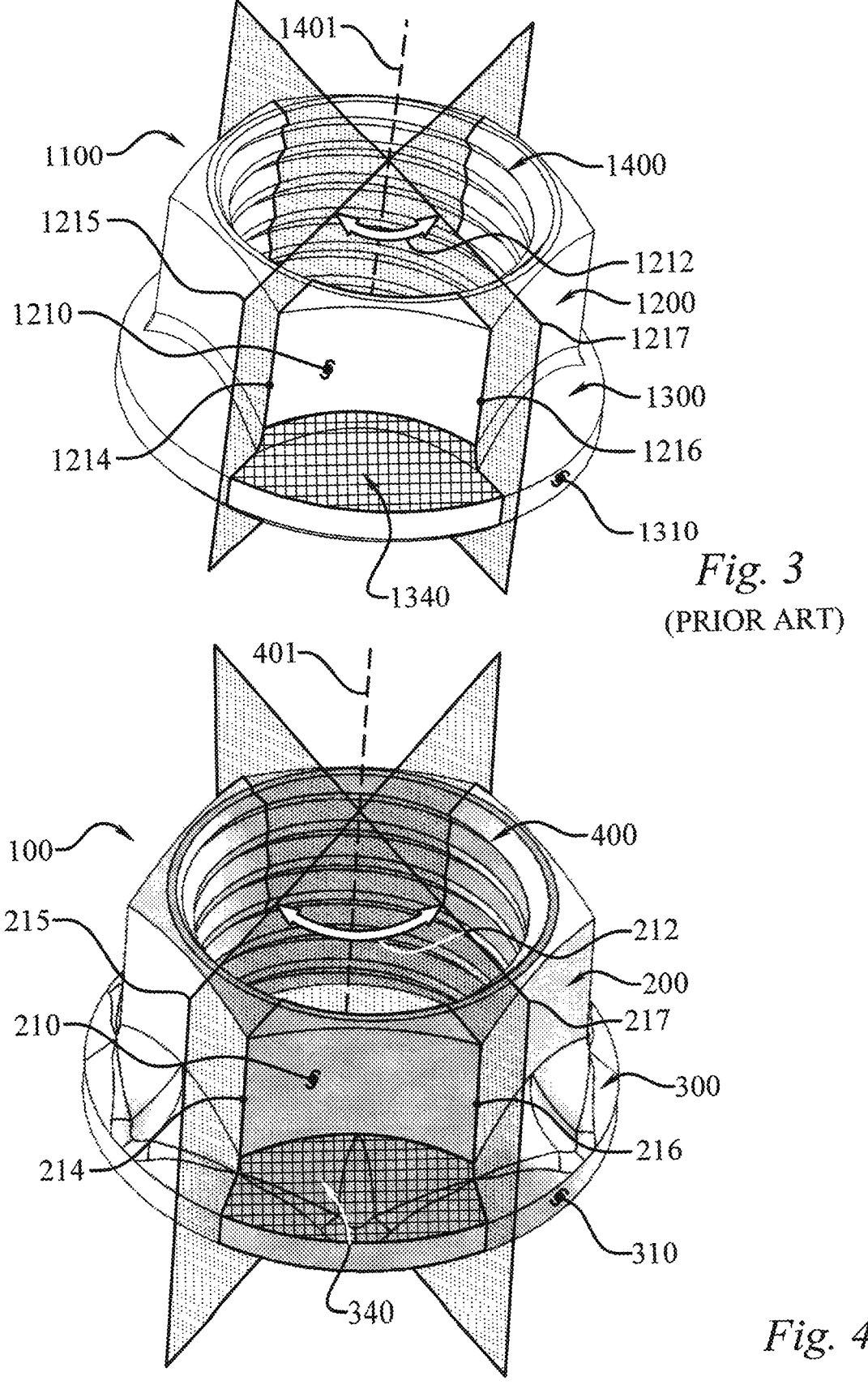
FIG. 3 is another isometric view of a prior art nut embodiment.
FIG. 4 is another isometric view of a nut embodiment having an enhanced flange.
Figures 8, 9, 10, 14, 15, 16:
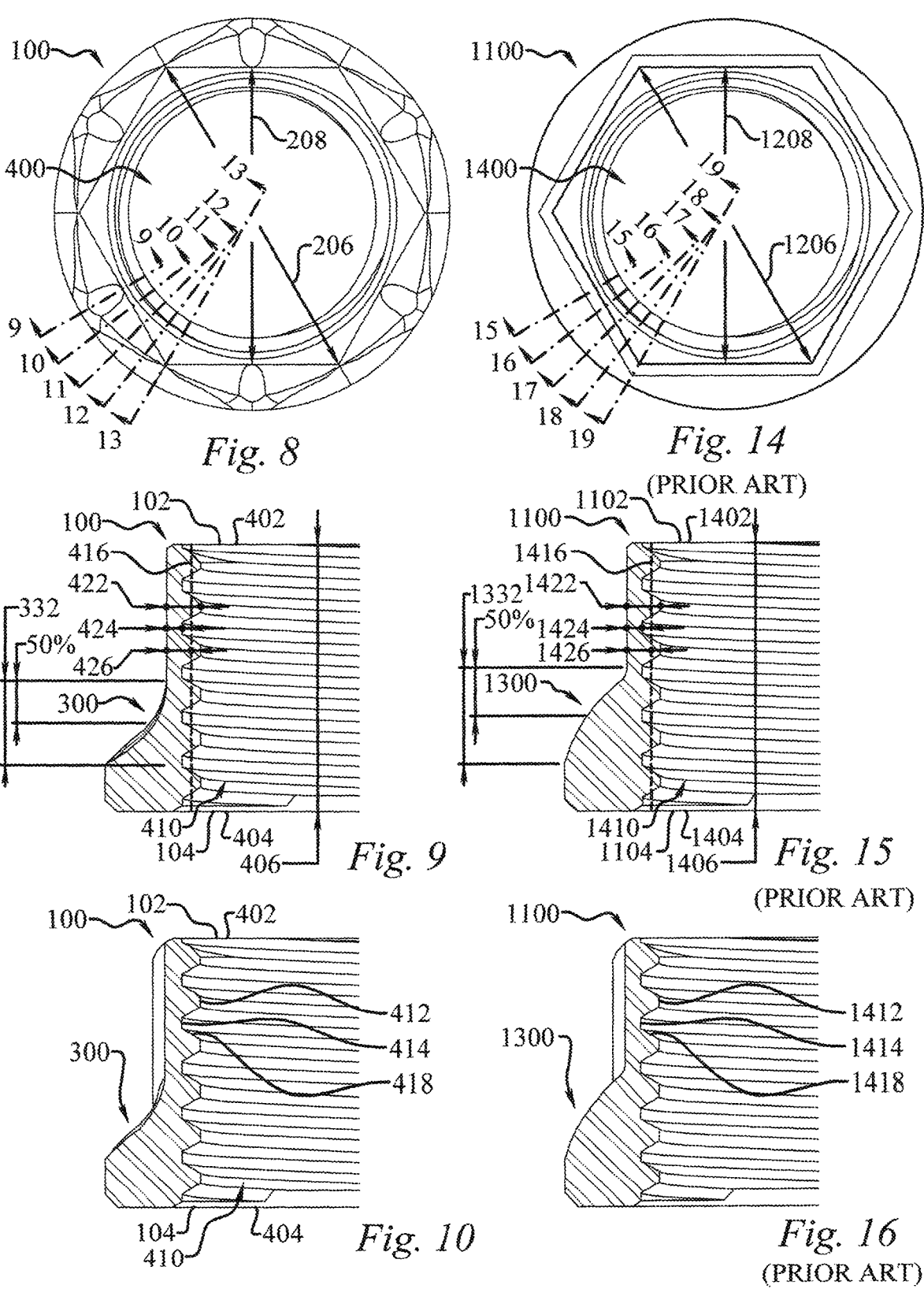
FIG. 8 is a top plan view of a nut embodiment having an enhanced flange.
FIG. 9 is a cross-section view of a nut embodiment having an enhanced flange taken along section line 9-9 in FIG. 8.
FIG. 10 is a cross-section view of a nut embodiment having an enhanced flange taken along section line 10-10 in FIG. 8.
FIG. 14 is a top plan view of a prior art nut embodiment.
FIG. 15 is a cross-section view of a prior art nut embodiment taken along section line 15-15 in FIG. 14.
FIG. 16 is a cross-section view of a prior art nut embodiment taken along section line 16-16 in FIG. 14.
Figures 11, 12, 13, 17, 18, 19:
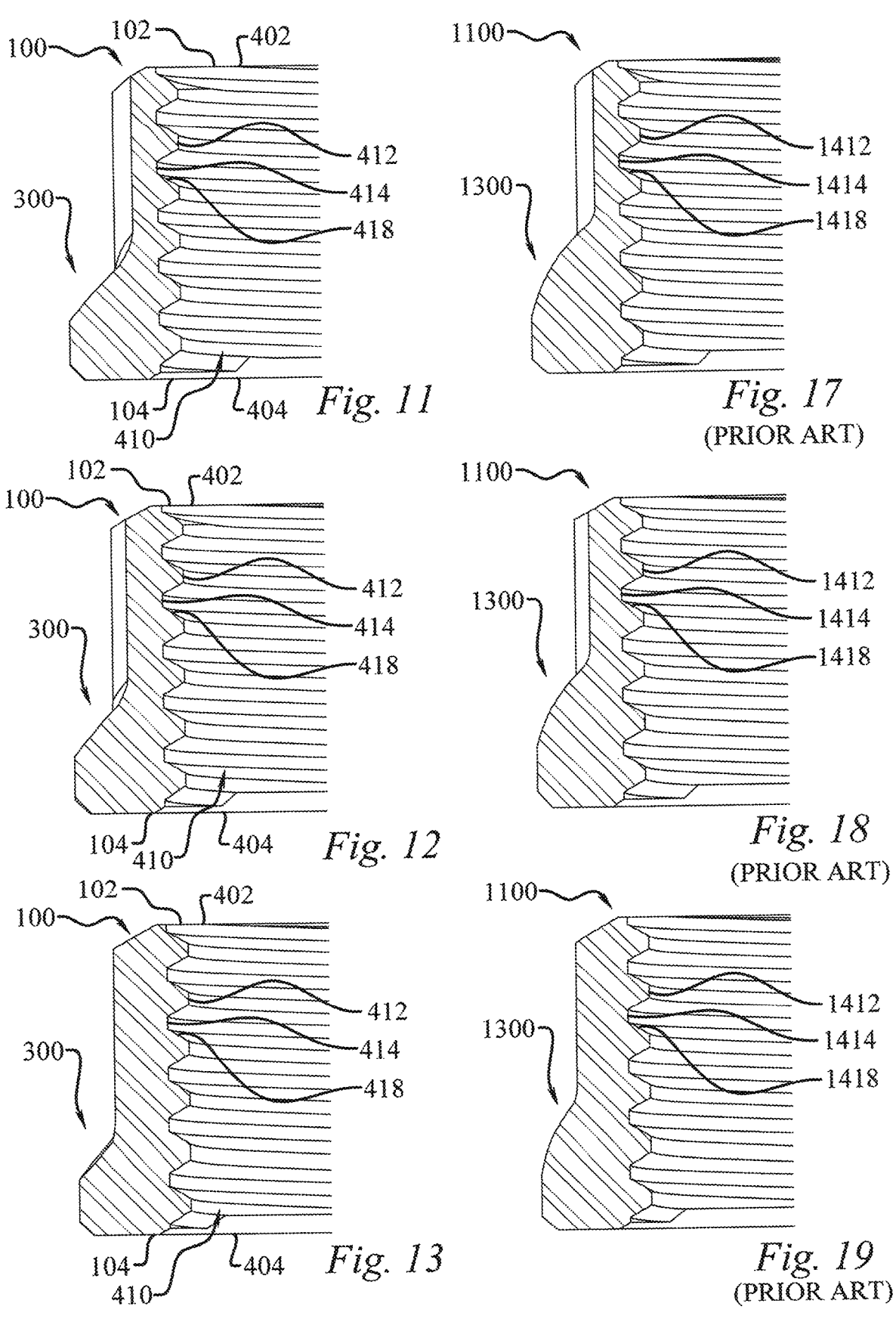
FIG. 11 is a cross-section view of a nut embodiment having an enhanced flange taken along section line 11-11 in FIG. 8.
FIG. 12 is a cross-section view of a nut embodiment having an enhanced flange taken along section line 12-12 in FIG. 8.
FIG. 13 is a cross-section view of a nut embodiment having an enhanced flange taken along section line 13-13 in FIG. 8.
FIG. 17 is a cross-section view of a prior art nut embodiment taken along section line 17-17 in FIG. 14.
FIG. 18 is a cross-section view of a prior art nut embodiment taken along section line 18-18 in FIG. 14.
FIG. 19 is a cross-section view of a prior art nut embodiment taken along section line 19-19 in FIG. 14.
Figures 20, 21, 22, 26, 27, 28:
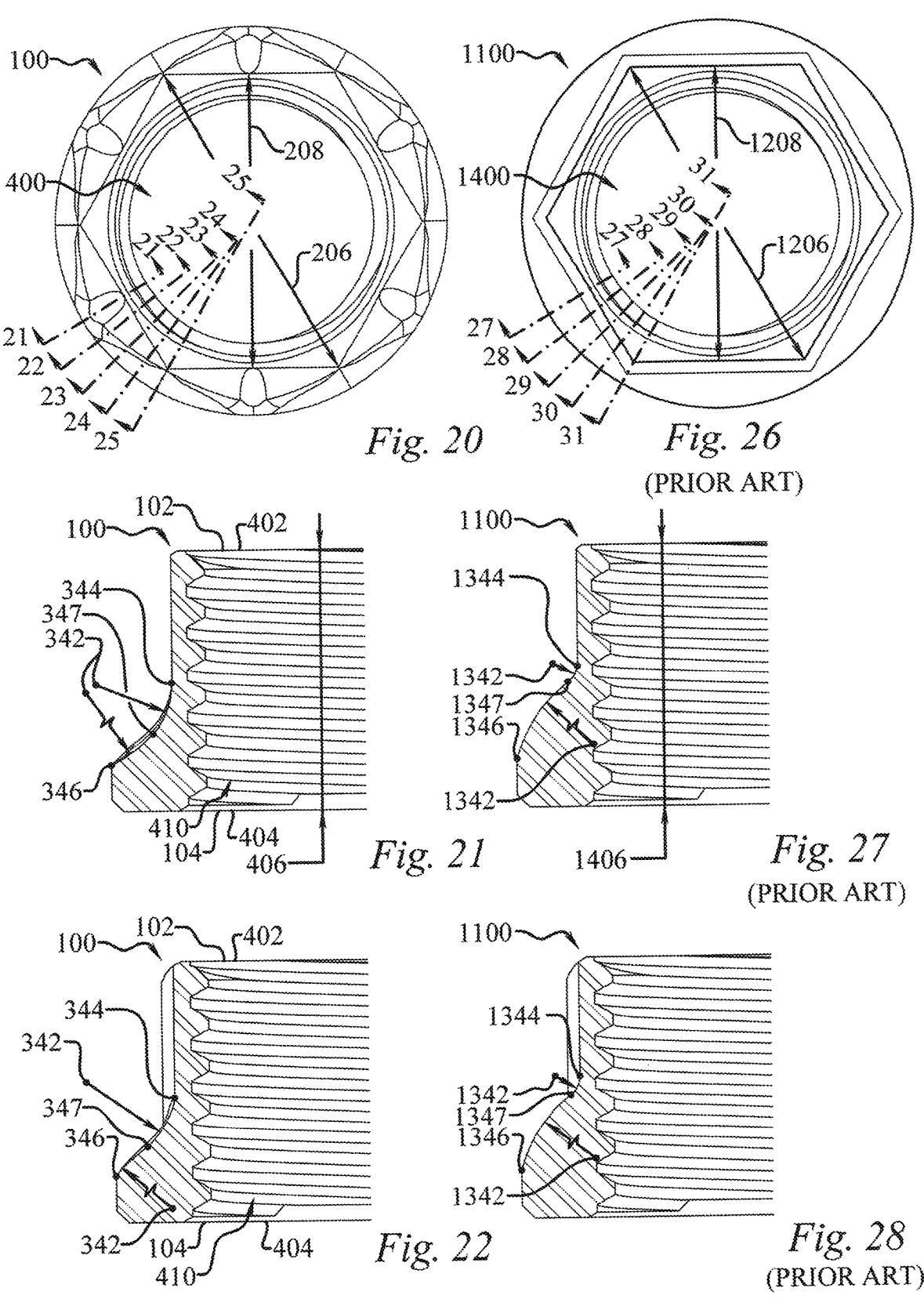
FIG. 20 is another top plan view of a nut embodiment having an enhanced flange.
FIG. 21 is a cross-section view of a nut embodiment having an enhanced flange taken along section line 21-21 in FIG. 20.
FIG. 22 is a cross-section view of a nut embodiment having an enhanced flange taken along section line 22-22 in FIG. 20.
FIG. 26 is another top plan view of a prior art nut embodiment.
FIG. 27 is a cross-section view of a prior art nut embodiment taken along section line 27-27 in FIG. 26.
FIG. 28 is a cross-section view of a prior art nut embodiment taken along section line 28-28 in FIG. 26.
Figures 23, 24, 25, 29, 30, 31:
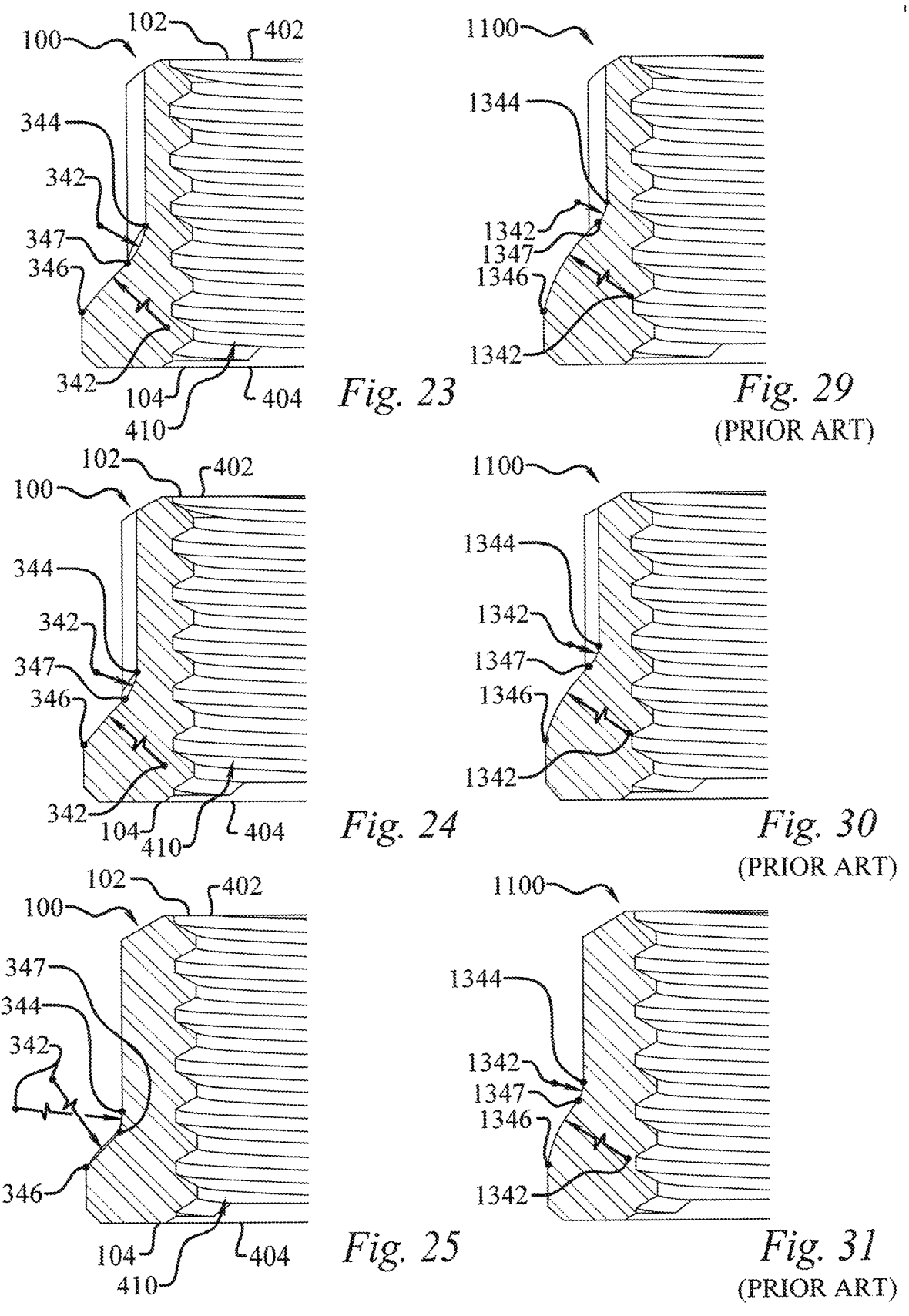
FIG. 23 is a cross-section view of a nut embodiment having an enhanced flange taken along section line 23-23 in FIG. 20.
FIG. 24 is a cross-section view of a nut embodiment having an enhanced flange taken along section line 24-24 in FIG. 20.
FIG. 25 is a cross-section view of a nut embodiment having an enhanced flange taken along section line 25-25 in FIG. 20.
FIG. 29 is a cross-section view of a prior art nut embodiment taken along section line 29-29 in FIG. 26.
FIG. 30 is a cross-section view of a prior art nut embodiment taken along section line 30-30 in FIG. 26.
FIG. 31 is a cross-section view of a prior art nut embodiment taken along section line 31-31 in FIG. 26.
Figures 32, 33:
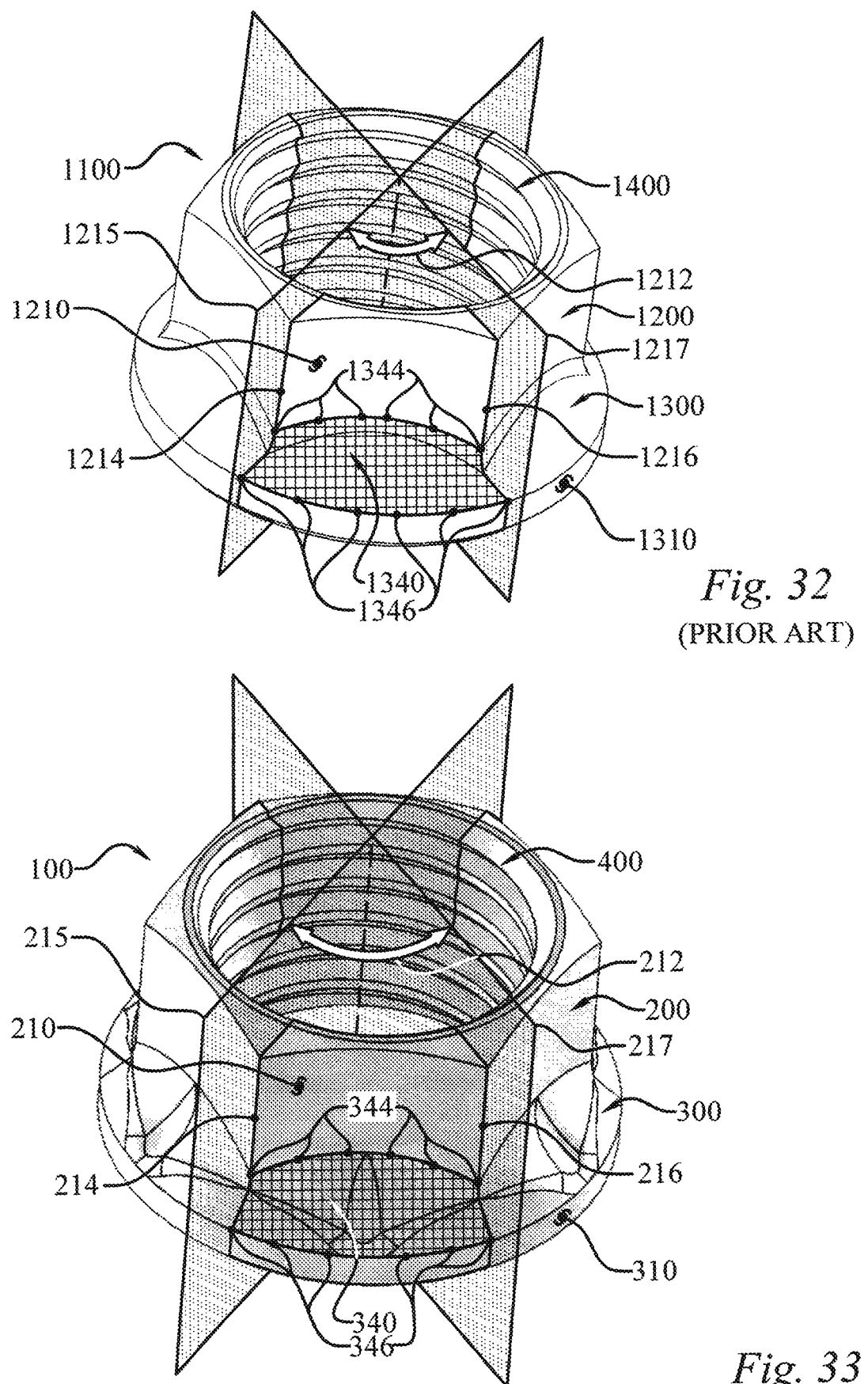
FIG. 32 is another isometric view of a prior art nut embodiment.
FIG. 33 is another isometric view of a nut embodiment having an enhanced flange.
Figures 34, 35:
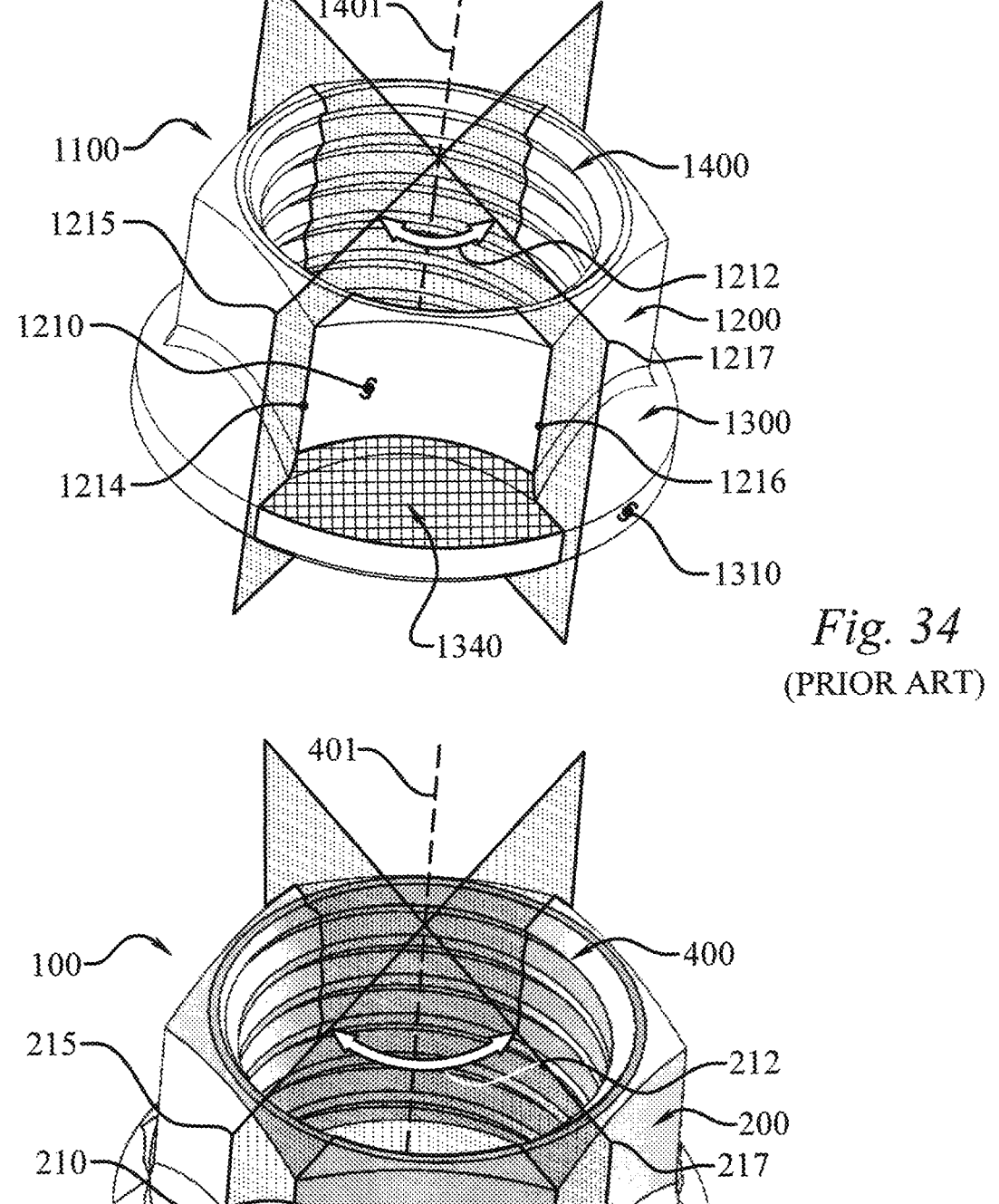
FIG. 34 is another isometric view of a prior art nut embodiment.
FIG. 35 is another isometric view of a nut embodiment having an enhanced flange.

The specification and drawings are organized so that the embodiments of the present nut are presented and described along with the prior art for the ease of describing and highlighting key differences. Thus, key nomenclature and common elements will first be described, with later disclosure going into more detailed disclosure and comparing and contrasting the features. In the specification analogous components of the prior art will be labeled with the same element number as the present invention for ease of association and comparison; however, to avoid confusion in the figures representing the prior art, the element numbers are advanced by 1000. For example, the written specification may refer to prior art nut (100), while in the figures the prior art nut is labeled (1100) to distinguish it from the newly disclosed nut (100), which is often illustrated beside the prior art nut (100) in the figures. The prior art nut (100), seen in FIG. 1, has a nut proximal end (102), a nut distal end (104), a nut length (106) that is determined by the distance between the nut proximal end (102) and the nut distal end (104), illustrated in FIGS. 5A and 5B. Furthermore, the prior art nut (100) also has a nut tool engagement area (200), abbreviated NTE, having a NTE length (201) with a NTE maximum length (202) and a NTE minimum length (204), as seen in FIG. 1, a NTE maximum width (206), and a NTE minimum width (208), as seen in FIGS. 14 and 26. Additionally, the nut tool engagement area (200) has a NTE planar surface (210) upon which a tool engages, seen in FIG. 3, which has six NTE planar surfaces (210) in the illustrated embodiment. Furthermore, the NTE planar surface (210), abbreviated NTEPS, may further have a NTEPS sinistral edge (214), a NTEPS sinistral edge plane (215), a NTEPS dextral edge (216), a NTEPS dextral edge plane (217), and a NTEPS angle (212) formed between the NTEPS sinistral edge plane (215) and the NTEPS dextral edge plane (217), as seen in FIGS. 3, 32 and 34. Furthermore, the nut (100) has a nut bore (100) with a bore longitudinal axis (401), which corresponds to where the NTEPS sinistral edge plane (215) and the NTEPS dextral edge plane (217) intersect, as seen in FIG. 34. In the example of FIG. 3, the NTEPS sinistral edge (214), as seen in FIG. 3, along with the bore longitudinal axis (401), defines the NTEPS sinistral edge plane (215), and the NTEPS dextral edge (216) and the bore longitudinal axis (410) define the NTEPS dextral edge plane (217). However, the NTEPS sinistral edge plane (215) need not correspond with the location of the NTEPS sinistral edge (214), and the NTEPS dextral edge plane (217) need not correspond with the location of the NTEPS dextral edge (216); in fact these planes are simply planes parallel with, and passing through the bore longitudinal axis (401), and used to define aspects, characteristics, and relationships of the nut (100) either in a cross-section through which the plane passes, or within a region bounded by the planes, as will become clear throughout the specification.

Figure 2:
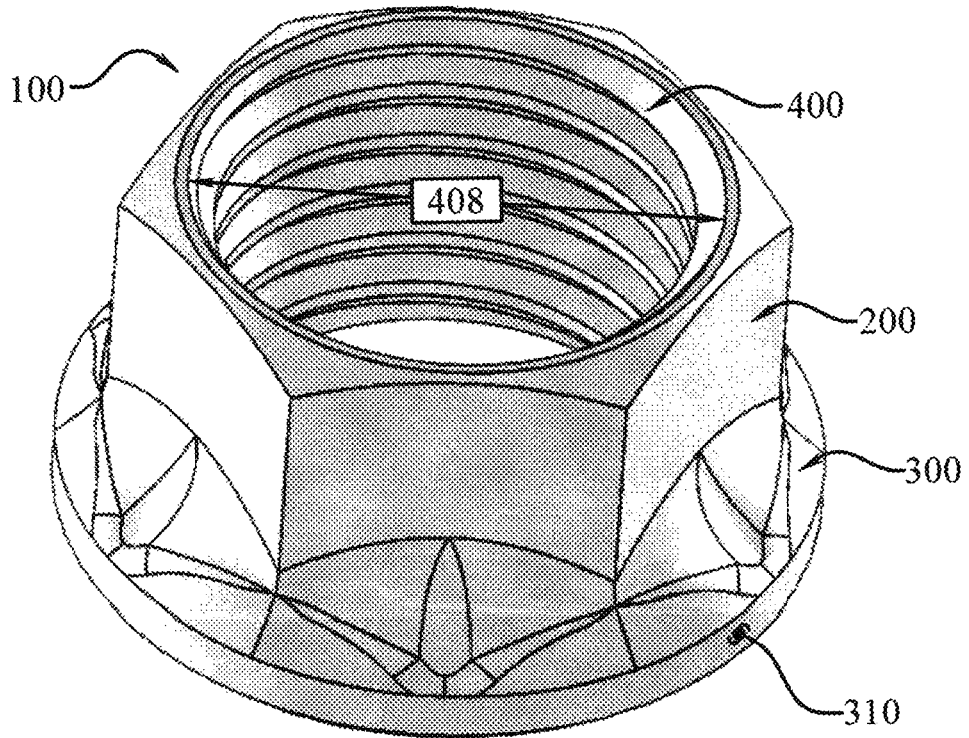
FIG. 2 is an isometric view of a nut embodiment having an enhanced flange.
Figure 6:
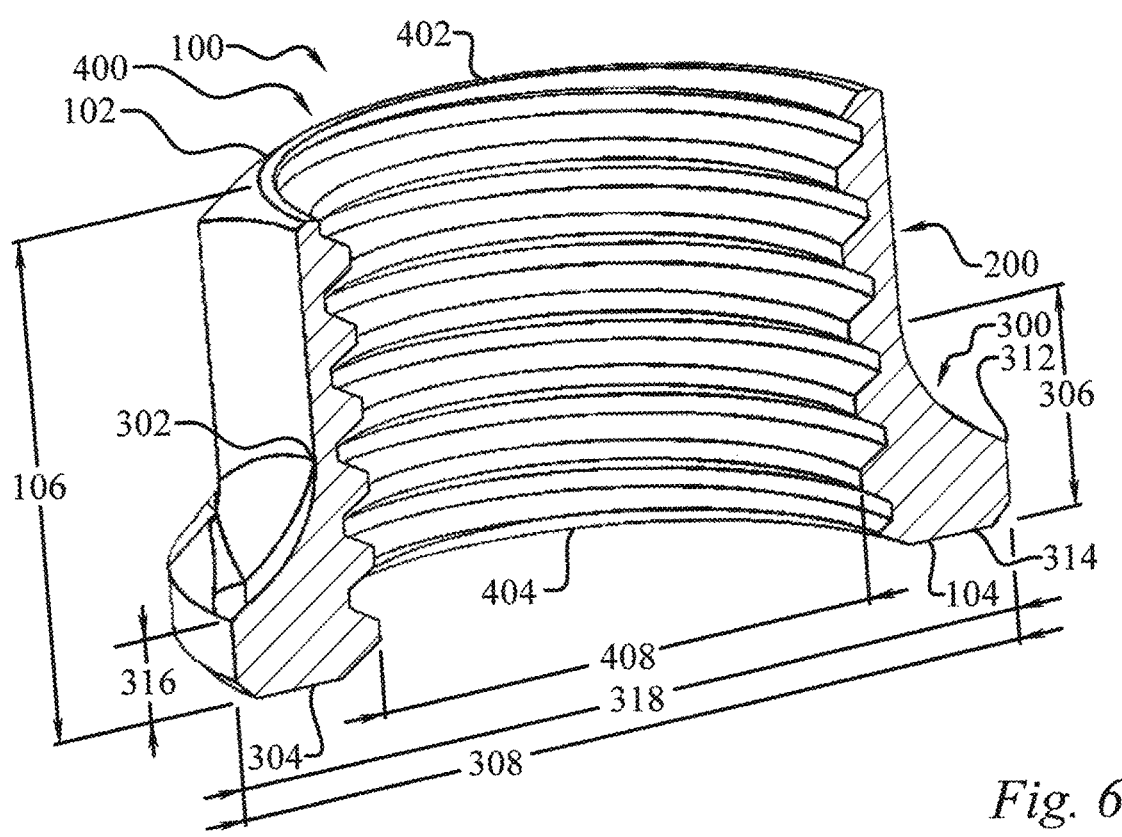
FIG. 6 is a cross-section isometric view of a nut embodiment having an enhanced flange.
Figure 7:
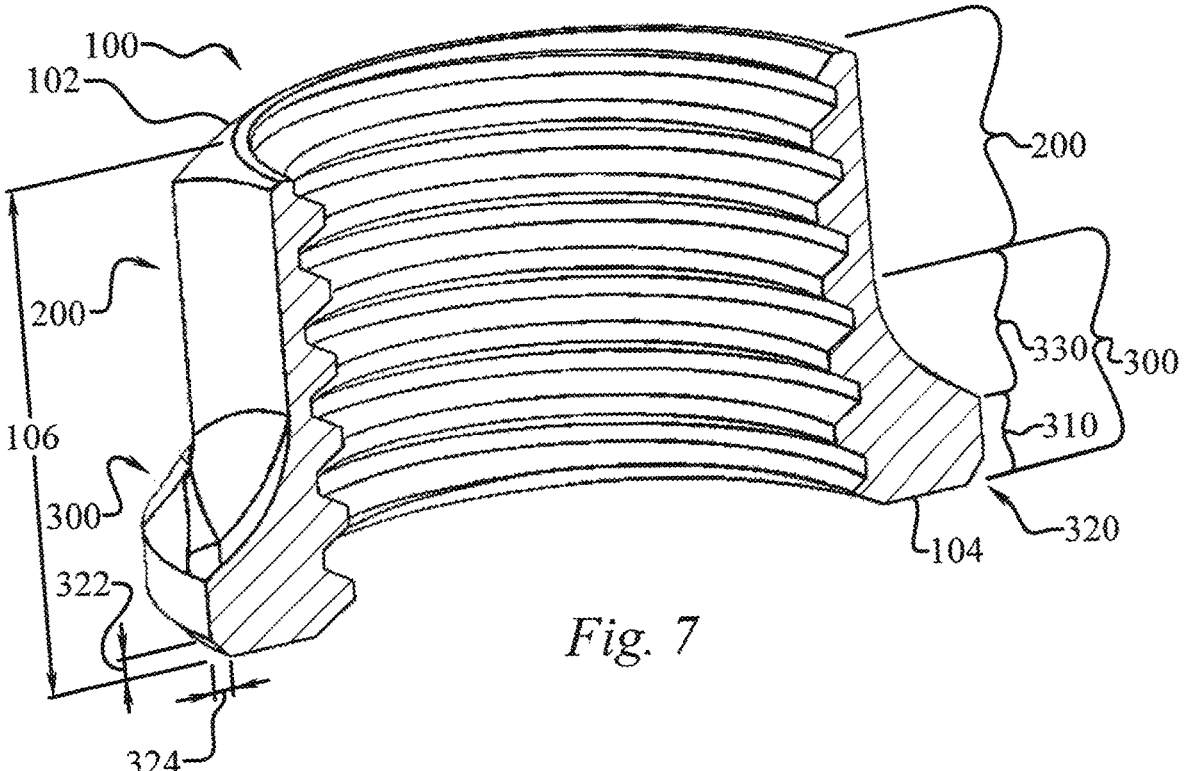
FIG. 7 is another cross-section isometric view of a nut embodiment having an enhanced flange.

Similarly, an embodiment of the present nut (100) may have a nut proximal end (102), seen in FIG. 2, a nut distal end (104), nut length (106), defined as the distance between the nut proximal end (102) and the nut distal end (104), illustrated in FIGS. 6 and 7. Additionally, the present nut embodiment (100) also has a nut tool engagement area (200), abbreviated NTE, having a NTE length (201), which may include a NTE maximum length (202) and a NTE minimum length (204), shown in FIG. 40, a NTE maximum width (206), and a NTE minimum width (208), shown in FIGS. 8 and 20, and a NTE planar surface (210) upon which a tool engages, seen in FIG. 4, which has six NTE planar surfaces (210) for ease in comparing with the prior art, but may include any of three through ninety-nine NTE planar surfaces (210). The NTE length (201) the length of the nut tool engagement area (200), measured parallel to the bore longitudinal axis (401), and may have a NTE maximum length (202) and a NTE minimum length (204), illustrated in FIG. 40.

Additionally, one embodiment of the present nut (100) may have a NTE maximum length (202) that is up to 140 percent of the NTE minimum length (204). In another embodiment the NTE maximum length (202) may be up to 130 percent of the NTE minimum length (204), and up to 120 percent of the NTE minimum length (204) in another embodiment. In another embodiment the NTE maximum length (202) is at least 5 percent greater than the NTE minimum length (204), and at least 10%, 15%, and 20% in still further embodiments.

Figure 53:
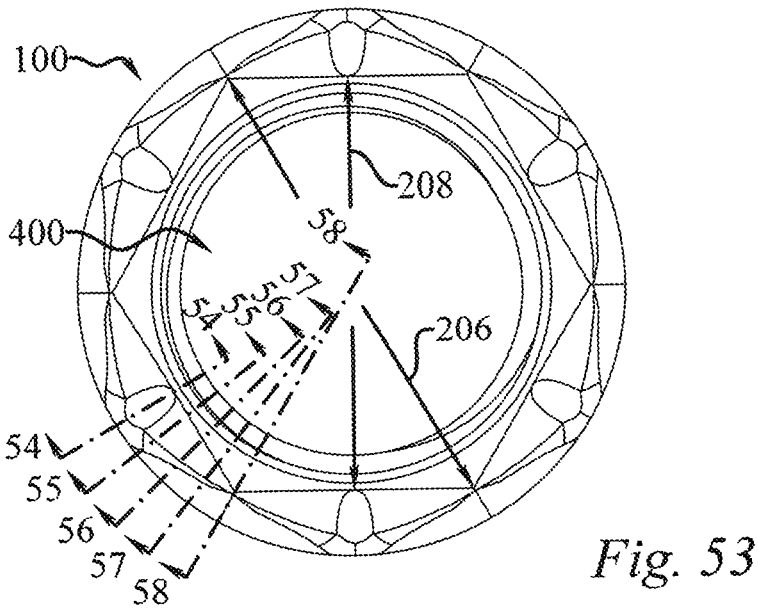
FIG. 53 is another top plan view of a nut embodiment having an enhanced flange.

Additionally, the NTE maximum width (206) is the greatest distance from one corner of the nut tool engagement area (200) to the mirror opposite corner, within a single plane orthogonal to the bore longitudinal axis (401), as illustrated in FIGS. 8, 20 and 53. Additionally, the NTE minimum width (208) is the smallest distance from one NTE planar surface (210) to the opposite NTE planar surface (210), within a single plane orthogonal to the bore longitudinal axis (401), also illustrated in FIGS. 8, 20 and 53. Furthermore, the NTE planar surface (210), abbreviated NTEPS, may further have a NTEPS sinistral edge (214), a NTEPS sinistral edge plane (215), a NTEPS dextral edge (216), a NTEPS dextral edge plane (217), and a NTEPS angle (212) formed between the intersecting NTEPS sinistral edge plane (215) and the NTEPS dextral edge plane (217), as seen in FIGS. 4, 33 and 35. Furthermore, the present nut (100) has a nut bore (400) extending into the nut (100) from the nut distal end (104), and defining the bore longitudinal axis (401), as seen in FIG. 35. The nut bore (400) need not extend all the way through the nut (100) from the nut distal end (104) to the nut proximal end (102) but may in one embodiment. In the example of FIG. 4, the NTEPS sinistral edge (214), as seen in FIG. 4, and the nut longitudinal bore (401) define the NTEPS sinistral edge plane (215) and the NTEPS dextral edge (216) and the nut longitudinal bore (401) define the NTEPS dextral edge plane (217). However, as mentioned above, the NTEPS sinistral edge plane (215) need not correspond with the location of the NTEPS sinistral edge (214), and the NTEPS dextral edge plane (217) need not correspond with the location of the NTEPS dextral edge (216), unless stated or illustrated otherwise; in fact these planes are simply planes parallel with, and passing through the bore longitudinal axis (401), and used to define aspects, characteristics, and relationships of the nut (100) either in a cross-section through which the plane passes, or within a region bounded by the planes, as will become clear throughout the specification.

Figure 5A:
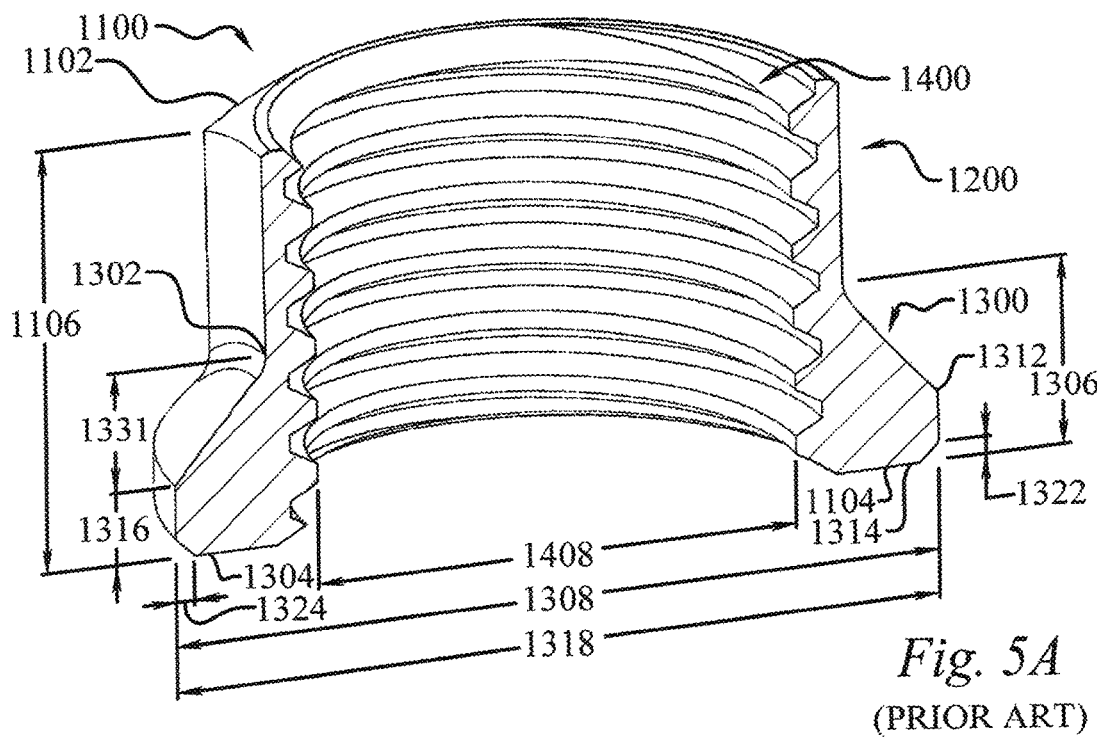
FIG. 5A is a cross-section isometric view of a prior art nut embodiment.

For the sake of completeness, the prior art nut (100) also has a nut bore (400) having a nut bore proximal end (402), a nut bore distal end (404), a nut bore length (406), defined as the distance between the nut bore proximal end (402) and the nut bore distal end (404), a nut bore width (408), as best seen in FIGS. 5A and 15. A nut bore thread (410), abbreviated NBT, is located within the nut bore (400), seen in FIGS. 15-19 and 27-31. The nut bore thread (410) having a NBT crest (412), a NBT root (414), a NBT pitch cylinder (416) which is located at the midpoint between the NBT crest (412) and the NBT root (414) and the NBT flank (418), best seen in FIGS. 14-19. The NBT flank (418) abuts the surface on the bolt thread (610). The distance between the NTE planar surface (210) and the NBT crest (412) define a NBT crest wall thickness (422). Additionally, the distance between the NTE planar surface (210) and the NBT root (414) defines a NBT root wall thickness (424). And in similar fashion, the distance between the NTE planar surface (210) and the NBT pitch cylinder (416) define a NBT pitch cylinder wall thickness (426), as best seen in FIGS. 14-19. These prior art nut thicknesses (422, 424, 426) will be later contrasted with those of the present nut (100).

The prior art nut (100) also has a nut flange (300), seen in FIGS. 1 and 3, which spreads the clamping force of the nut over a larger surface area, thereby reducing the likelihood of structural fatigue failure. The nut flange (300) has nut flange proximal end (302), at the intersection with the NTE planar surface (210), a nut flange distal end (304), a nut flange length (306), defined as the distance between the nut flange proximal end (302) and the nut flange distal end (304), measured parallel to the bore longitudinal axis (401), and a nut flange width (308), illustrated in FIG. 5A. Further, the nut flange (300) generally has a nut flange seat (310), abbreviated NFS, having a NFS proximal end (312), a NFS distal end (314), a NFS length (316), defined as the distance between the NFS proximal end (312) and the NFS distal end (314), measured parallel to the bore longitudinal axis (401), and a NFS width (318), seen in FIG. 5A. Additionally, the nut flange seat (310) may have a NFS edge taper (320) having a NFS edge taper length (322) and a NFS edge taper width (324), illustrated in 5A and 5B.

Similarly, an embodiment of the present nut (100) may also have a nut flange (300), seen in FIGS. 2 and 4, which spreads the clamping force of the nut over a larger surface area, thereby reducing the likelihood of structural fatigue failure. The nut flange (300) may have a nut flange proximal end (302), at the intersection with the NTE planar surface (210), a nut flange distal end (304), a nut flange length (306), defined as the distance between the nut flange proximal end (302) and the nut flange distal end (304), measured parallel to the bore longitudinal axis (401), and a nut flange width (308), illustrated in FIG. 6. Further, the nut flange (300) may have a nut flange seat (310), abbreviated NFS, having a NFS proximal end (312), a NFS distal end (314), a NFS length (316), defined as the distance between the NFS proximal end (312) and the NFS distal end (314), measured parallel to the bore longitudinal axis (401), and a NFS width (318), illustrated in FIG. 6. One embodiment of the present nut (100) may have a NFS length (316) that is less than or equal to 60 percent of the nut flange length (306), and in further embodiments less than or equal to 55%, 50%, 45%, 40%, and 35%. In another embodiment the NFS length (316) is at least 15 percent of the nut flange length (306), and in further embodiment is at least 20%, 25%, and 30%. Further, in the illustrated embodiment of the present nut (100), seen in FIG. 6, the nut flange width (308) and the NFS width (318) are substantially the same. In one embodiment the nut flange (300) and/or the nut flange seat (310) are round in shape when viewed from above as in FIG. 8, however the shape may be other than round including, but not limited to, matching a shape of the NTE planar surfaces (210). Additionally, the nut flange seat (310) may have a NFS edge taper (320) which may further include a NFS edge taper length (322), again measured parallel to the bore longitudinal axis (401), and a NFS edge taper width (324), illustrated in 6 and 7. The NFS edge taper (320) helps prevent the nut (100) from cutting or digging into the part being fastened by the nut (100). In one embodiment of the present nut (100), the NFS edge taper length (322) may be less than or equal to 30 percent of the nut flange length (306), and in further embodiments less than or equal to 30%, 25%, and 20%. In yet another embodiment, the NFS edge taper length (322) may be greater than or equal to 3 percent of the nut flange length (306), and in further embodiments at least 5%, 7.5%, and 10%. Furthermore, in one embodiment of the present nut (100), the NFS edge taper width (324), seen in FIG. 7, may be less than or equal to 5 percent of the NFS width (318), seen in FIG. 6, and in further embodiments no more than 4%, 3%, 2.5%, and 2%.

In addition to the nut flange (300), the prior art nut (100) also has a nut transition area (330) that is generally a flat surface or bulges outward, meaning the surface is concave toward the center of the nut); in fact, military nut specifications, such as Military Specification MS21042, often specify this limitation. The nut transition area (330) has a transition length (331), measured parallel to the bore longitudinal axis (401) as seen in FIG. 5A, which may vary between a maximum transition length (332), seen in FIG. 5B, and a minimum transition length (333), seen in FIG. 36, and a transition surface (340), seen in FIGS. 32 and 34. Furthermore, the nut flange seat (310) and the nut transition area (330), when present, are included in the nut flange length (306), seen in FIGS. 5A and 5B. As seen in FIGS. 32 and 34, the transition surface (340) is located between the NTEPS sinistral edge plane (215) and a NTEPS dextral edge plane (217), defining the horizontal boundaries of the transition surface (340), and a plurality of transition planar deviation points upper (344) and the plurality of transition planar deviation points lower (346), defining the upper and lower vertical boundaries of the transition surface (340). Additionally, each of the plurality of transition planar deviation points upper (344) and the plurality of transition planar deviation points lower (346) corresponds to where the NTEPS sinistral edge plane (215) or the NTEPS dextral edge plane (217) vertically passes through the transition surface (340). Furthermore, depending on the location of the intersecting plane, the transition surface (340) will have at least one transition radius of curvature (342), as seen in FIGS. 27-32, and 59-64. Additionally, the prior art nut (100) may also have a plurality of inflection points (347) located between the plurality of transition planar deviation points upper (344) and the plurality of transition planar deviation points lower (346) were the transition radius of curvature (342) changes from a first transition radius of curvature (342) to a second transition radius of curvature (342), as seen in cross-sectional FIGS. 60-64. Furthermore, the prior art nut transition area (330), seen in FIG. 5B, may have an inflection separation distance upper (348), seen in FIGS. 60-64, that is the minimum distance between a transition planar deviation points upper (344) and the corresponding inflection point (347) through which the NTEPS sinistral edge plane (215), the NTEPS dextral edge plane (217), or a plane between them, passes. In addition to the inflection separation distance upper (348), the prior art nut (100) nut transition area (330) may have an inflection separation distance lower (349), also seen in FIGS. 60-64, defined as the minimum distance between a transition planar deviation points lower (346) and the corresponding inflection point (347), through which the NTEPS sinistral edge plane (215), the NTEPS dextral edge plane (217), or a plane between them, passes.

Within any one section, true of the prior art nut and the embodiments of the present invention, the transition planar deviation point upper (344) and the transition planar deviation point lower (346) are easily identifiable as the point at which the exterior surface of the nut first transitions from a flat surface. Within any one section, true of the prior art nut and the embodiments of the present invention, the transition radius of curvature (342) is determined via a best fit line connecting 5 points spaced apart 0.1 mm along a curved surface of the nut, unless noted otherwise, with the transition radius of curvature (342) being the radius of curvature of the best fit line. Likewise, within any one section, true of the prior art nut and the embodiments of the present invention, an inflection point (347) occurs between the plurality of transition planar deviation points upper (344) and the plurality of transition planar deviation points lower (346) at a change in concavity, such as in FIG. 60 where the inflection point (347) is where the curvature changes from concave outward to concave inward, or where the transition radius of curvature (342) changes from a first transition radius of curvature (342) to a second transition radius of curvature (342), with the second transition radius of curvature (342) being at least 5% different than the first transition radius of curvature (342). Unless stated otherwise, for the purpose of this disclosure the first transition radius of curvature (342) begins at the transition planar deviation point upper (344). For example, in the embodiment of FIG. 54 the curvature is fairly consistent starting at the transition planar deviation point upper (344), such that each radius of curvature (342), using the 5-point method described, is within 5% of the adjacent radius of curvature (342), until the inflection point (347), at which point adjacent radii of curvature differ by 5% or more.

It should be noted that an inflection point (347) is not required. For instance, in FIG. 54 the two illustrated radius of curvature (342) may vary by less than 5%, or may be identical, and therefore this section may not contain an inflection point (347). Further, much of the disclosure references characteristics of a radius of curvature (342) in contact with a transition planar deviation point upper (344), however all of the disclosure applies to a radius of curvature (342) in contact with a transition planar deviation point lower (346), and/or any radius of curvature (342) between a transition planar deviation point upper (344) and a transition planar deviation point lower (346). Further, as will become apparent, the goals of the present nut (100) may be achieved without distinct radius of curvature (342), but rather with a plurality of straight segments meeting the disclosed relationships. In such embodiments the inflection point (347) is a point where a first slope of a line segment beginning at a transition planar deviation point upper (344) changes to a second line segment with a second slope that differs from the first slope by at least 5%. Therefore, with continued reference to FIG. 54, another way to describe a characteristic of the nut transition area (330) is with an embodiment whereby an imaginary straight line extends from a transition planar deviation point upper (344) to a transition planar deviation point lower (346), whereby an inflection point (347) is located between the imaginary straight line and the bore longitudinal axis (401). In a further embodiment an inflection point offset distance exists between the imaginary straight line and the inflection point (347), and measured perpendicular to the imaginary straight line, and the inflection point offset distance is at least a predetermine percentage of the NBT root wall thickness (424), located within the nut tool engagement area (200), as illustrated in FIG. 9. In one embodiment the predetermined percentage is at least 2.5%, while in further embodiments it is at least 5%, 7.5%, 10%, 12.5%, and 15%. A further series of embodiments the inflection point offset distance is no more than a predetermine percentage of the NBT root wall thickness (424), located within the nut tool engagement area (200), as illustrated in FIG. 9, and in one embodiment the predetermined percentage is 100%, while in further embodiments it is 90%, 80%, 70%, 60%, and 50%.

Figures 36, 37:
FIG. 36 is another isometric view of a prior art nut embodiment.
FIG. 37 is another isometric view of a nut embodiment having an enhanced flange.

The prior art nut (100) such as in the embodiment of the MS1042 Size 4 nut has a transition radius of curvature (342) that is typically around 0.020 inches and positive throughout, illustrated in FIGS. 26-31 and 59-64. Furthermore, the prior art nut (100) embodiment has an inflection separation distance upper (348), seen best in FIGS. 60-64, that is typically less than or equal to 0.020 inches, and an inflection separation distance lower (349) that is typically greater than or equal to 0.045 inch. Additionally, with reference now to FIGS. 36 and 38, the prior art nut (100) may also have a controlled curvature region (350), abbreviated CCR, that may have a CCR sinistral edge (354) through which a CCR sinistral edge plane (355) may also be superimposed, a CCR dextral edge (356) through which a CCR dextral edge plane (357) may also be superimposed, a CCR angle (352) between the intersecting CCR sinistral edge plane (355) and the CCR dextral edge plane (357), which will later be used in defining the controlled curvature region (350). Additionally, the CCR sinistral edge (354) will pass through a transition planar deviation point upper (344) and a corresponding transition planar deviation point lower (346), as seen in FIG. 36. Similarly, the CCR dextral edge (356) will pass through a transition planar deviation point upper (344) and a corresponding transition planar deviation point lower (346), also seen in FIG. 36. In the illustrated embodiment, the CCR angle (352) may be any angle up to 60 degrees and defines the controlled curvature region (350), because the illustrated embodiment is a 6 sided nut (100). The CCR sinistral edge plane (355) and CCR dextral edge plane (357) each define a new segment of the transition surface (340) having at least one transition radius of curvature (342), as seen in FIGS. 36, 38, and 59-64.

Figure 59:
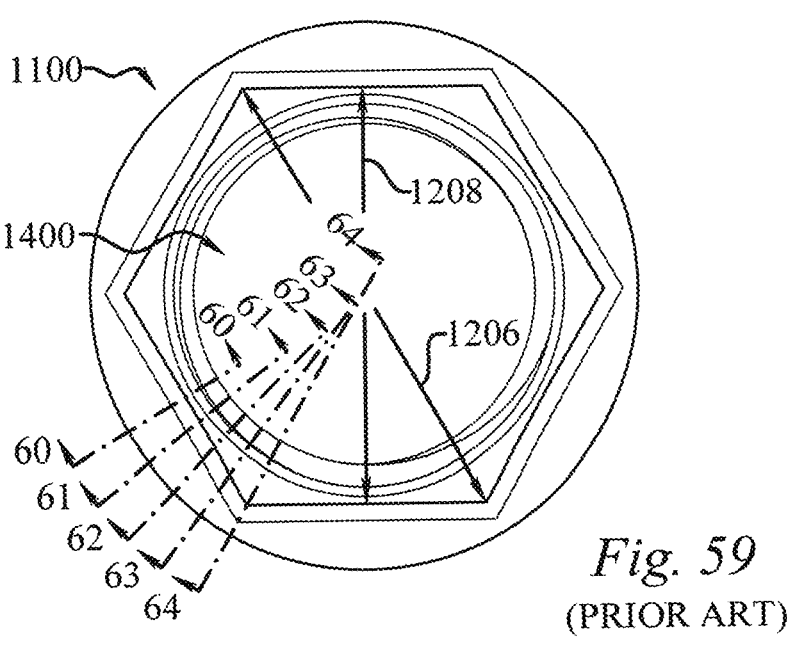
FIG. 59 is another top plan view of a prior art nut embodiment.
Figures 54, 60:
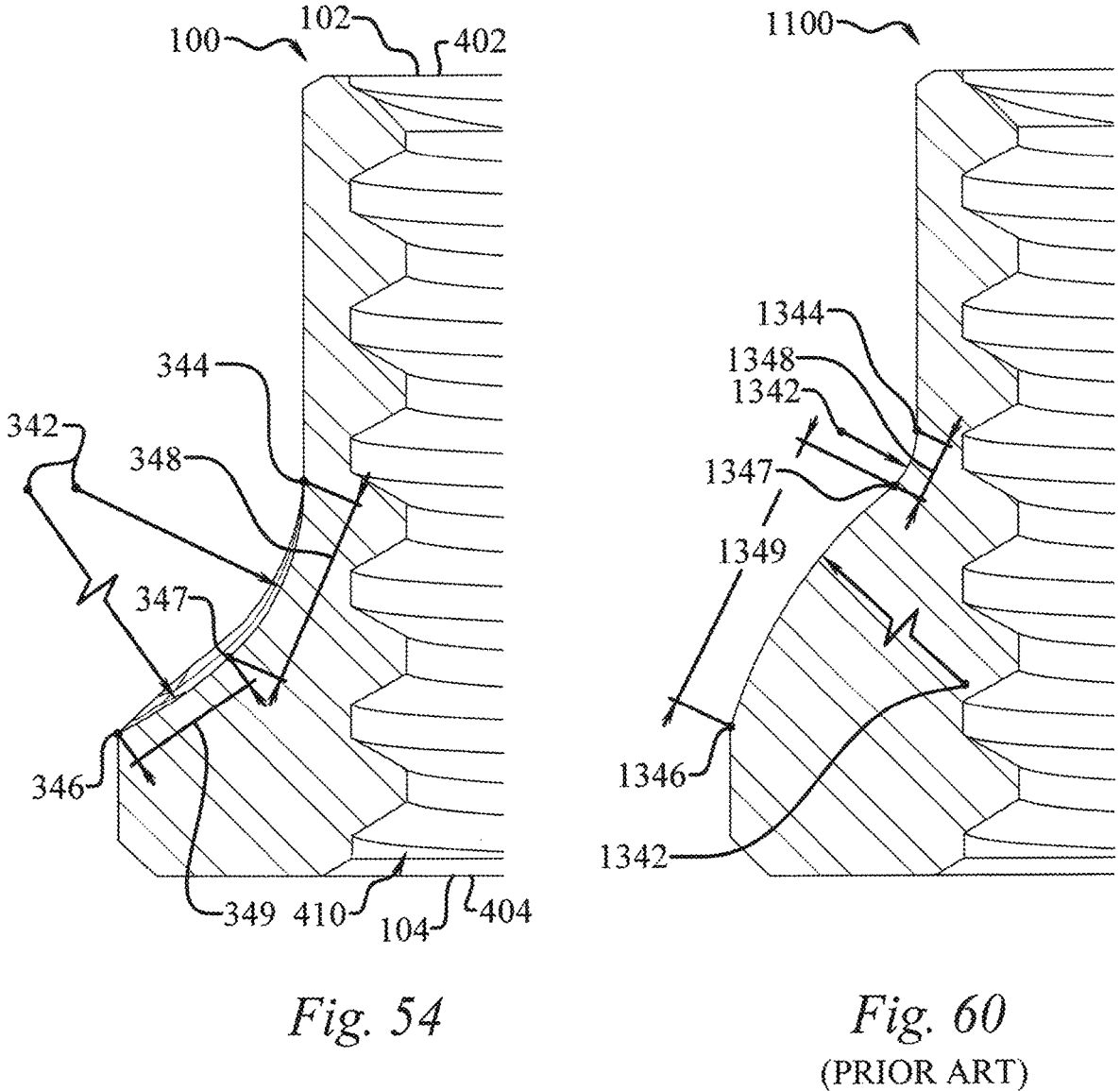
FIG. 54 is a cross-section view of a nut embodiment having an enhanced flange taken along section line 54-54 in FIG. 53.
FIG. 60 is a cross-section view of a prior art nut embodiment taken along section line 60-60 in FIG. 59.
Figures 55, 61:
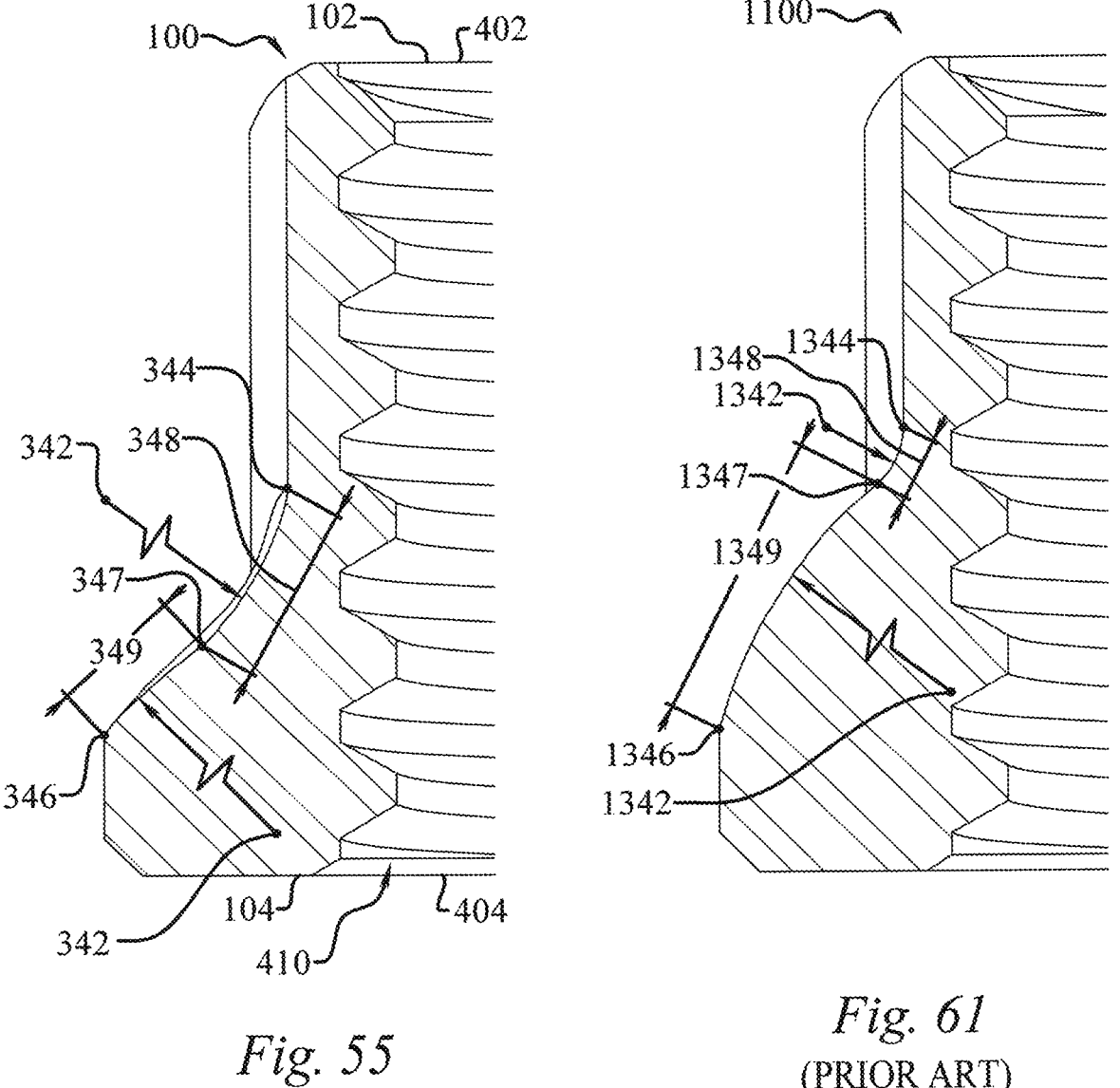
FIG. 55 is a cross-section view of a nut embodiment having an enhanced flange taken along section line 55-55 in FIG. 53.
FIG. 61 is a cross-section view of a prior art nut embodiment taken along section line 61-61 in FIG. 59.
Figures 56, 62:
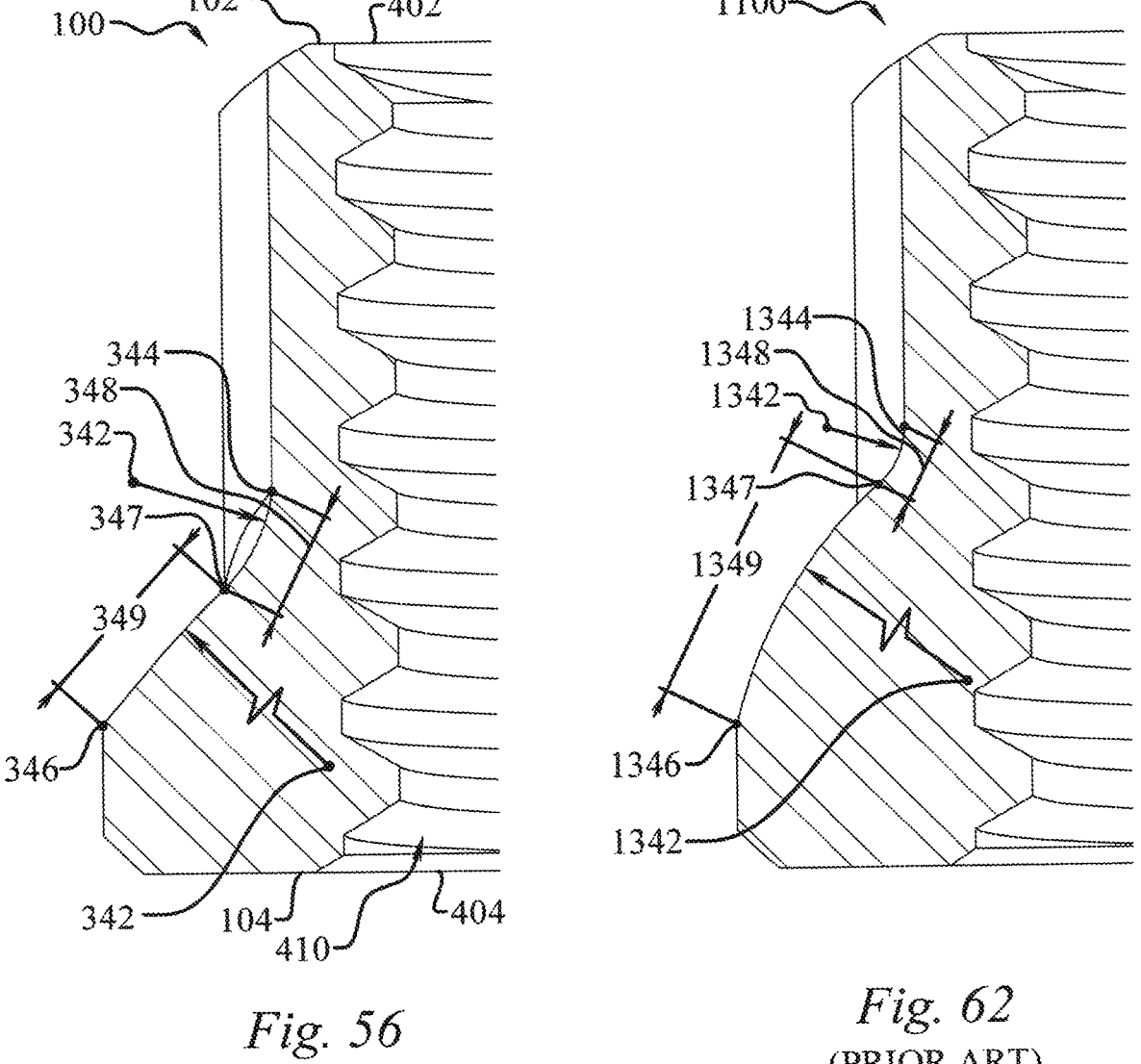
FIG. 56 is a cross-section view of a nut embodiment having an enhanced flange taken along section line 56-56 in FIG. 53.
FIG. 62 is a cross-section view of a prior art nut embodiment taken along section line 62-62 in FIG. 59.
Figures 57, 63:
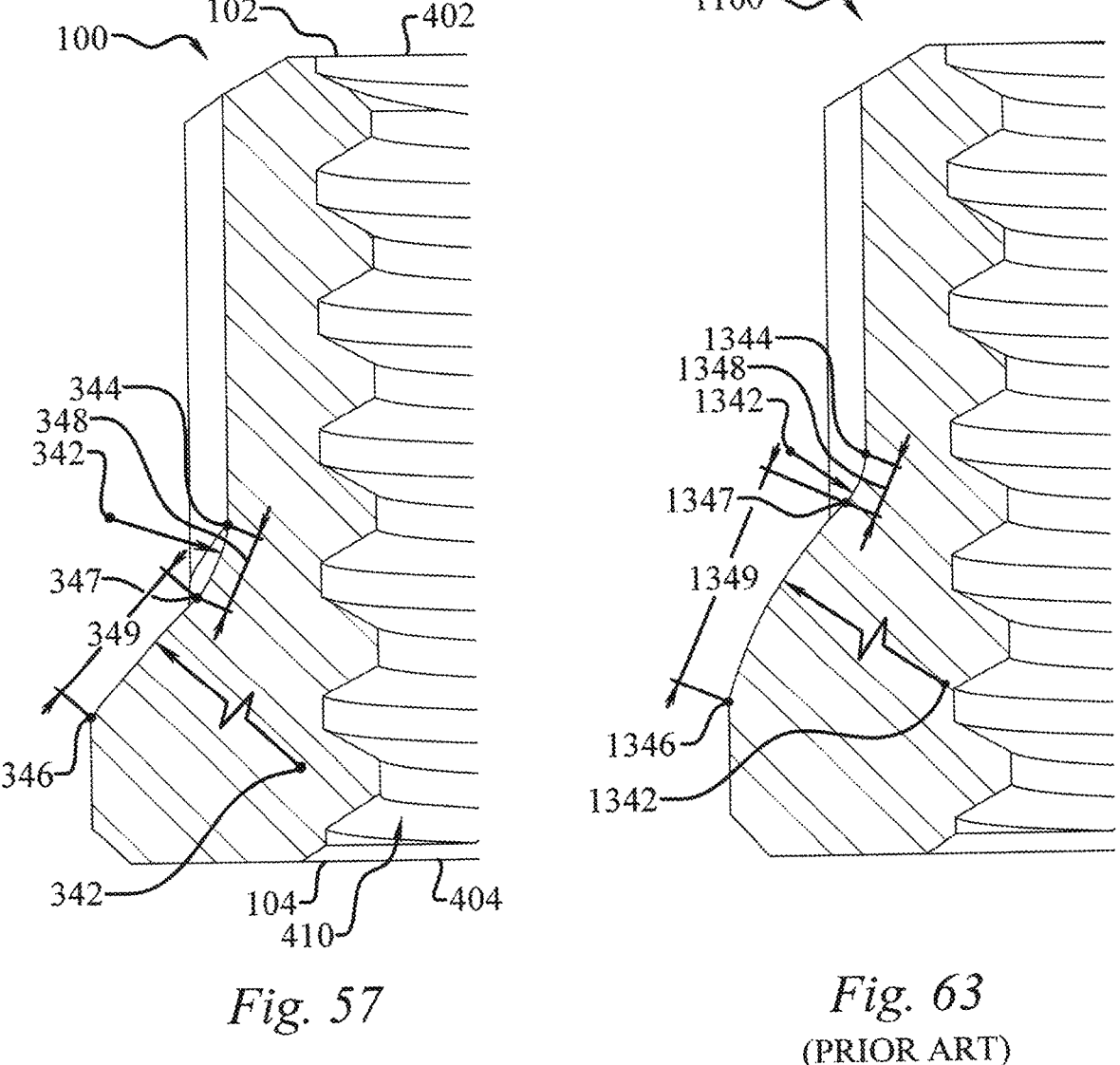
FIG. 57 is a cross-section view of a nut embodiment having an enhanced flange taken along section line 57-57 in FIG. 53.
FIG. 63 is a cross-section view of a prior art nut embodiment taken along section line 63-63 in FIG. 59.
Figures 58, 64:
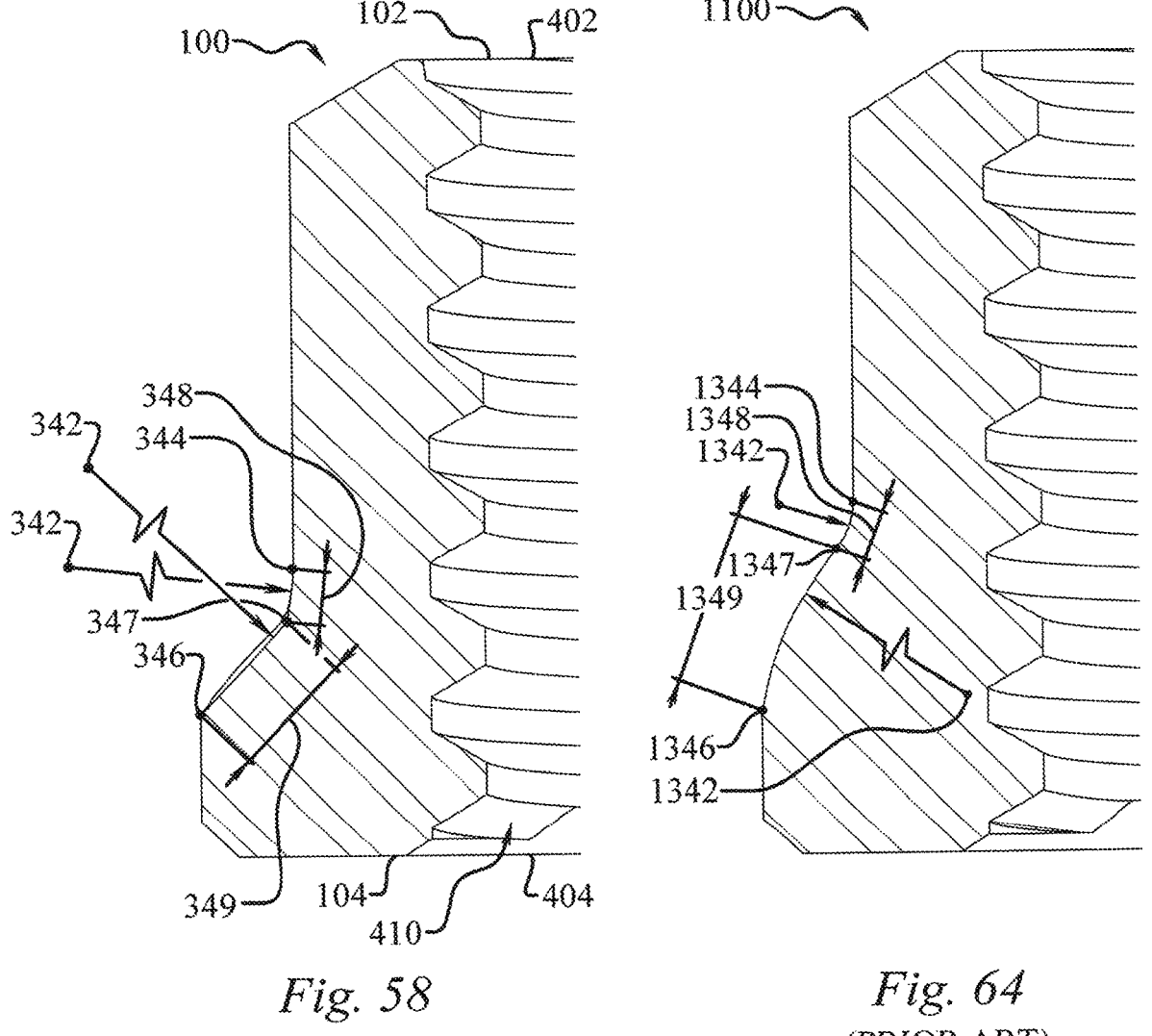
FIG. 58 is a cross-section view of a nut embodiment having an enhanced flange taken along section line 58-58 in FIG. 53.
FIG. 64 is a cross-section view of a prior art nut embodiment taken along section line 64-64 in FIG. 59.

As seen in FIGS. 26 and 59, and associated sections 27-31 and 60-64, the transition radius of curvature (342) is concave outward, as seen in the upper portion FIG. 60 between the transition planar deviation point upper (344) and the inflection point (347), and has a positive value, when the transition radius of curvature (342) extends from the transition surface (340) outward towards the center point of the transition radius of curvature (342). Additionally, a concave inward transition radius of curvature (342), and has a negative value, when the transition radius of curvature (342) extends from the transition surface (340) inward towards, or across a bore longitudinal axis (401), as seen in the lower portion FIG. 60 between the transition planar deviation point lower (346) and the inflection point (347). The prior art nut (100) may have any CCR angle (352) from 0 to 60 degrees within a NTEPS angle (212), seen in FIG. 32. For instance, the prior art nut (100) shown in FIG. 59 has five separate section lines, 60-64, shown. Additionally, a CCR angle (352) is formed between any two of the section lines. For example, section line 60 and section line 61 meet to form a 7.5 degree CCR angle (352), section line 60 and section line 62 meet to form a 15 degree CCR angle (352), section line 60 and section line 63 meet to form a 22.5 degree CCR angle (352), and section line 60 and section line 64 meet to form a 30 degree CCR angle (352). Furthermore, the CCR angle (352) may start with any section line shown in FIG. 59, and is not limited to starting with section line 60. For instance, section line 62 and section line 63 may meet to form a 7.5 degree CCR angle (352).

Figure 40:
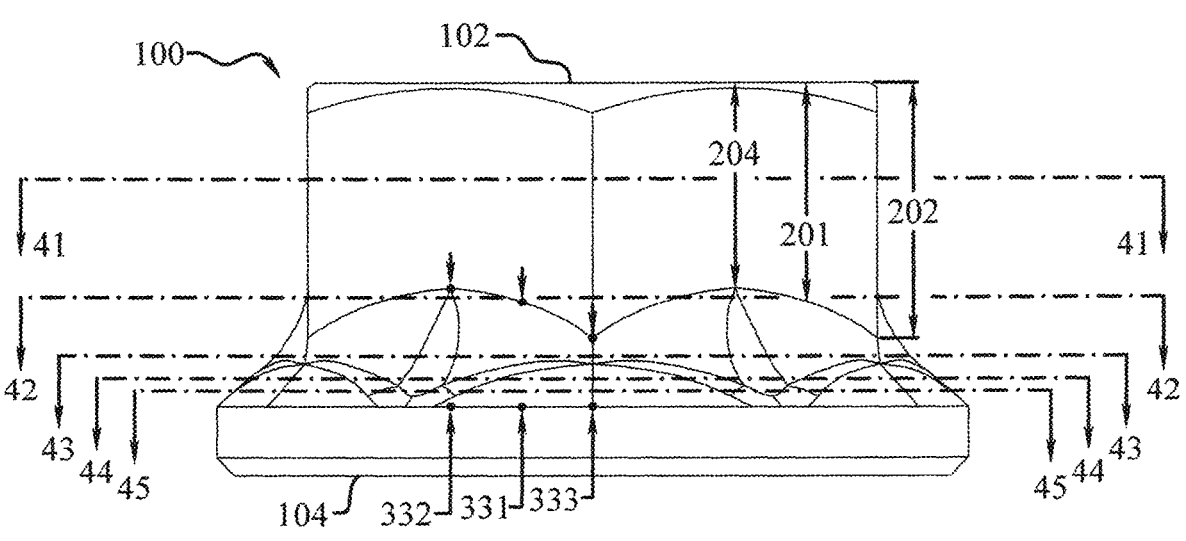
FIG. 40 is side elevation view of a nut embodiment having an enhanced flange.

An embodiment of the present nut (100) may have a nut transition area (330) having a transition length (331), measured parallel to the bore longitudinal axis (401), which, as seen in FIG. 40, may vary between a maximum transition length (332) and a minimum transition length (333), and a transition surface (340), seen in FIGS. 7, 33 and 40. One embodiment of the present nut (100) has a maximum transition length (332) that is at least 25% greater than the minimum transition length (333), and in further embodiments at least 30%, 35%, 40%, 45%, and 50% greater. In another series of embodiments the maximum transition length (332) is no more than 125% greater than the minimum transition length (333), and in further embodiments no more than 115% greater, 100% greater, 90% greater, 80% greater, and 70% greater. In another embodiment the minimum transition length (333) is at least 7.5% of the nut length (106), and in further embodiments at least 10%, 12.5%, 15%, and 17.5%. A further series of embodiments caps this relationship with a minimum transition length (333) that is no more than 40% of the nut length (106), and in further embodiments no more than 35%, 30%, 25%, and 20%. In another embodiment the maximum transition length (332) is at least 10% of the nut length (106), and in further embodiments at least 15%, 20%, 25%, and 30%. A further series of embodiments caps this relationship with a maximum transition length (332) that is no more than 75% of the nut length (106), and in further embodiments no more than 65%, 55%, 50%, and 45%. In one embodiment the minimum transition length (333) is greater than the NFS length (316), while the maximum transition length (332) is less than the minimum NTE length (204).

As seen in FIGS. 33 and 35 the transition surface (340) of the present nut (100) is located between the NTEPS sinistral edge plane (215) and a NTEPS dextral edge plane (217), defining the horizontal boundaries of the transition surface (340), and a plurality of transition planar deviation points upper (344) and the plurality of transition planar deviation points lower (346) define the vertical boundaries of the transition surface (340), as seen in FIGS. 33 and 35. Further, each of the plurality of transition planar deviation points upper (344) and the plurality of transition planar deviation points lower (346) corresponds to where the NTEPS sinistral edge plane (215) or the NTEPS dextral edge plane (217) vertically passes through the transition surface (340), as seen in FIGS. 33 and 37. Furthermore, depending on the location of the intersecting plane, the transition surface (340) will have at least one transition radius of curvature (342), as seen in FIGS. 20-25 and 53-58. Additionally, the present nut (100) embodiment may also have a plurality of inflection points (347) located between the plurality of transition planar deviation points upper (344) and the plurality of transition planar deviation points lower (346) were the transition radius of curvature (342) changes to from a first transition radius of curvature (342) to a second transition radius of curvature (342), as seen in cross-sectional FIGS.

54-58. Furthermore, the present nut (100) embodiment nut transition area (330), seen in FIG. 7, may have an inflection separation distance upper (348), seen in FIGS. 54-58, that is the minimum distance between a transition planar deviation point upper (344) and the corresponding inflection point (347) through which the NTEPS sinistral edge plane (215), the NTEPS dextral edge plane (217), or a plane between them, passes. In addition to the inflection separation distance upper (348), the present nut (100) embodiment nut transition area (330) may have an inflection separation distance lower (349), also seen in FIGS. 54-58, defined as the minimum distance between a transition planar deviation point lower (346) and the corresponding inflection point (347), through which the NTEPS sinistral edge plane (215), the NTEPS dextral edge plane (217), or a plane between them, passes.

Figures 38, 39:
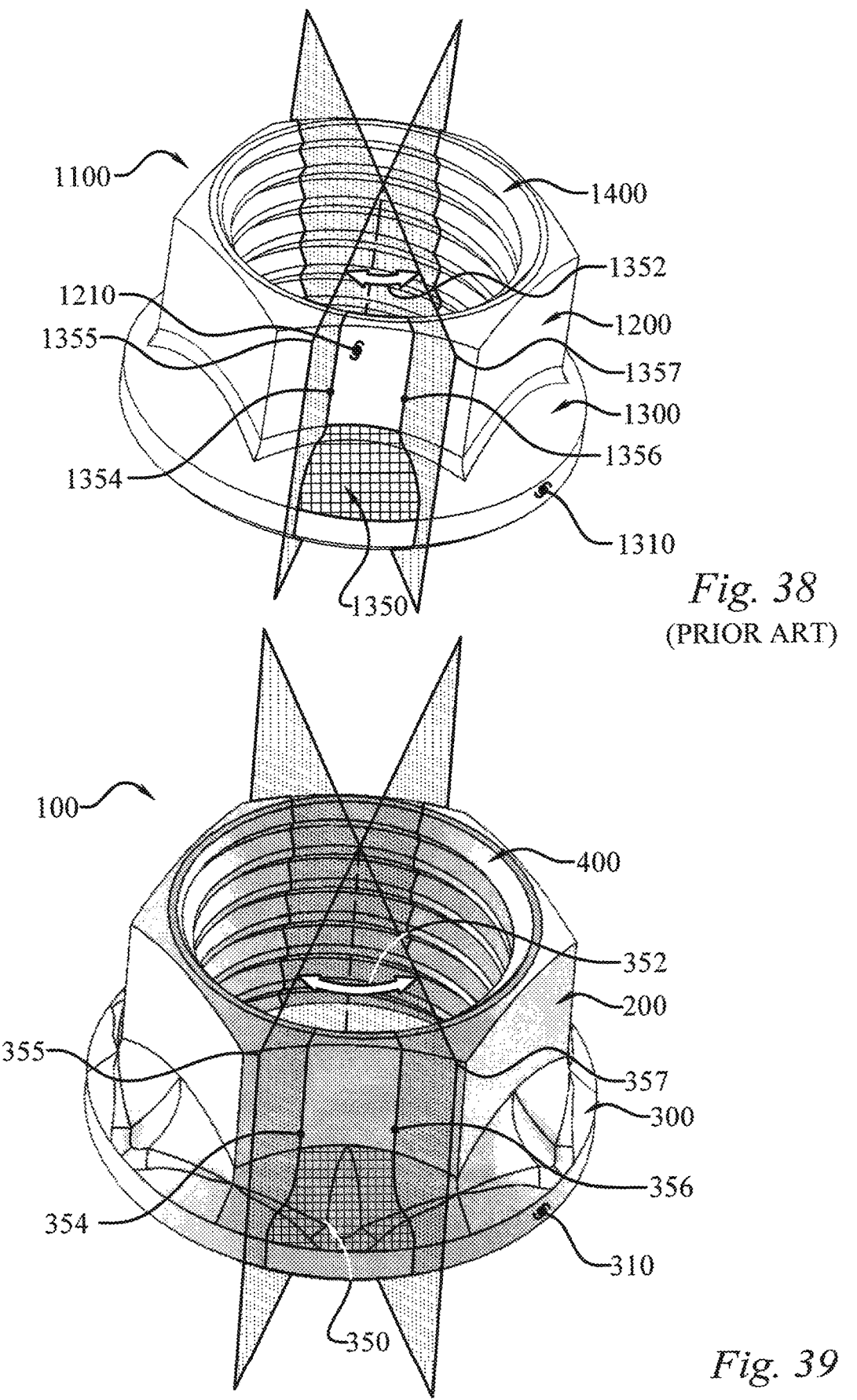
FIG. 38 is another isometric view of a prior art nut embodiment.
FIG. 39 is another isometric view of a nut embodiment having an enhanced flange.

Like the prior art disclosure, as seen in FIGS. 37 and 39, an embodiment of the present nut (100) may also have a controlled curvature region (350), abbreviated CCR, that may have a CCR sinistral edge (354) through which a CCR sinistral edge plane (355) passes, a CCR dextral edge (356) through which a CCR dextral edge plane (357) passes, and a CCR angle (352) formed between the intersecting CCR sinistral edge plane (355) and the CCR dextral edge plane (357). Defining the controlled curvature region (350) is helpful in defining certain aspects of the nut (100) within specific areas. In the 6-sided illustrated embodiment of FIG. 37, the CCR angle (352) may be any angle up to 60 degrees and defines the controlled curvature region (350), while in a 3-sided embodiment the CCR angle (352) may be any angle up to 120 degrees, while in a 4-sided embodiment the CCR angle (352) may be any angle up to 90 degrees, and so on. Thus, any of the disclosed curvatures, dimensions, and/or relationships discussed with respect to a single section may be true in further embodiments wherein they are true for each section within a CCR angle (352) or as otherwise disclosed. For example, with reference to FIG. 20 again, the region between section lines 21-21 and 22-22 may be a first CCR angle (352) of 7.5 degrees and define a first controlled curvature region (350) associated with a first side of the tool engagement area (200), similarly the region between section lines 22-22 and 23-23 may be a second CCR angle (352) of 7.5 degrees and define a second controlled curvature region (350) associated with the first side of the tool engagement area (200), likewise the region between section lines 23-23 and 24-24 may be a third CCR angle (352) of 7.5 degrees and define a third controlled curvature region (350) associated with the first side of the tool engagement area (200), and further the region between section lines 24-24 and 25-25 may be a fourth CCR angle (352) of 7.5 degrees and define a fourth controlled curvature region (350) associated with the first side of the tool engagement area (200); and this may be extended on the opposite side of section line 21-21 thereby producing a fifth controlled curvature region (350), a sixth controlled curvature region (350), a seventh controlled curvature region (350), and an eighth controlled curvature region (350), all associated with the first side of the tool engagement area (200). This is a single example using a 6-sided nut and 7.5 degree CCR angles (352), however the regions may be divided up in accordance of any of the disclosure, and any of the disclosed relationships may be present any of the controlled curvature regions (350), all of them, or only some of them, and the same applies to the sections within any one controlled curvature region (350), as will become apparent upon completion of the specification. For example, the number of controlled curvature regions (350) may be doubled via a 3.75 degree CCR angle (352), while in further embodiments the CCR angle (352) is selected from 2.5, 3.75, 5.0, 6.25, 7.5, 8.75, 10.0, 11.25, 12.5, 13.75, 15.0, 16.25, 17.5, 18.75, 20.0, 21.25, and continuing up to 360 degrees in 1.25 degree increments.

For the purpose of explicit disclosure, the CCR angle (352) may be a single degree up to 360 degrees, although the CCR angle (352) will be generally described within boundaries limited by the number of sides present in the tool engagement area (200), but is not required. For instance, looking specifically at FIG. 8, the NTE minimum width (208) label can be thought of as passing through the 12 o'clock and 6 o'clock hands of a clock, with a zero degree reference beginning at the 12 o'clock position and increasing clockwise to a 180 degree reference at the 6 o'clock position, and continuing to increase to a 359 degree reference just prior to the 12 o'clock position. Thus, section line 13-13 appears at the 210 degree reference position, and section line 9-9 is at the 240 degree reference position.

As previously noted with respect to the prior art nut, but also applicable to the present nut, the transition radius of curvature (342) is concave outward, and has a positive value, when the transition radius of curvature (342) extends from the transition surface (340) outward towards the center point of the transition radius of curvature (342), as seen in FIGS. 20, 53, and associated sections 21-25 and 53-58. Additionally, a concave inward transition radius of curvature (342), and has a negative value, when the transition radius of curvature (342) extends from the transition surface (340) inward towards, or across a bore longitudinal axis (401), seen in FIG. 35. Sticking with the example of the present nut (100) embodiment seen in FIG. 37, it may have any CCR angle (352) from 0 to 60 degrees within the NTEPS angle (212), seen in FIG. 33. In this example the embodiment of the present nut (100) shown in FIG. 53 has five separate section lines, 54-58, shown. Additionally, a CCR angle (352) is formed where two section lines meet. For example in FIG. 53, section line 54 and section line 55 meet to form a 7.5 degree angle, section line 54 and section line 56 meet to form a 15 degree CCR angle (352), section line 54 and section line 57 meet to form a 22.5 degree CCR angle (352), and section line 54 and section line 58 meet to form a 30 degree CCR angle (352). Furthermore, the CCR angle (352) may start with any section line shown in FIG. 53, and is not limited to starting with section line 54. For instance, section line 56 and section line 57 may meet to form a 7.5 degree CCR angle (352). Additionally, the number of CCR angle (352) possibilities is endless and should not be limited to the previous examples based off of FIG. 53.

Figures 49, 50:
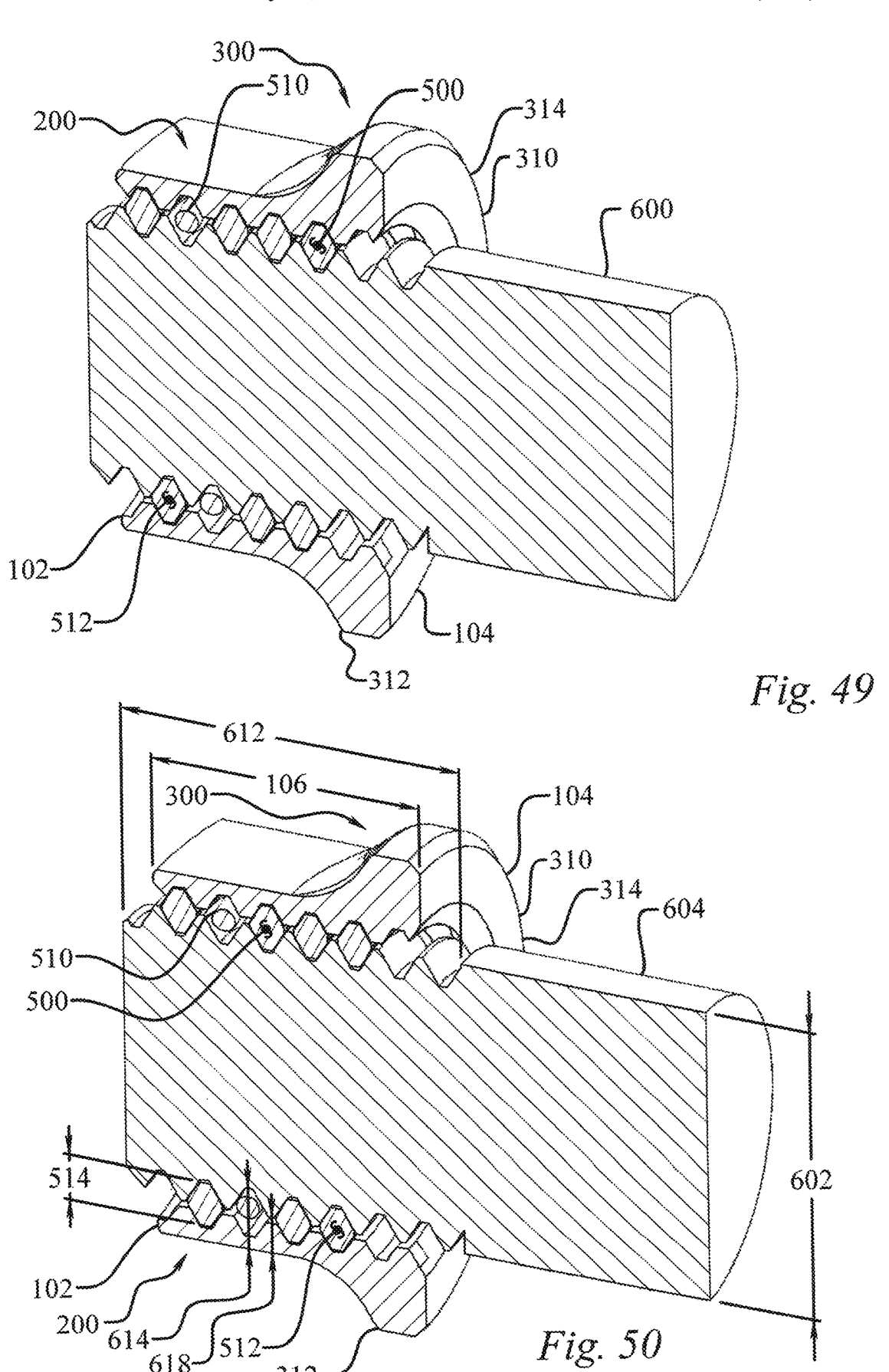
FIG. 49 is a partial cross-section isometric view of a nut embodiment having an enhanced flange, a helical coil insert, and a bolt.
FIG. 50 is another partial cross-section isometric view of a nut embodiment having an enhanced flange, a helical coil insert, and a bolt.

As seen in FIG. 9, the present nut (100) has a nut bore (400) extending into the nut (100) from the nut distal end (104), and defining a bore longitudinal axis (401). The nut bore (400) need not extend all the way through the nut (100) from the nut distal end (104) to the nut proximal end (102), but may in some embodiments. The nut bore (400) has a nut bore proximal end (402), a nut bore distal end (404), a nut bore length (406), defined as the distance between the nut bore proximal end (402) and the nut bore distal end (404) measured parallel to the bore longitudinal axis (401), a nut bore width (408), as best seen in FIGS. 6 and 8-13. The nut bore length (406) may be 10 to 100 percent of a bolt thread length (612) in one embodiment, 15 to 80 percent in another embodiment, and less than 75 percent yet another embodiment. Additionally in one embodiment, the nut bore width (408), seen in FIG. 2, including the nut bore thread (410) is slightly smaller than a bolt's width (602) to facilitate nut (100) to bolt (600) engagement. In another embodiment, the present nut (100) may have a nut locking helix (500) located in between the nut bore (400) and the bolt thread (610), as illustrated in FIGS. 49 and 50 and described in more detail later. In this embodiment, the nut bore width (408) may be 105 to 150 percent of the bolt width (602). In another embodiment, the nut bore width (408) may be 110 to 140 percent of the bolt width (602), while in yet another embodiment the nut bore width (408) is greater than 115 percent of the bolt width (602).

Now with basic structure of the various components described and defined, key relationships will be disclosed. As with all the relationships disclosed herein, these relationships are more than mere optimization, maximization, or minimization of a single characteristic or variable, and are often contrary to conventional design thinking yet have been found to achieve a unique balance of the trade-offs associated with competing criteria such as durability, weight, and ease of use. The aforementioned balance requires trade-offs among the competing characteristics recognizing key points of diminishing returns. Therefore, this disclosure contains a unique combination of relationships that produce enhanced durability and reduce stress concentrations. While the relationships of the various areas, regions, curvatures, and dimensions play an essential role in achieving the goals. Further, the relative length, width, cross-sectional dimensions, curvatures, thickness, and their relationships to one another and the other design variables disclosed herein, influence the durability, ease of use, and strength of the nut (100). Additionally, many embodiments have identified upper and/or lower limits ranges of relationships when extension outside the range the performance may suffer and adversely impact the goals.

Furthermore, the present nut (100) may also have a nut bore thread (410), abbreviated NBT, located within the nut bore (400), seen in FIGS. 9-13 and 21-25. The nut bore thread (410) engages with a bolt's thread (610), or nut locking helix (500), as seen in FIGS. 49 and 50. The nut bore thread (410) having a NBT crest (412), a NBT root (414), a NBT pitch cylinder (416) which is located at the midpoint between the NBT crest (412) and the NBT root (414), and a NBT flank (418), best seen in FIGS. 9-13. The NBT flank (418) abuts the surface on the bolt thread (610) or a nut locking helix wire (512), seen in FIGS. 49-51. The distance between the NTE planar surface (210) and the NBT crest (412) define a NBT crest wall thickness (422). Additionally, the distance between the NTE planar surface (210) and the NBT root (414) defines a NBT root wall thickness (424). And in similar fashion, the distance between the NTE planar surface (210) and the NBT pitch cylinder (416) define a NBT pitch cylinder wall thickness (426), as best seen in FIGS. 9-13.

In one embodiment of the present nut (100) the NBT pitch cylinder wall thickness (426) is at least 15% greater than the NBT root wall thickness (424), and in further embodiments at least 20%, 25%, and 30% greater. In another embodiment the NBT pitch cylinder wall thickness (426) is no more than 100% greater than the NBT root wall thickness (424), and in further embodiments no more than 90%, 85%, 70%, 60%, and 50% greater. In another embodiment of the present nut (100) the NBT crest wall thickness (422) is at least 50% greater than the NBT root wall thickness (424), and in further embodiments at least 60%, 70%, 80%, and 90% greater. In another embodiment of the present nut (100) the NBT crest wall thickness (422) is no more than 150% greater than the NBT root wall thickness (424), and in further embodiments no more than 125%, 110%, and 100% greater.

An embodiment of the present size 4 nut (100) may have a transition radius of curvature (342), seen in FIGS. 21-25, that is greater or equal to 0.025" within a predetermined number of analysis sections, spaced apart a predetermined separation angle, within a CCR angle (352) of 5 degrees, as seen in TABLE 1 below. The predetermined number of analysis sections is one in a first embodiments, and is any number between 2 and 100 in further embodiments. Thus, in the most basic embodiment, within a CCR angle (352) of 5 degrees, at least one section has a transition radius of curvature (342) that is greater or equal to 0.025". A second example has at least two analysis sections, within a CCR angle (352) of 5 degrees, with both analysis sections having a transition radius of curvature (342) that is greater or equal to 0.025". A third example has at least three analysis sections, within a CCR angle (352) of 5 degrees, with all three of the analysis sections having a transition radius of curvature (342) that is greater or equal to 0.025", and so on. In one embodiment the predetermined separation angle is one degree, and thus for the above second example the two analysis sections are exactly one degree apart, and similarly for the above third example the three analysis sections are exactly one degree apart. The predetermined separation angle may be 0.5 degrees, 1 degree, 1.5 degrees, 2 degrees, or 2.5 degrees. In fact, in some embodiments, including any of the disclosed embodiments, any of the disclosed curvatures or relationships may be met for any of the disclosed analysis sections, up to each section within the disclosed CCR angles (352), and further up to each section of the nut (100). Further, any of these embodiments may apply to the transition radius of curvature (342), using the disclosed 5 point best-fit method, beginning at the transition planar deviation point upper (344), seen in FIG. 54, beginning at the transition planar deviation point lower (346), both, and/or all transition radius of curvature (342) between the transition planar deviation point upper (344) and the transition planar deviation point lower (346).

TABLE 1

| 352 | 342 | 342 | 342 | 342 | 342 | 342 | 342 | 342 |
|---|---|---|---|---|---|---|---|---|
| 5° | ≥0.030" | ≥0.035" | ≥0.040" | ≥0.045" | ≥0.050" | ≥0.055" | ≥0.060" | ≥0.065" |
| 10° | ≥0.030" | ≥0.035" | ≥0.040" | ≥0.045" | ≥0.050" | ≥0.055" | ≥0.060" | ≥0.065" |
| 15° | ≥0.030" | ≥0.035" | ≥0.040" | ≥0.045" | ≥0.050" | ≥0.055" | ≥0.060" | ≥0.065" |
| 20° | ≥0.030" | ≥0.035" | ≥0.040" | ≥0.045" | ≥0.050" | ≥0.055" | ≥0.060" | ≥0.065" |
| 25° | ≥0.030" | ≥0.035" | ≥0.040" | ≥0.045" | ≥0.050" | ≥0.055" | ≥0.060" | ≥0.065" |
| 30° | ≥0.030" | ≥0.035" | ≥0.040" | ≥0.045" | ≥0.050" | ≥0.055" | ≥0.060" | ≥0.065" |
| 35° | ≥0.030" | ≥0.035" | ≥0.040" | ≥0.045" | ≥0.050" | ≥0.055" | ≥0.060" | ≥0.065" |
| 40° | ≥0.030" | ≥0.035" | ≥0.040" | ≥0.045" | ≥0.050" | ≥0.055" | ≥0.060" | ≥0.065" |
| 45° | ≥0.030" | ≥0.035" | ≥0.040" | ≥0.045" | ≥0.050" | ≥0.055" | ≥0.060" | ≥0.065" |
| 50° | ≥0.030" | ≥0.035" | ≥0.040" | ≥0.045" | ≥0.050" | ≥0.055" | ≥0.060" | ≥0.065" |
| 55° | ≥0.030" | ≥0.035" | ≥0.040" | ≥0.045" | ≥0.050" | ≥0.055" | ≥0.060" | ≥0.065" |
| 60° | ≥0.030" | ≥0.035" | ≥0.040" | ≥0.045" | ≥0.050" | ≥0.055" | ≥0.060" | ≥0.065" |

Thus, to be explicit, within the 5 degree row of Table 1, in one embodiment at least one analysis section, within a CCR angle (352) of 5 degrees, has a transition radius of curvature (342) that is greater or equal to 0.030", as noted in the second column. Now going across that row, in further embodiments the at least one analysis section, within a CCR angle (352) of 5 degrees, has a transition radius of curvature (342) that is at least 0.035", 0.040", 0.045", 0.050", 0.055", 0.060", or 0.065". However, as noted above, in further embodiments these same curvature embodiments may also apply to each of the predetermined number of analysis sections, spaced apart a predetermined separation angle, within a CCR angle (352) of 5 degrees, ranging from a single analysis section up to 100 analysis sections within the CCR angle (352) of 5 degrees, to the most extreme example of every section within the CCR angle (352) of 5 degrees meeting the disclosed curvature. Each additional row in Table 1 illustrates an equivalent series of embodiments throughout a widening range of CCR angles (352) from 5 to 60 degrees. However, as previously noted, the 60 degrees is simply an exemplary upper limit for the 6-sided nut embodiment, and the table may continue in a similar fashion up through 120 degrees for a 3-sided nut embodiment.

embodiment. Further, any of these embodiments may apply to the transition radius of curvature (342), using the disclosed 5 point best-fit method, beginning at the transition planar deviation point upper (344), seen in FIG. 54, beginning at the transition planar deviation point lower (346), both, and/or all transition radius of curvature (342) between the transition planar deviation point upper (344) and the transition planar deviation point lower (346). As explained throughout, the disclosed relationships apply to nuts (100) of all sizes, but the examples focus on very small nuts to illustrate key differences with the commonly used conventional MS21042 nuts. Thus, while the above Table 2 illustrates embodiments having a transition radius of curvature (342) that is no more than 0.200", other embodiments have a transition radius of curvature (342) that is no more than 1.750", and no more than 1.500", 1.250", 1.000", 0.750", 0.500", and 0.250" in further embodiments.

As seen in FIGS. 53-58, the transition radius of curvature (342) in contact with the transition planar deviation points upper (344) of the present nut (100) varies across the NTE planar surface (210), seen in FIG. 33. In one embodiment the transition radius of curvature (342) in contact with the transition planar deviation points upper (344) is the same at

TABLE 2

| 352 | 342 | 342 | 342 | 342 | 342 | 342 | 342 | 342 |
|---|---|---|---|---|---|---|---|---|
| 5° | ≤0.200" | ≤0.150" | ≤0.100" | ≤0.090" | ≤0.080" | ≤0.070" | ≤0.060" | ≤0.055" |
| 10° | ≤0.200" | ≤0.150" | ≤0.100" | ≤0.090" | ≤0.080" | ≤0.070" | ≤0.060" | ≤0.055" |
| 15° | ≤0.200" | ≤0.150" | ≤0.100" | ≤0.090" | ≤0.080" | ≤0.070" | ≤0.060" | ≤0.055" |
| 20° | ≤0.200" | ≤0.150" | ≤0.100" | ≤0.090" | ≤0.080" | ≤0.070" | ≤0.060" | ≤0.055" |
| 25° | ≤0.200" | ≤0.150" | ≤0.100" | ≤0.090" | ≤0.080" | ≤0.070" | ≤0.060" | ≤0.055" |
| 30° | ≤0.200" | ≤0.150" | ≤0.100" | ≤0.090" | ≤0.080" | ≤0.070" | ≤0.060" | ≤0.055" |
| 35° | ≤0.200" | ≤0.150" | ≤0.100" | ≤0.090" | ≤0.080" | ≤0.070" | ≤0.060" | ≤0.055" |
| 40° | ≤0.200" | ≤0.150" | ≤0.100" | ≤0.090" | ≤0.080" | ≤0.070" | ≤0.060" | ≤0.055" |
| 45° | ≤0.200" | ≤0.150" | ≤0.100" | ≤0.090" | ≤0.080" | ≤0.070" | ≤0.060" | ≤0.055" |
| 50° | ≤0.200" | ≤0.150" | ≤0.100" | ≤0.090" | ≤0.080" | ≤0.070" | ≤0.060" | ≤0.055" |
| 55° | ≤0.200" | ≤0.150" | ≤0.100" | ≤0.090" | ≤0.080" | ≤0.070" | ≤0.060" | ≤0.055" |
| 60° | ≤0.200" | ≤0.150" | ≤0.100" | ≤0.090" | ≤0.080" | ≤0.070" | ≤0.060" | ≤0.055" |

Table 2 tracks the disclosure and embodiments of Table 1, and should be read in the same manner with respect to the predetermined number of analysis sections, the predetermined separation angle, and the various CCR angles (352), but now with respect to upper limits on the transition radius of curvature (342). Thus, to be explicit, within the 5 degree row of Table 2, in one embodiment at least one analysis section, within a CCR angle (352) of 5 degrees, has a transition radius of curvature (342) that is no more than 0.200", as noted in the second column. Now going across that row, in further embodiments the at least one analysis section, within a CCR angle (352) of 5 degrees, has a transition radius of curvature (342) that is no more than 0.150", 0.100", 0.090", 0.080", 0.070", 0.060", or 0.055". However, as noted above, in further embodiments these same curvature embodiments may also apply to each of the predetermined number of analysis sections, spaced apart a predetermined separation angle, within a CCR angle (352) of 5 degrees, ranging from a single analysis section up to 100 analysis sections within the CCR angle (352) of 5 degrees, to the most extreme example of every section within the CCR angle (352) of 5 degrees meeting the disclosed curvature. Each additional row in Table 2 illustrates an equivalent series of embodiments throughout a widening range of CCR angles (352) from 5 to 60 degrees. However, as previously noted, the 60 degrees is simply an exemplary upper limit for the 6-sided nut embodiment, and the table may continue in a similar fashion up through 120 degrees for a 3-sided nut the NTEPS sinistral edge (214) and the NTEPS dextral edge (216), and changes substantially in between. For ease of reference, the NTEPS dextral edge (216) will be referred to as a first transition radius of curvature (342), and corresponds to the location of section line 58-58 in FIG. 53 and the associated section shown in FIG. 58. As sections move toward the center of the NTE planar surface (210), seen in FIG. 33, and as illustrated by section lines 57-57, then 56-56, then 55-55, and then 54-54, shown in FIG. 53 and corresponding to the sections shown in FIGS. 54-58, the transition radii of curvature (342) in contact with the transition planar deviation points upper (344) change dramatically, unlike the prior art nut illustrated in FIG. 59 and the analogous sections shown in FIGS. 60-64 having a constant transition radii of curvature (342) in contact with the transition planar deviation points upper (344). This is also true of the inflection separation distance upper (348), which varies in the present nut (100), as seen in FIGS. 53-58, but is constant in the prior art nut (100), as seen in FIGS. 59-64. Thus, in one embodiment at least one of (a) the transition radii of curvature (342) in contact with the transition planar deviation points upper (344) varies by at least a predetermined % from a first section thru the NTE planar surface (210) to a second section thru the NTE planar surface (210), and (b) the inflection separation distance upper (348) in contact with the transition planar deviation points upper (344) varies by at least a predetermined % from a first section thru the NTE planar surface (210) to a second section thru the NTE planar surface (210). In one such embodiment the predetermined % is at least 5%, and in further embodiments the predetermined % is at least 10%, 15%, 20%, 25%, 30%, 40%, 50%, and 60%. In a further series of embodiments the predetermined % is no more than 700%, and in further embodiments the predetermined % is no more than 650%, 600%, 550%, 500%, 450%, and 400%.

In another embodiment at least one section thru the NTE planar surface (210) between the NTEPS sinistral edge (214) and the NTEPS dextral edge (216) has a transition radius of curvature (342) in contact with the transition planar deviation point upper (344), that is greater than the NFS length (316), and in further embodiments at least 10%, 20%, 30%, curvatures, dimensions, and/or relationships within even a small percentage of the full 360 degrees still has a significant impact on the stress distribution, and other goals, of the nut (100).

Further embodiments disclosed in Table 3 relate the transition radius of curvature (342) to thicknesses of the nut (100) within the within the nut tool engagement area (200), seen in FIGS. 7 and 9, specifically the NBT crest wall thickness (422), the NBT root wall thickness (424), and/or the NBT pitch cylinder wall thickness (426). The examples of Table 3 are illustrated with respect to FIG. 53 and the 5 illustrated section lines, which correspond to FIGS. 54-58.

TABLE 3

| SECTION | POSITION | EXAMPLE A | EXAMPLE B | EXAMBLE C | |
|---|---|---|---|---|---|
| 54-54 | 0° | $342 \geq \alpha \times 424$ | $342 \geq \alpha \times 426$ | $342 \geq \alpha \times 422$ | Within the |
| 55-55 | 15° | $342 \geq \alpha \times 424$ | $342 \geq \alpha \times 426$ | $342 \geq \alpha \times 422$ | Nut Tool |
| 56-56 | 30° | $342 \geq \alpha \times 424$ | $342 \geq \alpha \times 426$ | $342 \geq \alpha \times 422$ | Engagement |
| 57-57 | 45° | $342 \geq \alpha \times 424$ | $342 \leq \beta \times 426$ | $342 \leq \beta \times 422$ | Area (200) |
| 58-58 | 60° | $342 \geq \alpha \times 424$ | $342 \geq \alpha \times 426$ | $342 \geq \alpha \times 422$ | |

40%, and 50% greater. In still a further embodiment no sections thru the NTE planar surface (210) between the NTEPS sinistral edge (214) and the NTEPS dextral edge (216) have a transition radius of curvature (342) in contact with the transition planar deviation point upper (344), that is greater than 600% of the NFS length (316), and in further embodiments no greater than 550%, 500%, 450%, and 400%. In another embodiment at least one section thru the NTE planar surface (210) between the NTEPS sinistral edge (214) and the NTEPS dextral edge (216) has a transition radius of curvature (342) in contact with the transition planar deviation point upper (344), that is at least 25% of the nut flange length (306), and in further embodiments at least 35%, 45%, 55%, 65%, and 75%. In another embodiment no section thru the NTE planar surface (210) between the NTEPS sinistral edge (214) and the NTEPS dextral edge (216) have a transition radius of curvature (342) in contact with the transition planar deviation point upper (344), that is greater than 300% of the nut flange length (306), and in further embodiments no more than 250%, 200%, 150%, 125%, and 100%. In another embodiment at least one section thru the NTE planar surface (210) between the NTEPS sinistral edge (214) and the NTEPS dextral edge (216) has a transition radius of curvature (342) in contact with the transition planar deviation point upper (344), that is at least 25% of the NTE maximum length (202), seen in FIG. 40, and in further embodiments at least 35%, 45%, 55%, 65%, and 75%. In another embodiment no section thru the NTE planar surface (210) between the NTEPS sinistral edge (214) and the NTEPS dextral edge (216) have a transition radius of curvature (342) in contact with the transition planar deviation point upper (344), that is greater than 300% of the NTE maximum length (202), and in further embodiments no more than 250%, 200%, 150%, 125%, and 100%. All of the disclosure made with respect to "at least one section" applies equally to embodiments having at least two sections spaced apart by at least 5 degrees, 10 degrees, 15 degrees, 20 degrees, 25 degrees, 30 degrees, and 35 degrees; as well as embodiments having the described characteristic(s) in all sections within a predetermined range of at least 2.5 degrees, 5 degrees, 10 degrees, 15 degrees, 20 degrees, 25 degrees, 30 degrees, 35 degrees, and upward in 5 degree increments all the way to 360 degrees. Obtaining any of the disclosed The symbols $\alpha$ and $\beta$ represent constants that for the initial embodiments of Table 3 are set to 1, with additional embodiments disclosed later. For example, in the 54-54 position of Table 3, corresponding to FIG. 54, and in Example A the transition radius of curvature (342) in this section is greater than, or equal to, the NBT root wall thickness (424), see FIG. 9, while in Example B the transition radius of curvature (342) in this section is greater than, or equal to, the NBT pitch cylinder wall thickness (426), while in Example C the transition radius of curvature (342) in this section is greater than, or equal to, the NBT crest wall thickness (422). Thus, this location is a predetermined analysis sections within a CCR angle (352), and all the disclosure with respect to variations of number and location of analysis sections related to the prior disclosure also applies here. In fact, Table 3 illustrates 5 analysis sections, spaced apart at predetermined separation angles of 15 degrees, within a CCR angle (352) of 60 degrees. The additional rows of Table 3 illustrate that these relationships may also apply equally at the 15 degree position, the 30 degree position, the 45 degree position, and/or the 60 degree position, and at the furthest extreme may apply to all positions within a CCR angle (352). Similar to the prior disclosure, any of these embodiments may apply to the transition radius of curvature (342), using the disclosed 5 point best-fit method, beginning at the transition planar deviation point upper (344), seen in FIG. 54, beginning at the transition planar deviation point lower (346), both, and/or all transition radius of curvature (342) between the transition planar deviation point upper (344) and the transition planar deviation point lower (346). Table 3 is expanded via additional embodiments whereby the constants $\alpha$ and $\beta$ are not equal to 1. For instance, in one series of embodiments the constant $\alpha$ is 1.1, 1.2, 1.3, 1.4, or 1.5. In another series of embodiment the constant $\alpha$ is one of the following ranges: 1.1-8, 1.1-6, 1.1-4, 1.2-8, 1.2-6, 1.2-4, 1.3-8, 1.3-6, 1.3-4, 1.4-8, 1.4-6, 1.4-4, 1.5-8, 1.5-6, 1.5-4, 1.6-8, 1.6-6, 1.6-4, 1.7-8, 1.7-6, 1.7-4, 1.8-8, 1.8-6, 1.8-4, 1.9-8, 1.9-6, 1.9-4, 2-8, 2-6, and 2-4. In another series of embodiments the constant $\beta$ is 1.2, while in further embodiments it is 1.1, 1.0, 0.9, and 0.8. In another series of embodiment the constant $\beta$ is at least 0.4, and in still further embodiments is at least 0.5, 0.6, 0.7, and 0.8. This is dramatically different than the characteristics of the prior art nut (100) of FIGS. 59-63, which has a constant transition radius of curvature (342), beginning at the transition planar deviation point upper (344), that is less than NBT crest wall thickness (422) within the nut tool engagement area (200), and less than the NBT pitch cylinder wall thickness (426) within the nut tool engagement area (200).

Further embodiments disclosed in Table 4 relate the transition radius of curvature (342) to thicknesses of the nut (100) within the nut transition area (330), seen in FIGS. 7 and 9, specifically the NBT crest wall thickness (422), the NBT root wall thickness (424), and/or the NBT pitch cylinder wall thickness (426), which vary within this area from maximum thickness values to minimum thickness values. The examples of Table 4 are illustrated with respect to FIG. 53 and the 5 illustrated section lines, which correspond to FIGS. 54-58.

full 360 degrees. Similar to the prior disclosure, any of these embodiments may apply to the transition radius of curvature (342), using the disclosed 5 point best-fit method, beginning at the transition planar deviation point upper (344), seen in FIG. 54, beginning at the transition planar deviation point lower (346), both, and/or all transition radius of curvature (342) between the transition planar deviation point upper (344) and the transition planar deviation point lower (346). Similar to Table 3, Table 4 is expanded via additional embodiments whereby the constants α and β are not equal to 1. For instance, in one series of embodiments the constant α is 1.1, 1.2, 1.3, 1.4, or 1.5. In another series of embodiment the constant α is one of the following ranges: 1.1-8, 1.1-6, 1.1-4, 1.2-8, 1.2-6, 1.2-4, 1.3-8, 1.3-6, 1.3-4, 1.4-8, 1.4-6, 1.4-4, 1.5-8, 1.5-6, 1.5-4, 1.6-8, 1.6-6, 1.6-4, 1.7-8, 1.7-6, 1.7-4, 1.8-8, 1.8-6, 1.8-4, 1.9-8, 1.9-6, 1.9-4, 2-8, 2-6, and 2-4. In another series of embodiments the constant β is 5,

TABLE 4

| | | Within the Nut Transition Area (330) | | |
|---|---|---|---|---|
| SECTION | POSITION | EXAMPLE A | EXAMPLE B | EXAMPLE C |
| 54-54 | 0° | α × 424 MIN ≤ 342 ≤ β × 424 MAX 342 ≥ α × 424 MIN 342 ≤ β × 424 MAX | 342 ≥ α × 426 MIN 342 ≥ α × 426 MAX | 342 ≥ α × 422 MIN 342 ≥ α × 422 MAX |
| 55-55 | 15° | 342 ≥ α × 424 MIN 342 ≥ α × 424 MAX | 342 ≥ α × 426 MIN 342 ≥ α × 426 MAX | 342 ≥ α × 422 MIN 342 ≥ α × 422 MAX |
| 56-56 | 30° | α × 424 MIN ≤ 342 ≤ β × 424 MAX | α × 426 MIN ≤ 342 ≤ β × 426 MAX | α × 422 MAX × ≤ 342 ≤ β × 422 MIN |
| 57-57 | 45° | α × 424 MIN ≤ 342 ≤ β × 424 MAX | 342 ≤ β × 426 MIN 342 ≤ β × 426 MAX | 342 ≤ β × 422 MIN 342 ≤ β × 422 MAX |
| 58-58 | 60° | 342 ≥ α × 424 MIN 342 ≥ α × 424 MAX | 342 ≥ α × 426 MIN 342 ≥ α × 426 MAX | 342 ≥ α × 422 MIN 342 ≥ α × 422 MAX |

The symbols α and β represent constants that for the initial embodiments of Table 4 are set to 1, with additional embodiments disclosed later. For example, in the 54-54 position of Table 4, corresponding to FIG. 54, and in Example A the transition radius of curvature (342) in this section may be (i) less than, or equal to, a maximum NBT root wall thickness (424) within the nut transition area (330), (ii) the transition radius of curvature (342) in this section may be greater than, or equal to, a minimum NBT root wall thickness (424) within the nut transition area (330), and/or (iii) the transition radius of curvature (342) may be between the maximum and minimum NBT root wall thickness (424) within the nut transition area (330) in this section. In Example B of the 54-54 position of Table 4, the transition radius of curvature (342) in this section may be greater than, or equal to, a minimum NBT pitch cylinder wall thickness (426), and/or the transition radius of curvature (342) in this section may be greater than, or equal to, a maximum NBT pitch cylinder wall thickness (426). Further, in Example C of the 54-54 position of Table 4, the transition radius of curvature (342) in this section may be greater than, or equal to, a minimum NBT crest wall thickness (422), and/or the transition radius of curvature (342) in this section may be greater than, or equal to, a maximum NBT crest wall thickness (422). This discussion of the 54-54 position illustrates how to interpret the disclosure contained in Table 4, and therefore the other positions will not be separately discussed. The additional rows of Table 4 illustrate similar relationships may also apply at the 15 degree position, the 30 degree position, the 45 degree position, and/or the 60 degree position, and at the furthest extreme may apply to all positions within a CCR angle (352), which again may vary from 1 degree up to the while in further embodiments it is 4.5, 4.0, 3.5, 3.0, 2.5, 2.0, 1.5, 1.0, 0.95, 0.90, and 0.85. In another series of embodiment the constant β is at least 0.5, and in still further embodiments is at least 0.6, 0.7, 0.8, and 0.9.

As noted throughout, a key goal of the present nut is to improve stress distribution. The prior art has failed to recognize that selective removal material can dramatically improve stress distribution, toughness, resilience to shock, the ability to accept more elastic strain, overall strength, and resistance to nut dilation. Less can be more. This is particularly apparent when focusing on the nut transition area (330) of the prior art, seen in FIG. 5B, versus the present nut (100), seen in FIG. 7, especially the sections shown in FIGS. 9-13 for the present nut (100) and FIGS. 15-19 for the prior art. For instance, it is clear when comparing FIGS. 9 and 15 and focusing on the NBT crest wall thickness (422), the NBT root wall thickness (424), and/or the NBT pitch cylinder wall thickness (426), within the nut transition area (330) rather than in the nut tool engagement area (200) as illustrated, i.e. slide the illustrated thickness indicators downward into the nut transition area (330). Comparing the sections side-by-side highlights the unique configuration of the nut transition area (330) in the present nut (100) where the surface of the nut transition area (300) is primarily concave outward versus the prior art surface of the nut transition area (300), which bulges outward producing a concave inward surface. The prior art's outward bulge produces significantly greater thicknesses (422, 424, 426) in the nut transition area (300), seen in FIGS. 15-19, versus those same thicknesses (422, 424, 426) in the nut transition area (300) of the present nut, seen in FIGS. 9-13. Thus, contrary to conventional thinking, the reduced thicknesses (422, 424, 426) in the nut transition area (300) of the present nut (100), produced via the disclosed relationships and curvatures, actually improves the performance of the nut (100).

Figure 5B:
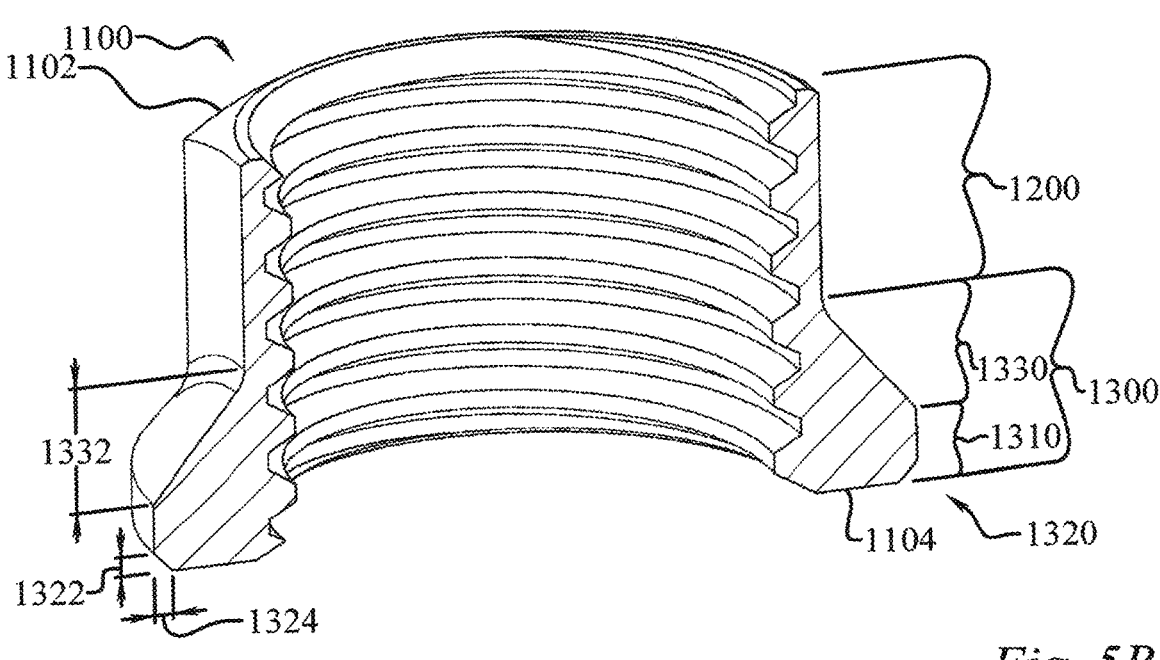
FIG. 5B is another cross-section isometric view of a prior art nut embodiment.

Another way to describe this relationship is associated with one or more of the thicknesses (422, 424, 426) in the plane containing the maximum translation length (332), see FIG. 40 for the present nut (100) and FIG. 5B for the prior art, which correspond to the location of section line 9-9 in FIG. 8 and section line 15-15 in FIG. 14. Within this section of the present nut (100), seen in FIG. 9, and focusing on the variations of thicknesses (422, 424, 426) in the top 50% of the maximum translation length (332). In the illustrated embodiment the NBT root wall thickness (424), within the top 50% of the maximum translation length (332), increases from a first NBT root wall thickness (424) in the nut tool engagement area (200) to a second NBT root wall thickness (424) at the midpoint of the maximum translation length (332), and the second NBT root wall thickness (424) is no more than 2 times the first NBT root wall thickness (424). Conversely, in the prior art nut (100) seen in FIG. 15, the second NBT root wall thickness (424) is more than 3.5 times the first NBT root wall thickness (424). Thus, in one embodiment the second NBT root wall thickness (424) is no more than 3.0 times the first NBT root wall thickness (424), while in further embodiments the second NBT root wall thickness (424) is no more than 2.75, 2.50, 2.25, or 2.0 times the first NBT root wall thickness (424). This same relationship and disclosure applies equally to the NBT crest wall thickness (422) and/or the NBT pitch cylinder wall thickness (426). While in some embodiments these thickness relationships are obtained without regard to the curvature of the surface of the nut transition area (330), in a further embodiment, still within the section containing the maximum translation length (332), at least 50% of the surface of the nut transition area (330) is concave outward, while in further embodiments at least 60%, 70%, 80%, 90%, and/or 100%, as seen in FIG. 9, of the surface of the nut transition area (330) is concave outward. In another embodiment focusing just on the previously described the top 50% of the maximum translation length (332), within this section the entire surface of the nut transition area (330) is concave outward within the top 50% of the maximum translation length (332). This is in stark contrast to the prior art of FIG. 15 where at least 80% of the surface of the nut transition area (330) is concave inward, and thus bulging outward and producing the dramatically increased thicknesses (422, 424, 426) and actually negatively influencing the performance of the nut (100), with the additional drawback of adding mass. It is important to note that while this paragraph discloses relationships in the plane containing the maximum translation length (332), see FIG. 40 for the present nut (100) and FIG. 5B for the prior art, which correspond to the location of section line 9-9 in FIG. 8 and section line 15-15 in FIG. 14, as with all of the disclosure, these disclosed relationships may be applied to any of the sections of the nut (100), which includes any of the disclosed ranges of the controlled curvature region (350) and CCR angle (352). In one particular embodiment there is at least one analysis section associated with each NTE planar surface (210) in which the surface of the nut transition area (330) is entirely concave outward from the transition planar deviation point upper (344) to the transition planar deviation point lower (346), such as that seen in FIG. 54; while in a further embodiment this occurs in the analysis section positioned equidistant between the NTEPS sinistral edge (214) and the NTEPS dextral edge (216), both seen in FIG. 4, and is referred to as a NTEPS mid-point analysis plane, which corresponds to section line 54-54 in FIG. 53. In still a further embodiment, a second analysis plane at least 7.5 degrees from the NTEPS mid-point analysis plane contains both a concave outward portion and a concave inward portion of the surface of the nut transition area (330), such as that illustrated by section line 56-56 in FIG. 53, and the section of FIG. 56; while in still a further embodiment the same occurs in a third analysis plane located at least 7.5 degrees from the NTEPS mid-point analysis plane and on the opposite side of the NTEPS mid-point analysis plane, i.e. the mirror image of section line 56-56 about section line 54-54 in FIG. 53. In one particular embodiment, when looking at the full 360 degrees of a nut (100) a concave inward curvature exists in less than 70% of evenly spaced analysis sections, while in further embodiments a concave inward curvature exists in less than 60%, 50%, 40%, 30%, 20%, 15%, and 10% of the evenly spaced analysis sections. In a further embodiment the NTEPS mid-point analysis plane, which corresponds to section line 54-54 in FIG. 53, is the location of the minimum NBT crest wall thickness (422), the minimum NBT root wall thickness (424), and/or the minimum NBT pitch cylinder wall thickness (426), with the thicknesses referring to those in the nut tool engagement area (200), and the surface of the nut transition area (330) within the NTEPS mid-point analysis plane is entirely concave outward from the transition planar deviation point upper (344) to the transition planar deviation point lower (346), opposite of what conventional thinking would arrive at. In a further embodiment at least one analysis plane between the NTEPS mid-point analysis plane and the NTEPS sinistral edge plane (215) contains both a concave outward portion and a concave inward portion of the surface of the nut transition area (330); and at least one analysis plane between the NTEPS mid-point analysis plane and the NTEPS dextral edge plane (217) contains both a concave outward portion and a concave inward portion of the surface of the nut transition area (330), see for example FIG. 55. In a further embodiment at least two analysis planes, spaced at least 2.5 degrees apart, between the NTEPS mid-point analysis plane and the NTEPS sinistral edge plane (215) contain both a concave outward portion and a concave inward portion of the surface of the nut transition area (330); and at least two analysis planes, spaced at least 2.5 degrees apart, between the NTEPS mid-point analysis plane and the NTEPS dextral edge plane (217) contain both a concave outward portion and a concave inward portion of the surface of the nut transition area (330), see for example FIGS. 55 and 56.

Further embodiments disclosed in Table 5 relate the transition radius of curvature (342) to thicknesses of the nut (100) within the within the nut flange seat (310), seen in FIGS. 7 and 9, specifically the NBT crest wall thickness (422), the NBT root wall thickness (424), and/or the NBT pitch cylinder wall thickness (426). The examples of Table 5 are illustrated with respect to FIG. 53 and the 5 illustrated section lines, which correspond to FIGS. 54-58.

TABLE 5

| SECTION | POSI-TION | Within the Nut Flange Seat (310) | | |
| --- | --- | --- | --- | --- |
| | | EXAMPLE A | EXAMPLE B | EXAMPLE C |
| 54-54 | 0° | $342 \leq \beta \times 424$ | $342 \leq \beta \times 426$ | $342 \leq \beta \times 422$ |
| | | $342 \geq \alpha \times 424$ | $342 \geq \alpha \times 426$ | $342 \geq \alpha \times 422$ |
| 55-55 | 15° | $342 \geq \alpha \times 424$ | $342 \geq \alpha \times 426$ | $342 \leq \beta \times 422$ |
| 56-56 | 30° | $342 \leq \beta \times 424$ | $342 \leq \beta \times 426$ | $342 \leq \beta \times 422$ |

TABLE 5-continued

| SECTION | POSI-TION | Within the Nut Flange Seat (310) | | |
|---------|-----------|----------------------------------|---|---|
| | | EXAMPLE A | EXAMPLE B | EXAMPLE C |
| 57-57 | 45° | $342 \leq \beta \times 424$ | $342 \leq \beta \times 426$ | $342 \leq \beta \times 422$ |
| 58-58 | 60° | $342 \geq \alpha \times 424$ | $342 \geq \alpha \times 426$ | $342 \geq \alpha \times 422$ |

The symbols $\alpha$ and $\beta$ represent constants that for the initial embodiments of Table 4 are set to 1, with additional embodiments disclosed later. For example, in the 54-54 position of Table 5, corresponding to FIG. 54, and in Example A the transition radius of curvature (342) in this section may have a portion that is no greater than the NBT root wall thickness (424) and may have a portion that is greater than, or equal to, the NBT root wall thickness (424), see FIG. 9, while in Example B the transition radius of curvature (342) in this section may have a portion that is greater than, or equal to, the NBT pitch cylinder wall thickness (426) and may have a portion that is less than, or equal to, the NBT pitch cylinder wall thickness (426), while in Example C the transition radius of curvature (342) in this section may have a portion that is greater than, or equal to, the NBT crest wall thickness (422) and may have a portion that is less than, or equal to, the NBT crest wall thickness (422). Thus, this location is a predetermined analysis section within a CCR angle (352), and all the disclosure with respect to variations of number and location of analysis sections related to the prior disclosure also applies here. In fact, Table 5 illustrates 5 analysis sections, spaced apart at predetermined separation angles of 15 degrees, within a CCR angle (352) of 60 degrees. The additional rows of Table 5 illustrate similar relationships at the 15 degree position, the 30 degree position, the 45 degree position, and/or the 60 degree position, and at the furthest extreme may apply to all positions within a CCR angle (352), but they will not be explicitly repeated outside of the disclosure in Table 5. Similar to the prior disclosure, any of these embodiments may apply to the transition radius of curvature (342), using the disclosed 5 point best-fit method, beginning at the transition planar deviation point upper (344), seen in FIG. 54, beginning at the transition planar deviation point lower (346), both, and/or all transition radius of curvature (342) between the transition planar deviation point upper (344) and the transition planar deviation point lower (346). Similar to Table 4, Table 5 is expanded via additional embodiments whereby the constants $\alpha$ and $\beta$ are not equal to 1. For instance, in one series of embodiments the constant $\alpha$ is 1.1, 1.2, 1.3, 1.4, or 1.5. In another series of embodiment the constant $\alpha$ is one of the following ranges: 1.1-8, 1.1-6, 1.1-4, 1.2-8, 1.2-6, 1.2-4, 1.3-8, 1.3-6, 1.3-4, 1.4-8, 1.4-6, 1.4-4, 1.5-8, 1.5-6, 1.5-4, 1.6-8, 1.6-6, 1.6-4, 1.7-8, 1.7-6, 1.7-4, 1.8-8, 1.8-6, 1.8-4, 1.9-8, 1.9-6, 1.9-4, 2-8, 2-6, and 2-4. In another series of embodiments the constant $\beta$ is 5, while in further embodiments it is 4.5, 4.0, 3.5, 3.0, 2.5, 2.0, 1.5, 1.0, 0.95, 0.90, and 0.85. In another series of embodiment the constant $\beta$ is at least 0.5, and in still further embodiments is at least 0.6, 0.7, 0.8, and 0.9.

Comparing FIGS. 54 and 60 illustrates the contrast between a typical prior art nut and the present invention; particularly the large inflection separation distance upper (348) of the present invention compared to the prior art nut illustrated. Further, the general prior art nut design, often driven by military specifications, promotes a smooth outwardly bulging nut transition area (300), resulting in a large inflection separation distance lower (349) in comparison to the large inflection separation distance upper (348), seen in FIG. 60, which contrary to conventional thinking does not help with stress distribution of the nut. In fact, one embodiment of the present invention has a large inflection separation distance upper (348) that is at least 25% of the large inflection separation distance lower (349), and in further embodiments is at least 35%, 45%, 55%, 65%, and 75%. A further embodiment has an inflection separation distance upper (348) that is no more than 200% of the large inflection separation distance lower (349), and in further embodiments is no more than 175%, 150%, and 125%. Further embodiments disclosed in Table 6 relate the inflection separation distance upper (348) to thicknesses of the nut (100) within the within the nut tool engagement area (200), seen in FIGS. 7 and 9, specifically the NBT crest wall thickness (422), the NBT root wall thickness (424), and/or the NBT pitch cylinder wall thickness (426). The examples of Table 6 are illustrated with respect to FIG. 53 and the 5 illustrated section lines, which correspond to FIGS. 54-58.

TABLE 6

| SECTION | POSITION | EXAMPLE A | EXAMPLE B | EXAMBLE C | |
|---------|----------|-----------|-----------|-----------|---|
| 54-54 | 0° | $348 \geq \alpha \times 424$ | $348 \geq \alpha \times 426$ | $348 \geq \alpha \times 422$ | Within the |
| 55-55 | 15° | $348 \geq \alpha \times 424$ | $348 \geq \alpha \times 426$ | $348 \geq \alpha \times 422$ | Nut Tool |
| 56-56 | 30° | $348 \geq \alpha \times 424$ | $348 \geq \alpha \times 426$ | $348 \geq \alpha \times 422$ | Engagement |
| 57-57 | 45° | $348 \geq \alpha \times 424$ | $348 \leq \beta \times 426$ | $348 \leq \beta \times 422$ | Area (200) |
| 58-58 | 60° | $342 \geq \alpha \times 424$ | $342 \geq \alpha \times 426$ | $342 \geq \alpha \times 422$ | |

The symbols $\alpha$ and $\beta$ represent constants that for the initial embodiments of Table 4 are set to 1, with additional embodiments disclosed later. For example, in the 54-54 position of Table 6, corresponding to FIG. 54, and in Example A the inflection separation distance upper (348) in this section is greater than, or equal to, the NBT root wall thickness (424), see FIG. 9, while in Example B the inflection separation distance upper (348) in this section is greater than, or equal to, the NBT pitch cylinder wall thickness (426), while in Example C the inflection separation distance upper (348) in this section is greater than, or equal to, the NBT crest wall thickness (422). Thus, this location is a predetermined analysis sections within a CCR angle (352), and all the disclosure with respect to variations of number and location of analysis sections related to the prior disclosure also applies here. In fact, Table 6 illustrates 5 analysis sections, spaced apart at predetermined separation angles of 15 degrees, within a CCR angle (352) of 60 degrees. The additional rows of Table 6 illustrate that these relationships may also apply equally at the 15 degree position, the 30 degree position, the 45 degree position, and/or the 60 degree position, and at the furthest extreme may apply to all positions within a CCR angle (352). Similar to Tables 4 and 5, Table 6 is expanded via additional embodiments whereby the constants $\alpha$ and $\beta$ are not equal to 1. For instance, in one series of embodiments the constant $\alpha$ is 1.1, 1.2, 1.3, 1.4, or 1.5. In another series of embodiment the constant $\alpha$ is one of the following ranges: 1.1-8, 1.1-6, 1.1-4, 1.2-8, 1.2-6, 1.2-4, 1.3-8, 1.3-6, 1.3-4, 1.4-8, 1.4-6, 1.4-4, 1.5-8, 1.5-6, 1.5-4, 1.6-8, 1.6-6, 1.6-4, 1.7-8, 1.7-6, 1.7-4, 1.8-8, 1.8-6, 1.8-4, 1.9-8, 1.9-6, 1.9-4, 2-8, 2-6, and 2-4. In another series of embodiments the constant β is 5, while in further embodiments it is 4.5, 4.0, 3.5, 3.0, 2.5, 2.0, 1.5, 1.0, 0.95, 0.90, and 0.85. In another series of embodiment the constant β is at least 0.5, and in still further embodiments is at least 0.6, 0.7, 0.8, and 0.9.

One of many problems overcome by these embodiments originates from the fact that conventional nuts often necessitates a nut material having a hardness above a Rockwell C hardness of 42 RWC, which would make them prone to hydrogen embrittlement. Additionally, the likelihood of failure of the first thread is increased due to dilation of the nut flange and thread bending due to undesirable stress distribution in a conventional nut. Dilation and thread bending cause the major diameter of the nut thread to increase, thus decreasing the shear stress area of the already critically loaded first three threads. Theoretical and practical studies of this phenomenon indicate that the top face of the nut contracts in a radial direction while its bearing surface expands. Thus, without high temper materials to withstand the effects of extreme shear stress on the first three threads, conventional MS21042 nuts will split due to nut dilation and/or stripping. Reference to MS21042 nuts refers to nuts meeting Military Specification MS21042 for use in aircraft. Further, high hardness values require precise processing methods to eliminate hydrogen embrittlement and reduce the fracture toughness. An embodiment of the present invention achieves the desired goals with an alloy steel nut tempered to a Rockwell C hardness of 39 RWC or less, and 37 or less in another embodiment.

Figure 41:
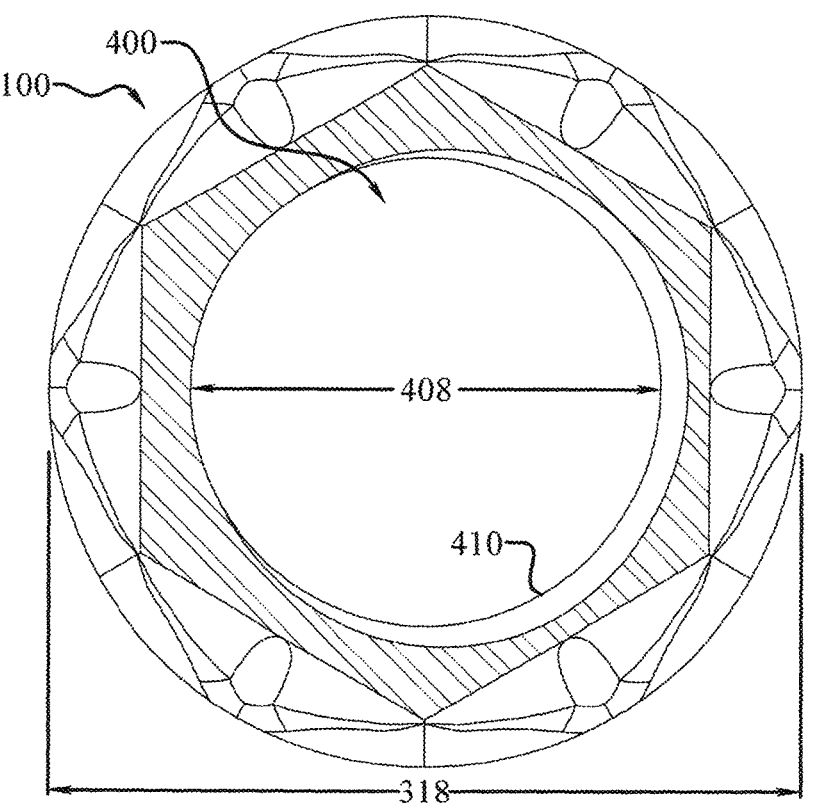
FIG. 41 is a cross-section view of a prior art nut embodiment taken along section line 41-41 in FIG. 40.
Figure 42:
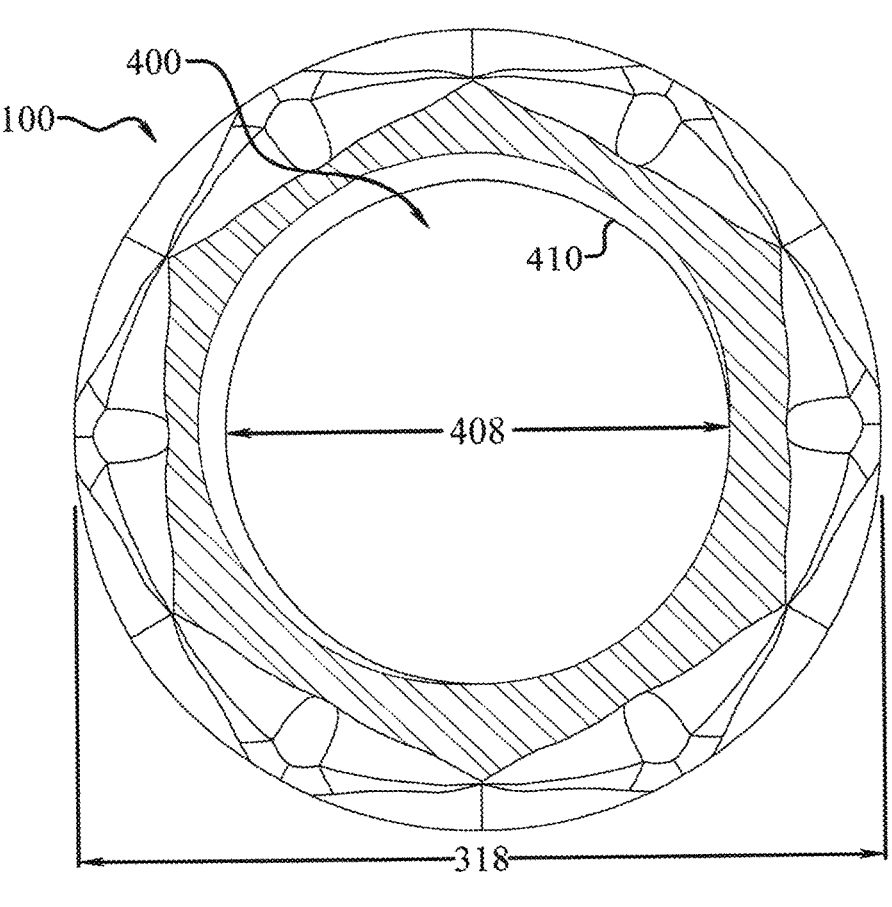
FIG. 42 is a cross-section view of a prior art nut embodiment taken along section line 42-42 in FIG. 40.
Figure 43:
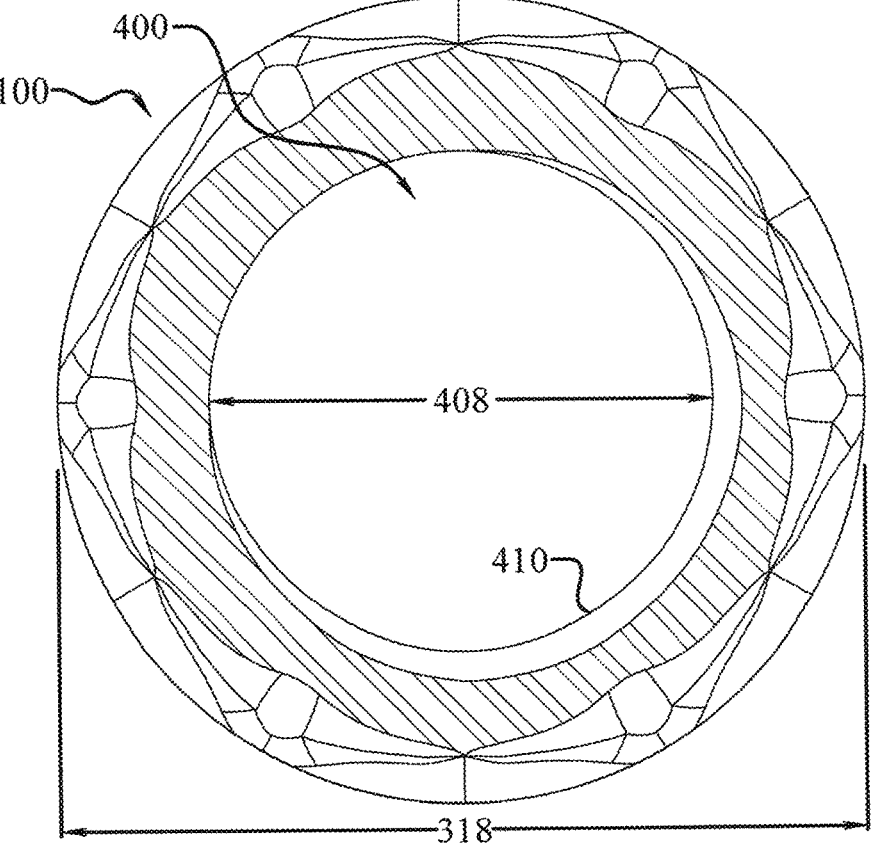
FIG. 43 is a cross-section view of a prior art nut embodiment taken along section line 43-43 in FIG. 40.
Figure 44:
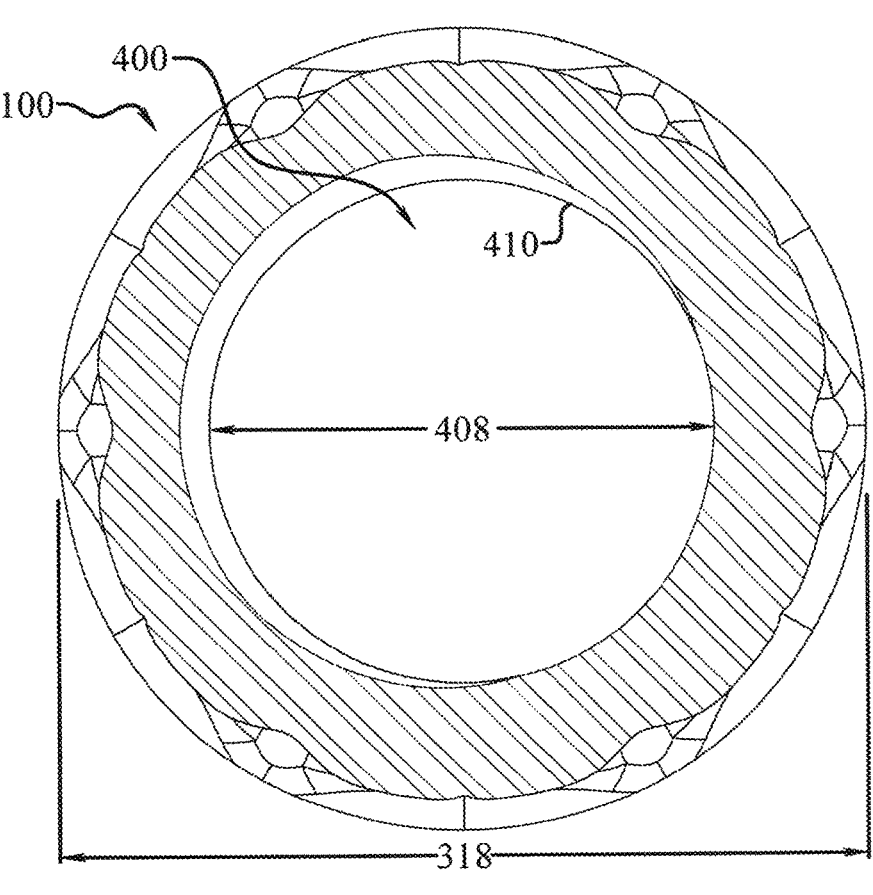
FIG. 44 is a cross-section view of a prior art nut embodiment taken along section line 44-44 in FIG. 40.
Figure 45:
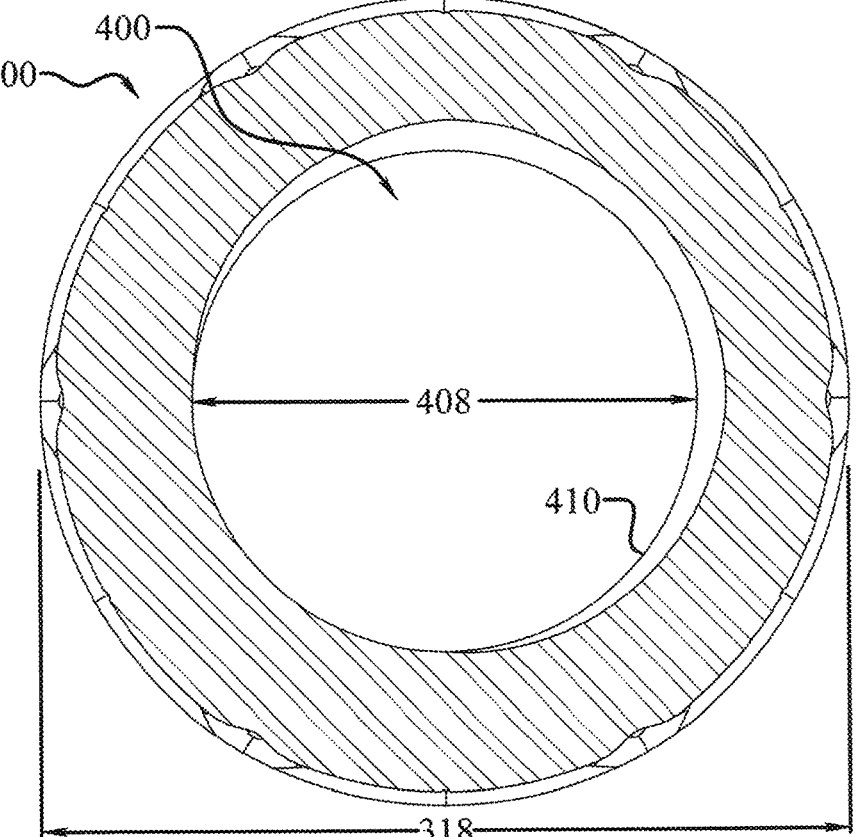
FIG. 45 is a cross-section view of a prior art nut embodiment taken along section line 45-45 in FIG. 40.

FIG. 40 shows an embodiment of the present nut (100) having section lines 41-41 thru 45-45, referring to FIGS. 41-45, which show the sectional profiles of the nut (100) at the various elevation sections. FIG. 41 shows a cross-section that is taken within the nut tool engagement area (200), seen in FIG. 7, having an undistorted hexagonal tool area profile. FIG. 42 shows a section that is taken at the uppermost portion of the nut transition area (330), seen in FIG. 7, showing a semi-hexagonal undulating cross-section profile. FIG. 43 shows a cross-section taken at the middle portion of the nut transition area (330) with a cross-section having a complex multiple radius profile, indicating that the nut transition area (330), seen in FIG. 7, has a varying curving surface. Likewise, the section in FIG. 44 also has a cross-section having a complex multiple radius profile, indicating that the nut transition area (330), seen in FIG. 7, has a varying curving surface. Lastly, FIG. 45 shows a cross-section taken near the bottom of the nut transition area (330) near the NFS proximal end (312), with the cross-section having an almost circular profile, which indicates the nut transition area (330) is transitioning into a more uniform surface.

Figures 46, 47, 48:
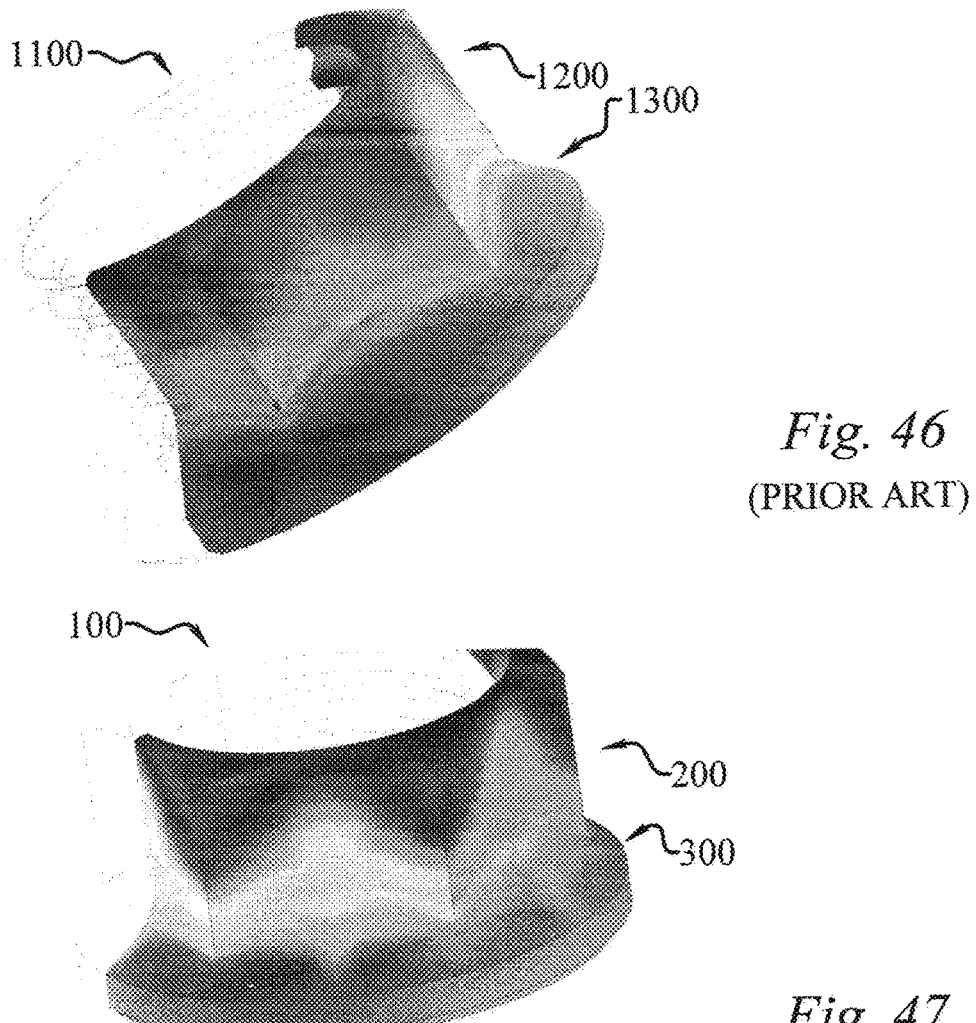
FIG. 46 is a partial isometric view of a prior art nut embodiment illustrating mechanical strain and stress areas.
FIG. 47 is a partial isometric view of a nut embodiment having an enhanced flange illustrating mechanical strain and stress areas.
FIG. 48 is an isometric view of a nut embodiment having an enhanced flange illustrating mechanical strain and stress areas.

FIG. 46 shows the modeling of mechanical strain for a prior art nut (100) with the highest concentration narrowly located along the transition radius of curvature (342), as seen in FIGS. 27-31 and 46. FIGS. 47 and 48 show the modeling of mechanical strain for a present nut embodiment (100) showing the mechanical strain spread over a large area of the nut tool engagement area (200), and the nut transition area (330), thereby reducing the likelihood of mechanical failure despite removing material from certain areas of the nut (100).

Additionally, an embodiment of the present nut (100) may also have a nut locking helix (500), as disclosed in U.S.

patent application Ser. No. 17/395,074, Ser. No. 15/595,620, and Ser. No. 15/906,549, as well as any of the design features and disclosure in U.S. patent application Ser. No. 17/379,488, Ser. No. 17/317,314, which are hereby fully incorporated by reference, best seen in FIGS. 51 and 52. The nut locking helix (500) may have a nut locking helix proximal end (502), a nut locking helix distal end (504), a nut locking helix length (506), defined as the distance between the nut locking helix proximal end (502) and the nut locking helix distal end (504), a nut locking helix width (508), a nut locking helix locking segment (510) having a plurality of nut locking helix locking segment sections (511), best seen in FIG. 52, a nut locking helix wire (512) having a nut locking helix wire width (514), illustrated in FIGS. 49-52. In one embodiment of the present nut (100) the nut locking helix length (506), seen in FIG. 51, may be 50 to 100 percent of the nut length (106), seen in FIG. 7. In another embodiment, the nut locking helix length (506) may be 60 to 90 percent of the nut length (106), and greater than 65 percent of the nut length (106) in yet another embodiment. In one embodiment at least one full rotation of a coil of the nut locking helix (500) is located within the nut transition area (330), as seen in FIGS. 7 and 49. In another embodiment the nut locking helix locking segment (510) is located within the nut tool engagement area (200), as seen in FIGS. 7 and 49. In another embodiment the nut locking helix locking segment (510) is closer to the nut proximal end (102) than the nut distal end (104). In another embodiment the nut locking helix locking segment (510) is located within the nut transition area (330), as seen in FIGS. 7 and 49.

While in a conventional nut assembly the tensile load is spread over one or two threads, with the nut locking helix (500) each engaged coil acts independently to spread the tensile load out over all of the engaged threads. The nut locking helix (500) provides an increase in the bearing area and an increase in the ultimate tensile strength of the fastener. In fact, failure testing of a fastener having a nut (100) with a 180 ksi tensile rating and utilizing a nut locking helix (500) in combination with a bolt (600) having a 220 ksi tensile rating, and a second bolt (600) having a 260 ksi tensile rating, resulted in failures of the bolt (600) in both instances, despite it having the higher strength. Further, incorporation of the nut locking helix (500) produces a reusable prevailing torque fastener. In fact, in one embodiment a 50 cycle test of the locking torque and breakaway torque demonstrated that the breakaway torque remained above 18 in-lbs for all 50 cycles. In fact, in another embodiment the breakaway torque varied by less than 50% from the first cycle to the 50th cycle, and less than 45% in another embodiment, and less than 40% in still a further embodiment. In one embodiment the breakaway torque of all cycles was within 20 in-lbs of the initial breakaway torque, and within 17.5 in-lbs in another embodiment, and within 15 in-lbs in still a further embodiment. The nut (100) incorporating the nut locking helix (500) far exceeded the 30,000 cycle vibration test of NASM 1312-7 and the 800° F. soak torque test of NASM 25027. Additionally, testing of a fastener incorporating the nut locking helix (500) in a ¼" aluminum nut (100) produced a tensile strength exceeding the axial tensile requirement of alloy steel by 23% per NASM 25027 Table 1, at less than ½ of the weight of a comparably sized steel nut, 1.48 grams versus 3.76 grams, while still exceeding the 30,000 cycle vibration test of NASM 1312-7. In one embodiment the nut (100) has a nut mass of no more than 3 grams, and no more than 2.5 grams, 2.0 grams, and 1.5 grams in further embodiment. In another embodiment the nut locking helix (500) has an insert mass that is at least 20% of the nut mass, and at least 30%, 40%, and 50% in further embodiments. In another series of embodiments the insert mass is no more than the nut mass, and no more than 85% of the nut mass in another embodiment, and no more than 75%, 65%, and 55% in further embodiments.

As noted, testing has been performed of a nut (100) having the nut locking helix (500). In the test samples, a sample nut (100) was formed of 180 KSI material bored to size and then provided with a stainless steel nut locking helix (500). The strength to failure of the improved fastener was compared to two aircraft nut samples that are currently utilized by an aircraft manufacturer. The nut "BACN10HC" is formed of 220 KSI material, while the nut "BACN10ZC" is formed of 180 KSI material. As shown in Table I below, the tested sample fastener, formed as described in the present disclosure, exhibited an unexpectedly high force required to fail the sample nut (100). The 180 KSI material forming the sample nut (100), with the described nut locking helix (500), had a failure strength that was almost indistinguishable from the BACN10HC nut formed of 220 KSI material. In addition, the locking and breakaway torque forces were not substantially reduced over 15 cycles of tightening and loosening. Thus, not only was the strength performance better, but the improved system described herein provides a nut (100) that can be repeatedly used without substantially decreased performance. Thus, the prototype sample 180 KSI nuts (100) performed as well as 220 KSI material nuts of BACN10HC. The consistency of the locking torque values over 15 cycles is far superior to the typical performance of Vespel material for the friction locking by common prevailing torque material.

TABLE 7

|  | BACN10HC (220 KSI) | BACN10ZC (180 KSI) | Sample Nut (100) with Nut Locking Helix (500) (180 KSI nut material) |
|---|---|---|---|
| Failure Load (PSI) | 37,800 | 30,700 | 37,771 (average) |
| Locking Torque (in-lbs) MIN | 150 | 150 | Cycle 1: 81.22 Cycle 15: 61.88 |
| Breakaway Torque (in-lbs) MIN | 18 | 18 | Cycle 1: 79.11 Cycle 15: 63.77 |

An additional series of testing was performed using 220 KSI bolts inserted into the nuts (100) and tested to determine the force necessary to cause the threads to fail under load. Surprisingly, the 220 KSI bolt (600) failed before the 180 KSI sample nut (100) with the nut locking helix (500). Another test was performed using sample nuts (100) made of Inconel 718 (material rated also at 180 KSI) and bolts rated at 260 KSI with the belief that the failure profile of the sample nuts (100) could be determined. Surprisingly, once again the 260 KSI rated bolts failed before the threads in the Inconel 718 sample nut (100). The bolt failure occurred at 265 KSI (44% higher than the Inconel 718 sample nut (100) rating), yet unexpectedly the 180 KSI Inconel 718 sample nut (100) with nut locking helix (500) still did not fail. Thus, testing reveals a significant improvement of the tensile strength performance.

In the above described testing, the breakaway and prevailing torque tests were performed before the tensile failure tests. As expected, the torque values were very consistent; much more consistent over 15 cycles than any other form of prevailing torque fastener currently available. Nuts (100) manufactured as described with the nut locking helix (500)

maintain a locking torque of within about 50% of the average of the first five cycles, over the last of 15 cycles in one embodiment, and within 40% and 30% in further embodiments. Similarly, nuts (100) manufactured as described with the nut locking helix (500) are predicted to maintain a breakaway torque of within about 50% of the average of the first five cycles, over the last of 15 cycles in one embodiment, and within 40% and 30% in further embodiments.

The location of the nut locking helix (500) has unexpectedly been linked to improved performance. Locating the helix locking segment (510) so that it is not within the nut transition area (330) has been shown to improve the stress distribution in the nut (100). In further embodiments applicable to both constant and variable cross-sectional shape configurations of the nut (100), the helix locking segment (510) is located closer to the nut proximal end (102) than the nut distal end (104). In fact, in another embodiment a portion of the helix locking segment (510) is located a locking offset distance, measured from the nut distal end (104), that is at least 55% of the nut length (106), and at least 60%, 65%, and 70% in further embodiments. Unless noted otherwise, the locking offset distance is the distance from the nut distal end (104) to the farthest away portion of the helix locking segment (510). In still further embodiments no portion of the helix locking segment (510) is within a lock-free zone, which is defined by a predetermined lock-free distance measured parallel to the bore longitudinal axis (401) from the nut distal end (104), the nut distal end (102), and/or a transverse plane TP passing through the midpoint of the nut length (106). In one embodiment the predetermined lock-free distance is 5% of the nut length (106), and 10%, 15%, 20%, and 25% in additional embodiments.

The locating of the nut locking helix (500) within the nut (100) is further improved, as is the associated stress distribution in the nut (100), when the nut locking helix (500) has a different number of regular coils on opposite sides of the helix locking segment (510). For instance, in one embodiment, one side has at least one additional regular coil, and at least two additional regular coils in another embodiment, and at least three additional regular coils in still a further embodiment. There are at least two regular coils on each side of the helix locking segment (510) in another embodiment, and at least one side has at least four regular coils in a further embodiment, and in yet another embodiment one, or both, sides have no more than ten regular coils.

More than one helix locking segment (510) may be incorporated in a nut locking helix (500), with some embodiments having at least two locking segment (510), and another embodiment having at least three locking segment (510); however, further embodiments cap the number of locking segment (510) at no more than one locking segment (510) for every two regular coils, and no more than one locking segment (510) for every three regular coils, and no more than one locking segment (510) for every four, five, six, or seven regular coils in still further embodiments. Further, a nut locking helix longitudinal plane exists and contains the insert longitudinal axis, and in some embodiments a locking helix cross-sectional shape in the nut locking helix longitudinal plane is different than a regular coil cross-sectional shape in the same plane. A problem overcome by these embodiments originates from the fact that in a conventional nut, without a nut locking helix (500), the first thread typically takes on 38% of the load, with the second thread bearing 25% of the load, and the third thread bearing 18% of the load; thus, 81% of the load is distributed across the first three threads. This is not ideal and often necessitates a nut material having a hardness above a Rockwell C hardness of 39 RWC, which would make it prone to hydrogen embrittlement. Additionally, the likelihood of failure of the first thread is increased due to dilation of the nut flange and thread bending due to undesirable stress distribution in a conventional nut. Dilation and thread bending cause the major diameter of the nut thread to increase thus decreasing the shear stress area of the already critically loaded first three threads. Theoretical and practical studies of this phenomenon indicate that the top face of the nut contracts in a radial direction while its bearing surface expands. Thus, without high temper materials to withstand the effects of extreme shear stress on the first three threads, conventional MS21042 nuts will split due to nut dilation and/or stripping. Reference to MS21042 nuts refers to nuts meeting Military Specification MS21042 for use in aircraft. Further, high hardness values require precise processing methods to eliminate hydrogen embrittlement and reduce the fracture toughness. In fact, testing of standard ¼" 28 thread/inch MS21042 nut was performed with a 180 KSI rated bolt and a 6500 lbf axial load, revealing a first thread load of 2462.4 lbs and a first thread stress of 119534 psi, requiring a Rockwell C hardness of 42 RWC to achieve a shear strength of 110,200 psi, and a ductility of only 13%. Conversely, a test fastener referred to as SCF610-4 having an alloy steel nut, also a ¼" 28 thread/inch nut, tempered to only a Rockwell C hardness of 37 RWC, while utilizing the disclosed nut locking helix (500), had a distinctly different failure mechanism when subjected to the same 6500 lbf axial load with a 180 KSI rated bolt. The first thread load of the SCF610-4 test nut was reduced to 1944 lbs with a first thread stress of only 96280 psi, while having an improved ductility of 17% and the Rockwell C hardness of 37 RWC being well below the hydrogen embrittlement threshold. In contrast to the MS21042 nut, the SCF610-4 test nut flange showed no dilation. The SCF610-4 test nut exhibited a significant reduction in shear stress area occurred near the middle of the nut instead of at the base, as in the MS21042 nut. This is clear indicator of preferred load distribution in the threads of the SCF610-4 test nut. In the SCF610-4 test nut, as the load increased, the middle threads plastically deformed first then the lower threads. Since the SCF610 test nut material is softer and more ductile than MS21042 nut, brittle failure did not occur in the SCF610 test nut, and the lower threads took on more load.

The SCF610 test nuts surpassed the NASM21042 tensile load requirement across the range of critical tolerances. This is important in that it allows a more forgiving manufacturing process that is consequently easier to control. Further, the nut locking helix (500) provided a tensile strength advantage due to load sharing. Such load sharing allows the SCF610 test nut material to be softer and more ductile than comparable MS21042 nuts, thereby eliminating hydrogen embrittlement issues and the resulting catastrophic failure and FOD issues. Incorporation of the nut locking helix (500), in nuts of similar size and performance requirements, also allows corrosion resistant materials such as A286, an iron-nickel-chromium alloy with additions of molybdenum and titanium, which is one of the most popular high temperature alloys, since as an austenitic alloy it maintains good strength and oxidation resistance at temperatures up to 1300° F. Thus, the nut locking helix (500) facilitates the use of materials having lower tensile strengths in corrosive environments in place of hard alloy steels with expensive cadmium plating and hydrogen bake out processes, which is a tremendous benefit. Therefore, in one embodiment the nut (100) has no plating.

The tensile strength, hardness, thermal coefficient of expansion, and/or percent elongation relationships among the various components play a significant role in improved performance, durability, and, in some cases, reusability. Further, the unique combinations and relationships achieve specific performance goals and are much more than just routine experimentation, and, as one skilled in the art will appreciate, often requires careful and deliberate heat treatments processes to achieve the relationships. The disclosed relationships are related to test coupons formed of the same material and subjected to the same heat treatments, hardening, and/or working as the associated component and tested per ASTM E8.

In one embodiment the Rockwell C hardness of the nut locking helix (500) is greater than the Rockwell C hardness of the nut (100) and/or the bolt (600). In fact, in a further embodiment the Rockwell C hardness of the nut locking helix (500) is at least 2 units greater than the Rockwell C hardness of the nut (100) and/or the bolt (600), and at least 3 units greater in another embodiment, and at least 4 units greater in still another embodiment. However, further embodiments limit the differential in Rockwell C hardness units to avoid negative effects. Specifically, in one embodiment the difference in Rockwell C hardness units is no greater than 13, and no greater than 10 in another embodiment, and no greater than 7 in still a further embodiment. The nut locking helix (500) has a Rockwell C hardness of no more than 50 RWC in one embodiment, and no more than 47 RWC in another embodiment, and no more than 45 RWC in still a further embodiment. Whereas in another embodiment the nut locking helix (500) has a Rockwell C hardness of at least 42 RWC in one embodiment, and at least 44 RWC in another embodiment, and at least 46 RWC in still a further embodiment. The nut (100) and/or bolt (600) has a Rockwell C hardness of no more than 42 RWC in one embodiment, and no more than 40 RWC in another embodiment, and no more than 38 RWC in still a further embodiment.

Further, in another embodiment the coefficient of thermal expansion of the nut locking helix (500) is greater than the coefficient of thermal expansion of the nut (100) and/or the bolt (600). In fact, in one embodiment the coefficient of thermal expansion of the nut locking helix (500) is at least $1.5 \times 10-6/°$ C. greater than the coefficient of thermal expansion of the nut (100) and/or the bolt (600), and at least $3 \times 10-6/°$ C. greater in another embodiment, and at least $4.5 \times 10-6/°$ C. greater in still a further embodiment. However, further embodiments limit the differential in coefficient of thermal expansion to avoid negative effects. Specifically, in one embodiment the difference in coefficient of thermal expansion is no greater than $9 \times 10-6/°$ C., and no greater than $7 \times 10-6/°$ C. in another embodiment, and no greater than $5 \times 10-6/°$ C. in still a further embodiment. The coefficient of thermal expansion of the nut locking helix (500) is at least $13 \times 10-6/°$ C. in one embodiment, and at least $15 \times 10-6/°$ C. in another embodiment, and at least $16 \times 10-6/°$ C. in still a further embodiment. The coefficient of thermal expansion of the nut (100) and/or bolt (600) is no more than $15 \times 10-6/°$ C. in one embodiment, and no more than $13 \times 10-6/°$ C. in another embodiment, and no more than $11 \times 10-6/°$ C. in still a further embodiment.

Additionally, in another embodiment the tensile strength of the nut locking helix (500) is greater than the tensile strength of the nut (100) and/or the bolt (600). In fact, in one embodiment the tensile strength of the nut locking helix (500) is at least 10 ksi greater than the tensile strength of the nut (100) and/or the bolt (600), and at least 20 ksi greater in another embodiment, and at least 30 ksi greater in still a further embodiment. However, further embodiments limit the differential in tensile strength to avoid negative effects. Specifically, in one embodiment the difference in tensile strength is no greater than 60 ksi, and no greater than 50 ksi in another embodiment, and no greater than 40 ksi in still a further embodiment. The tensile strength of the nut locking helix (500) is at least 195 ksi in one embodiment, at least 205 ksi in another embodiment, and at least 215 ksi in still a further embodiment. The nut locking helix (500) is made of 304 stainless steel in one embodiment, and is made of cold-rolled stainless steel wire in another embodiment.

Still further, the percent elongation of the nut locking helix (500) is less than the percent elongation of the nut (100) and/or the bolt (600). In fact, in one embodiment the percent elongation of the nut locking helix (500) is at least 3 percentage units less than the percent elongation of the nut (100) and/or the bolt (600), and at least 5 percentage units less in another embodiment, and at least 7 percentage units less in another embodiment. The term percentage units is used to be clear that the terms refers to a difference between measured % values, not a percentage of one of the measured values. For example, if the percent elongation of the nut locking helix (500) test specimen is 9% and the percent elongation of the nut (100) test specimen is 12%, the differential is 3 percentage units. However, further embodiments limit the differential in percentage units to avoid negative effects. Specifically, in one embodiment the difference in percentage units is no greater than 20 percentage units, and no greater than 15 percentage units in another embodiment, and no greater than 12.5 percentage units in still a further embodiment.

Figures 51, 52:
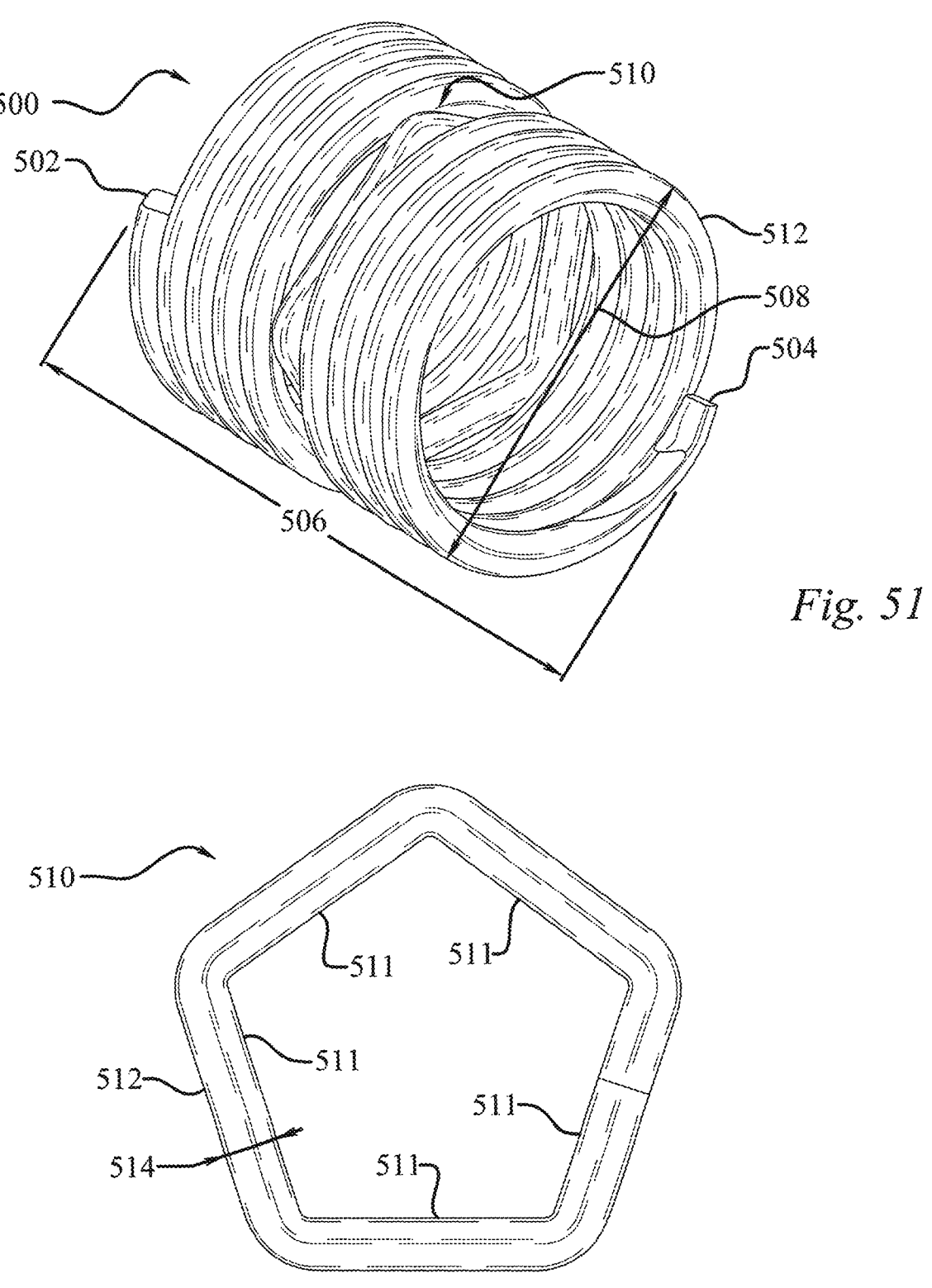
FIG. 51 is an isometric view of a helical coil insert.
FIG. 52 is a front elevation view of a locking section.

FIG. 51 shows a nut locking helix (500), with the nut locking helix wire (512), often referred to as regular coils, being interrupted by segments of the nut locking helix locking segment (510), as indicated by locking segment sections (511) in FIG. 52. The nut locking helix wire (512), often referred to as regular coils, create a generally circular end profile, with the locking segment sections (511) interrupting the smooth profile of the regular coils. In practice, the characteristics of the nut locking helix (500) installed in a nut (100) will serve to retain an inserted bolt (600) in position and resist any backing-out to a reverse torque specification determinable according to the characteristics of the nut locking helix (500). Properly installed, the nut locking helix (500) will bear against both the inserted bolt (600) and the threads within nut (100), thus resisting the initial back-off movement and further retaining the inserted bolt (600) against a reverse prevailing torque. The nut locking helix locking segment (510) may include three or more such locking segment sections (511), including five or more in an embodiment, six or more in another embodiment, eight or more in a further embodiment, and ten or more in still a further embodiment. Performance is diminished, and manufacturing complexity increased, when the nut locking helix locking segment (510) has more than twenty-four locking segment sections (511) in one embodiment, and no more than eighteen faces in another embodiment, and no more than twelve faces in a further embodiment, and no more than eight faces in still another embodiment.

Additional performance benefits have been found to be attributed to the surface roughness of the nut locking helix (500). Conventional thinking results in the production of inserts that are exceedingly smooth and described as virtually eliminating friction-induced thread erosion with an average Ra roughness value of 32 On. For perspective, a cold rolled, heat treated, skin passed stainless steel with a 2B surface finish per publication BS EN 10088-2:2014 "Stainless steels—Technical delivery conditions for sheet/plate and strip of corrosion resisting steels for general purposes," of the British Stainless Steel Association, has a roughness of 0.3-0.5 or approximately 12-20 μin. Further, a bead blasted finish produces an average Ra of 1.00-6.00 μm, or 39-236 μin.

The ultimate test for vibration resistance relative to proof load is the Junkers test. Developed in the late 1960s by German engineer Gerhard Junker, the mechanical testing device measures preload in nut and bolt by means of a load cell. The nut and bolt are subjected to shear loading by means of transverse vibration and proof load is constantly measured. Testing has shown a typical NAS9926 nut with an initial compressive load of approximately 2000 lbf and initial torque of approximately 11 ft-lbf retains only 57-60% of the initial compressive load after 400 vibrational cycles (12.5 Hz, +/−0.026" transverse displacement, 75° F.), and only 37-56% of the initial compressive load after 2000 vibrational cycles. However, introduction of a helical thread insert 1030 in the same size and material nut, and same test conditions, retains 85% of the initial compressive load after 400 cycles (12.5 Hz, +/−0.026" transverse displacement, 75° F.), and 87% of the initial compressive load after 2000 cycles.

Testing has shown thread cycling, defined as assembly and disassembly of the nut and bolt—threaded in, threaded out, significantly impacts the % of the retained load. Specimens were tested at 10, 25 and 50 thread cycles. Specimens that did not contain the nut locking helix (500) had widely variable retained energy, which is the area under a curve with clamping load retention (%) on the y-axis and vibrational cycles on the x-axis (0-2000). At zero thread cycles the nut containing the nut locking helix (500) yielded a Junkers test retained energy percentage of 0.86, while the NAS9926 nuts were 0.45-0.59. At 10, 25, and 50 thread cycles the nut containing nut locking helix (500) maintained a relatively consistent retained energy percentage of 0.89-0.91, while the NAS9926 nuts had widely variable retained energy percentages of 0.58-0.78. The roughness imparted on the threads of the nut (100) or the nut locking helix (500) by thread cycling tends to improve the retained energy percentage.

Thus, in one embodiment the threads of the nut (100) are treated so that a portion of the threads have a roughness of at least 39 and at least 50 μin in another embodiment, and at least 60 μin in still further embodiment. However, another series of embodiments balances the potential negative performance attributes associated with increased roughness by capping the range, thus in one embodiment no portion of the threads has a roughness greater than 200 μin, and no greater than 150 μin, 125 μin, 100 μin, and 80 μin in further embodiments. Likewise, in one embodiment a surface of the nut locking helix (500) is treated so that a portion has a roughness of at least 39 μin, and at least 50 μin in another embodiment, and at least 60 μin in still further embodiment. However, another series of embodiments balances the potential negative performance attributes associated with increased roughness by capping the range, thus in one embodiment no portion of the nut locking helix (500) has a roughness greater than 200 μin, and no greater than 150 μin, 125 μin, 100 μin, and 80 μin in further embodiments. In one embodiment the portion of the nut threads having the disclosed roughness is at least 25% of the total surface area of the threads, while in further embodiments it is at least 35%, 45%, 55%, 65%, 75%, 85%, and 95%. Similarly, in one embodiment the portion of the nut locking helix (500) having the disclosed roughness is at least 25% of the total surface area of the helical thread insert 1030, while in further embodiments it is at least 35%, 45%, 55%, 65%, 75%, 85%, and 95%. In one embodiment the method of creating the disclosed roughness is via chemical milling, electrical discharge machining, milling, broaching, reaming, electron beam texturing, laser etching and/or texturing, plasma etching, electro-chemical, sanding and/or blasting, ultrasonic polishing, and/or magnetic polishing.

Inserts have been used for some time in industry for applications that substantially differ from those disclosed, including, for instance, as a means to repair damaged threads, and have not recognized the desirable performance benefits associated with the disclosed relationships. The primary purpose of such conventional inserts has been to provide renewed threads after thread damage has occurred. Helical thread inserts are not generally used at all in nut bodies in the new and unique manner disclosed herein to achieve the desired goals. The use of a separate nut locking helix (500) inserted in a nut (100), not cast in a body, prior to the present disclosure has been generally disfavored, as the nut locking helix (500) adds additional complexity, another separate component, and additional cost, not to mention the material treatments necessary to achieve the disclosed relationships. The present disclosure provides a rationale and adaptable design for implementing a nut locking helix (500) in a nut (100) to provide increased strength nuts (100), with renewable threads, and provides a mechanism for providing a locking or retaining system for nuts (100) that previously suffered from a number of limitations. The improved nut (100) disclosed is a heretofore unutilized application of a nut locking helix (500) to allow for manufacture of a nut (100) that both provides for a prevailing torque locking fastener, and that increases the useful life of a nut (100). Importantly, implementation of the improved nut (100) with a nut locking helix (500) allows for increased strength of the fastener, in excess of what would be predicted based on the previous understanding of the performance of threaded fasteners, and use of softer more ductile materials. The improved fastener even further allows for nuts (100) of new and/or uncommon materials, providing weight savings and additional performance enhancements. The present nut locking helix (500) is not subject to the vagaries of wear commonly encountered with both resilient disk fasteners and with crimped locking fasteners. A nut (100) with a nut locking helix (500) experiences significantly less permanent alteration when used in service, such that these fasteners can be repeatedly used until a rated cycle life is exceeded. Further, the nut locking helix (500) may in certain applications allow for renewal after a given number of insertions, or cycles of operation in place. When the design life is due to be exceeded, the nut locking helix (500) can be removed and renewed without excessive expense. Further, the disclosed characteristics of the nut (100) and the nut locking helix (500) work together to improve stress distribution, toughness, resilience to shock, the ability to accept more elastic strain, overall strength, and resistance to nut dilation.

The previously mentioned bolt (600) may have a bolt width (602), a bolt shank (604), a bolt thread (610) having a bolt thread length (612), a maximum bolt thread to nut bore thread distance (614), and a minimum bolt thread to nut tool engagement area distance (618), displayed in FIGS. 49 and 50. In one embodiment, the bolt width (602) may be slightly larger than the nut bore width (408) to allow the nut bore threads (410) to engage the bolt thread (610). In another embodiment, the bolt width (602) is slightly larger than the inside diameter of the nut locking helix (500) while in the installed state within the current nut (100), as such allowing the bolt thread (610) to engage the nut locking helix wire (512), as seen in FIGS. 49-51. The bolt shank (604) is the portion of the bolt lacking threads, as seen in FIGS. 49 and 50. The maximum bolt thread to nut bore thread distance (614) occurs when a nut locking helix (500) is used in conjunction with the nut (100) and bolt (600). Similarly, the minimum bolt thread to nut tool engagement area distance (618) occurs when the nut (100) and bolt (600) combination does not use a nut locking helix (500).

One embodiment of the present nut (100) may be made of steel and rated between 140,000 psi to 200,000 psi tensile strength. Another embodiment may be rated between 150,000 and 180,000 psi. Yet another embodiment may be rated at greater than or equal to 160,000 psi. All low alloy high-strength steels must be protected against corrosion and the risk of stress corrosion cracking; as such the nut (100) may be coated with cadmium, chromium, nickel or a combination thereof to prevent stress corrosion cracking. Additionally, some nuts (100) may have lubricated threads, and others may be non-lubricated. Lubricating nuts (100) forms a thin barrier between the threads of a bolt (600) and the nut (100) and allows the nut (100) to be removed easier for future maintenance, prevents galling, allows for better thermal conductivity, and during installation the lubricant removes dust and debris located on the threads and prevents future thread contamination that could result in corrosion. Several different styles of lubricants are used, such as: petroleum based lubricants such as PTFE, dry lubricants such as graphite, and various greases. Additionally, one embodiment of nut (100) may be certified for used in temperatures that extend from 300 degrees Fahrenheit to 1500 degrees Fahrenheit, while in another embodiment from 500 degrees Fahrenheit to 1,200 degrees Fahrenheit, and less than 900 degrees Fahrenheit in another. One particular embodiment is formed of high strength alloy steel, a further embodiment is 4340 alloy steel or 8740 alloy steel.

Another embodiment tunes the galvanic compatibility of the components of the blind fastener, along with the previously disclosed balancing of relationships, to provide preferential galvanic compatibility. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

The present nut (100) provides improvements in stress distribution, toughness, resilience to shock, the ability to accept more elastic strain, overall strength, resistance to nut dilation, durability, reliability, and ease of use, also known as the goals of the present nut and fastener designs, via a delicate interplay of relationships of the various sections of the nut (100), variables within each section as well as relationships across the sections, and relationships across the components of the overall fastener system. The disclosed relationships are more than mere optimization, maximization, or minimization of a single characteristic or variable, and are often contrary to conventional design thinking, yet have been found to achieve a unique balance of the trade-offs associated with competing criteria such as durability, stress distribution, vibration and fatigue resistance, weight, and ease of use. It is important to recognize that all the associated disclosure and relationships apply equally to all embodiments and should not be interpreted as being limited to the particular embodiment being discussed when a relationship is mentioned. Further, the aforementioned balances require trade-offs among the competing characteristics recognizing key points of diminishing returns, as often disclosed with respect to open and closed ranges for particular variables and relationships. Proper functioning of each section, component, and the overall fastener, on each and every engagement can be a matter of life or death. While the relationships of the various features and dimensions of a single section play an essential role in achieving the goals, the relationships of features across multiple sections and/or components are just as critical, if not more critical, to achieving the goals. Additionally, the relative length, width, thickness, geometry, and material properties of various sections and components, and their relationships to one another and the other design variables disclosed herein, influence the ability to achieve the goals.

In addition to the previously disclosed hardness relationships, in another embodiment the nut locking helix (500) has a density greater than the density of the nut (100) and/or the bolt (600). In fact, in another embodiment the nut locking helix (500) has a density that is at least twice the density of the nut (100) and/or the bolt (600). In a further embodiment at least one of the nut (100) and bolt (600) are composed of, but not limited to, at least one of the following: an aluminum alloy, an anodized aluminum alloy, a copper containing alloy, a zinc alloy, a stainless steel alloy, a carbon steel alloy, a carbon epoxy compound, or a glass epoxy compound. Additionally, in the embodiments that are composed of various metals a corrosion resisting coating may also be used such as, but not limited to: a cadmium coating, a chromate coating, a polymer coating or a combination thereof. Furthermore, in one embodiment any of the threaded surfaces may have a lubricant to help facilitate ease of installing, including dry film lubricants such as molybdenum disulfide. Further, any of the components may include corrosion resistant coatings and/or cadmium plating.

Some examples of metal alloys that can be used to form any of the components include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304, 309, 316 and 410 stainless steel), PH (precipitation-hardenable) alloys (e.g., 17-4, C450, and C455 alloys, just to name a few), copper alloys, brass alloys, bronze alloys, nickel alloys, austenitic nickel-chromium-based superalloys such as Inconel, a registered trademark of Special Metals Corporation, high-temperature low creep superalloys such as Nimonic 90, is a registered trademark of Special Metals Corporation, and iron-base superalloys such as heat and corrosion resistant austenitic iron-base material Type A286 alloy (S66286).

Additionally, in some embodiments the nut (100) and/or bolt (600) may be formed of nonmetallic materials such as plastics, composites, thermoplastics, and resin based composites. In one embodiment the nonmetallic material is a carbon fiber reinforced plastic material. Another embodiment the nonmetallic material is a polyamide resin, while in a further embodiment the polyamide resin includes fiber reinforcement, and in yet another embodiment the polyamide resin includes at least 35% fiber reinforcement. In one such embodiment the fiber reinforcement includes long-glass fibers having a length of at least 10 millimeters pre-molding and produce a finished component having fiber lengths of at least 3 millimeters, while another embodiment includes fiber reinforcement having short-glass fibers with a length of at least 0.5-2.0 millimeters pre-molding. Incorporation of the fiber reinforcement increases the tensile strength of the component, however it may also reduce the primary portion elongation to break therefore a careful balance must be struck to maintain sufficient elongation. Therefore, one embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu XW5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

In a still further embodiment the nut (100) and/or bolt (600) may be formed of a nonmetallic material having a density of less than 2 g/cc and an elongation to break of at least 3% in one embodiment, and at least 4%, 5%, 6%, 7%, and 8% in further embodiments. In a further embodiment the nonmetallic material has a density of less than 1.80 g/cc, and less than 1.60 g/cc, and less than 1.40 g/cc, and less than 1.2 g/cc in additional embodiments. In an embodiment the nonmetallic material is a thermoplastic material, and a Polyetherimide (PEI) in a further embodiment, and, in still more embodiments, any of the following materials that meet the claimed mechanical properties: polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems that meet the claimed mechanical properties. In one embodiment the nonmetallic material has one, or more, of the following properties: a tensile strength of at least 20 Ksi, a tensile modulus of at least 1000 Ksi, a flexural strength of at least 30 Ksi, a flexural modulus of at least 900 Ksi, a compressive strength of at least 20 Ksi, a compressive modulus of at least 450 Ksi, a shear strength of at least 13 Ksi, and a Rockwell M scale hardness of at least 105.

In still another embodiment the nut (100) is formed of a metallic material with a density of less than 4.6 g/cc in one embodiment, and less than 3 g/cc in yet another embodiment: and in another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

Additionally, the relative length, width, thickness, geometry, and material properties of various components, and their relationships to one another and the other design variables disclosed herein, influence the durability, ease of use, security, and safety of the system to achieve the goals.

While the disclosed ranges and relationships apply to nuts of all sizes, to put them in perspective with some specific embodiments of nut (100), in one embodiment the nut length (106) is no more than 0.500", and no more than 0.450", 0.400", 0.350", 0.300", and 0.250" in further embodiments. In a further embodiment the nut length (106) is at least 0.050", and at least 0.060", 0.070", and 0.080" in further embodiments. Additionally, in one embodiment the nut flange width (308) is at least 0.100", and at least 0.150", 0.120", 0.125", and 0.130" in further embodiments. In a further embodiment the nut flange width (308) is no more than 0.850", and no more than 0.750", 0.650", and 0.600" in further embodiments. Further, in an embodiment the NTE minimum width (208) is at least 0.1000", and at least 0.1100" and 0.1200" in further embodiments. In another series of embodiments the NTE minimum width (208) is no more than 0.7500", and no more than 0.6500", 0.5500", 0.5000", and 0.4500" in further embodiments. In still another embodiment the NBT root wall thickness (424) within the nut tool engagement area (200) is at least 0.0100", and is 0.0110", and 0.0120" in further embodiments. In another series of embodiments the NBT root wall thickness (424) within the nut tool engagement area (200) is no more than 0.0600", and no more than 0.0550", 0.0500", 0.0450", and 0.0400" in further embodiments. In yet another embodiment the maximum NTE length (202) is no more than 0.2250", and no more than 0.2000", 0.1750", and 0.1500" in further embodiments. While in another series of embodiments the maximum NTE length (202) is at least 0.0750", and at least 0.1000", 0.1100", 0.1150", 0.1200", 0.1250", and 0.1300" in further embodiments. In still another embodiment the maximum transition length (332) is no more than 0.1500", and no more than 0.1250", 0.1150", 0.1050", and 0.0950" in further embodiments. While in another series of embodiments the maximum transition length (332) is at least 0.0250", and at least 0.0350", 0.0450", 0.0550", and 0.0650" in further embodiments. In another embodiment the NFS length (316) is at least 0.0075", and at least 0.0090", 0.0100", 0.0125", and 0.0150" in further embodiments. While in a further series of embodiments the NFS length (316) is no more than 0.0750", and no more than 0.0600", 0.0500", and 0.0400" in further embodiments.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:
1. A nut, comprising:
   a nut proximal end, a nut distal end, and a nut length between the nut proximal end and the nut distal end;

a nut bore extending into the nut from the nut distal end and defining the bore longitudinal axis, with the nut bore having a nut bore proximal end, a nut bore distal end, a nut bore length, defined as the distance between the nut bore proximal end and the nut bore distal end, and a nut bore width;

a nut bore thread located within at least a portion of the nut bore and having a NBT crest, a NBT root, and a NBT root wall thickness;

a nut tool engagement area having a NTE length, measured parallel to the bore longitudinal axis, that varies from a NTE maximum length to a NTE minimum length, a NTE maximum width, a NTE minimum width, and a plurality of NTE planar surfaces;

a nut flange having:
   a nut flange proximal end at the intersection with the NTE planar surface, a nut flange distal end, a nut flange length between the nut flange proximal end and the nut flange distal end, and a nut flange width;
   a nut flange seat having a NFS proximal end, a NFS distal end, a NFS length between the NFS proximal end and the NFS distal end, and a NFS width;
   a nut transition area having a transition length that varies from a maximum transition length to a minimum transition length, wherein the maximum transition length is 25-125% greater than the minimum transition length, and the minimum transition length is at least 7.5% of the nut length; and
wherein within a first plane containing the bore longitudinal axis and the location of the maximum transition length, (a) the NBT root wall thickness increases from a first NBT root wall thickness in the nut tool engagement area to a second NBT root wall thickness at a midpoint of the maximum transition length, and the second NBT root wall thickness is no more than 3.0 times the first NBT root wall thickness, and (b) a transition surface of the nut transition area between the nut tool engagement area and the second NBT root wall thickness is concave outward; and
wherein a controlled curvature region exists within the nut transition area and is located between a CCR sinistral edge plane and a CCR dextral edge plane, wherein:
   the CCR sinistral edge plane and the CCR dextral edge plane both contain the bore longitudinal axis and intersect at the bore longitudinal axis with a CCR angle between the CCR sinistral edge plane and the CCR dextral edge plane;
   a plurality of transition planar deviation points upper are in the controlled curvature region and in contact with the nut tool engagement area representing the points at which the controlled curvature region transitions from one of the plurality of NTE planar surfaces;
   a plurality of transition planar deviation points lower are in the controlled curvature region and in contact with the NFS proximal end representing the points at which the controlled curvature region transitions from a flat surface of the nut flange seat;
   the plurality of transition planar deviation points upper and the plurality of transition planar deviation points lower define an upper vertical boundary and a lower vertical boundary of the transition surface;
   a first analysis section exists in the controlled curvature region between the CCR sinistral edge plane and the CCR dextral edge plane, and the first analysis section includes the bore longitudinal axis, wherein within the first analysis section a first upper transition radius of curvature contacting a first transition planar devia-
tion point upper is at least 0.025";

a second analysis section exists in the controlled cur-
vature region between the CCR sinistral edge plane
and the CCR dextral edge plane, and the second
analysis section includes the bore longitudinal axis
and is different than the first analysis section,
wherein within the second analysis section a second
upper transition radius of curvature contacting a
second transition planar deviation point upper is at
least 0.025"; and wherein the first upper transition radius of curvature is
not equal to the second upper transition radius of
curvature, and the CCR angle is 60 degrees or less.

2. The nut of claim 1, wherein the first upper transition
radius of curvature is at least 5% greater than the second
upper transition radius of curvature.

3. The nut of claim 2, wherein the first upper transition
radius of curvature is greater than the NBT root wall
thickness within the nut tool engagement area.

4. The nut of claim 3, wherein within the first plane
containing the bore longitudinal axis and the location of the
maximum transition length, the transition surface of the nut
transition area is entirely concave outward from a transition
planar deviation point upper to the NFS proximal end.

5. The nut of claim 4, wherein within the first plane
containing the bore longitudinal axis and the location of the
maximum transition length, a first transition planar deviation
point lower is in contact with the NFS proximal end, a first
imaginary straight line extends from the first transition
planar deviation point upper to the first transition planar
deviation point lower, and the entire transition surface is
located between the first imaginary straight line and the bore
longitudinal axis.

6. The nut of claim 5, wherein a maximum offset distance
measured perpendicularly from the first imaginary line to the
transition surface is at least 5% of the NBT root wall
thickness located within the nut tool engagement area.

7. The nut of claim 1, wherein the second analysis section
is at least 7.5 degrees from the first analysis section.

8. The nut of claim 7, wherein the plurality of NTE planar
surfaces includes six NTE planar surfaces, the nut has a nut
mass of no more than 3 grams, the second NBT root wall
thickness is no more than 2.75 times the first NBT root wall
thickness, the maximum transition length is 30-115% greater
than the minimum transition length, the minimum transition
length is at least 10% of the nut length, the first upper
transition radius of curvature is no more than 0.200", and the
second upper transition radius of curvature is no more than
0.200".

9. The nut of claim 8, wherein the second NBT root wall
thickness is no more than 2.5 times the first NBT root wall
thickness, the maximum transition length is no more than
100% greater than the minimum transition length, the mini-
mum transition length is no more than 40% of the nut length,
the nut length is no more than 0.500", the nut flange width
is at least 0.100", the NTE minimum width is 0.1000-
0.7500", and the maximum transition length is no more than
0.1500".

10. The nut of claim 9, wherein the nut has a nut density
of less than 4.6 g/cc, the second NBT root wall thickness is
no more than 2.25 times the first NBT root wall thickness,
the maximum transition length is no more than 90% greater
than the minimum transition length, the maximum transition
length is 20-50% of the nut length, the minimum transition
length is no more than 30% of the nut length, the nut length
is at least 0.050", the nut flange width is no more than 0.850", and the NBT root wall thickness within the nut tool
engagement area is 0.0100-0.0600".

11. The nut of claim 1, further including a nut locking
helix located in the nut bore and engaging a portion of the
nut bore thread, and having a nut locking helix proximal end,
a nut locking helix distal end, a nut locking helix length
between the nut locking helix proximal end and the nut
locking helix distal end, wherein the nut locking helix length
is 50-100% of the nut length, and at least one full rotation
of a full coil of the nut locking helix is located within the nut
transition area.

12. The nut of claim 11, wherein the nut locking helix
length is 60-90% of the nut length.

13. The nut of claim 11, wherein the nut locking helix
includes a plurality of regular coils and a helix locking
segment having a plurality of nut locking helix locking
segment sections, at least two regular coils are located on
each side of the helix locking segment, and the nut locking
helix locking segment is closer to the nut proximal end than
the nut distal end.

14. The nut of claim 11, wherein a Rockwell C hardness
of the nut locking helix is greater than a Rockwell C
hardness of the nut.

15. The nut of claim 14, wherein the Rockwell C hardness
of the nut locking helix is at least 2 units greater than the
Rockwell C hardness of the nut, and the Rockwell C
hardness of the nut locking helix is no more than 50 RWC.

16. The nut of claim 15, wherein the Rockwell C hardness
of the nut locking helix is no more than 13 units greater than
the Rockwell C hardness of the nut, the Rockwell C hard-
ness of the nut locking helix is at least 42 RWC, and the
Rockwell C hardness of the nut is no more than 42 RWC.

17. The nut of claim 14, wherein a coefficient of thermal
expansion of the nut locking helix is at least $1.5 \times 10^{-6}/^\circ$ C.
greater than a coefficient of thermal expansion of the nut, the
coefficient of thermal expansion of the nut locking helix is
no more than $9 \times 10^{-6}/^\circ$ C. greater than the coefficient of
thermal expansion of the nut, and a tensile strength of the nut
locking helix is 10-60 ksi greater than a tensile strength of
the nut.

18. The nut of claim 14, wherein the nut locking helix has
an average Ra roughness value of 39-200 µin.

19. The nut of claim 11, wherein the nut has a nut mass
and a nut density, and the nut locking helix has an insert
mass of 20-75% of the nut mass and a helix density greater
than the nut density.

20. A nut, comprising:

a nut proximal end, a nut distal end, and a nut length
between the nut proximal end and the nut distal end;

a nut bore extending into the nut from the nut distal end
and defining the bore longitudinal axis, with the nut
bore having a nut bore proximal end, a nut bore distal
end, a nut bore length, defined as the distance between
the nut bore proximal end and the nut bore distal end,
and a nut bore width;

a nut bore thread located within at least a portion of the
nut bore and having a NBT crest, a NBT root, and a
NBT root wall thickness;

a nut tool engagement area having a NTE length, mea-
sured parallel to the bore longitudinal axis, that varies
from a NTE maximum length to a NTE minimum
length, a NTE maximum width, a NTE minimum
width, and a plurality of NTE planar surfaces;

a nut flange having:

a nut flange proximal end at the intersection with the
NTE planar surface, a nut flange distal end, a nut flange length between the nut flange proximal end and the nut flange distal end, and a nut flange width;

a nut flange seat having a NFS proximal end, a NFS distal end, a NFS length between the NFS proximal end and the NFS distal end, and a NFS width; and a nut transition area having a transition length that varies from a maximum transition length to a minimum transition length, wherein the maximum transition length is 25-125% greater than the minimum transition length, and the minimum transition length is at least 7.5% of the nut length;

a nut locking helix located in the nut bore and engaging a portion of the nut bore thread, and having a nut locking helix proximal end, a nut locking helix distal end, a nut locking helix length between the nut locking helix proximal end and the nut locking helix distal end, wherein the nut locking helix length is 50-100% of the nut length, and at least one full rotation of a full coil of the nut locking helix is located within the nut transition area;

wherein within a first plane containing the bore longitudinal axis and the location of the maximum transition length, (a) the NBT root wall thickness increases from a first NBT root wall thickness in the nut tool engagement area to a second NBT root wall thickness at a midpoint of the maximum transition length, and the second NBT root wall thickness is no more than 3.0 times the first NBT root wall thickness, and (b) a transition surface of the nut transition area between the nut tool engagement area and the second NBT root wall thickness is concave outward; and wherein a controlled curvature region exists within the nut transition area and is located between a CCR sinistral edge plane and a CCR dextral edge plane, wherein:

the CCR sinistral edge plane and the CCR dextral edge plane both contain the bore longitudinal axis and intersect at the bore longitudinal axis with a CCR angle between the CCR sinistral edge plane and the CCR dextral edge plane;

a plurality of transition planar deviation points upper are in the controlled curvature region and in contact with the nut tool engagement area representing the points at which the controlled curvature region transitions from one of the plurality of NTE planar surfaces;

a plurality of transition planar deviation points lower are in the controlled curvature region and in contact with the NFS proximal end representing the points at which the controlled curvature region transitions from a flat surface of the nut flange seat;

the plurality of transition planar deviation points upper and the plurality of transition planar deviation points lower define an upper vertical boundary and a lower vertical boundary of the transition surface;

a first analysis section exists in the controlled curvature region between the CCR sinistral edge plane and the CCR dextral edge plane, and the first analysis section includes the bore longitudinal axis, wherein within the first analysis section a first upper transition radius of curvature contacting a first transition planar deviation point upper is at least 0.025";

a second analysis section exists in the controlled curvature region between the CCR sinistral edge plane and the CCR dextral edge plane, at least 7.5 degrees from the first analysis section, and the second analysis section includes the bore longitudinal axis and is different than the first analysis section, wherein within the second analysis section a second upper transition radius of curvature contacting a second transition planar deviation point upper is at least 0.025"; and wherein the first upper transition radius of curvature is not equal to the second upper transition radius of curvature, and the CCR angle is 60 degrees or less.

* * * * *